(12) United States Patent
Ho

(10) Patent No.: US 9,317,179 B2
(45) Date of Patent: Apr. 19, 2016

(54) METHOD AND APPARATUS FOR PROVIDING RECOMMENDATIONS TO A USER OF A CLOUD COMPUTING SERVICE

(75) Inventor: Edwin Ho, Palo Alto, CA (US)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 13/443,365

(22) Filed: Apr. 10, 2012

(65) Prior Publication Data

US 2013/0218961 A1 Aug. 22, 2013

Related U.S. Application Data

(63) Continuation-in-part of application No. 12/761,313, filed on Apr. 15, 2010, now Pat. No. 7,937,451, which is a continuation-in-part of application No. 12/355,546, filed on Jan. 16, 2009, now Pat. No. 7,865,572, and a continuation-in-part of application No. 11/788,711, filed on Apr. 20, 2007, now Pat. No. 7,865,571, application No. 13/443,365, which is a continuation-in-part of application No. 12/414,548, filed on Mar. 30, 2009.

(60) Provisional application No. 61/563,320, filed on Nov. 23, 2011, provisional application No. 61/040,131, filed on Mar. 27, 2008, provisional application No. 60/879,416, filed on Jan. 8, 2007.

(51) Int. Cl.
| | |
|---|---|
| *G06F 15/16* | (2006.01) |
| *G06F 3/0482* | (2013.01) |
| *H04L 29/08* | (2006.01) |
| *G06F 17/30* | (2006.01) |
| *G06Q 30/02* | (2012.01) |
| *H04L 29/06* | (2006.01) |
| *H04L 12/58* | (2006.01) |
| *H04L 12/18* | (2006.01) |
| *H04W 56/00* | (2009.01) |

(52) U.S. Cl.
CPC ........ *G06F 3/0482* (2013.01); *G06F 17/30053* (2013.01); *G06F 17/30174* (2013.01); *G06Q 30/02* (2013.01); *H04L 12/1822* (2013.01); *H04L 51/32* (2013.01); *H04L 65/4084* (2013.01); *H04L 65/60* (2013.01); *H04L 67/04* (2013.01); *H04L 67/06* (2013.01); *H04L 67/10* (2013.01); *H04L 67/1095* (2013.01); *H04L 67/22* (2013.01); *H04L 67/26* (2013.01); *H04L 67/42* (2013.01); *H04W 56/001* (2013.01)

(58) Field of Classification Search
USPC .................................. 709/204, 201
See application file for complete search history.

(56) References Cited

U.S. PATENT DOCUMENTS

| | | |
|---|---|---|
| 6,493,758 B1 | 12/2002 | McLain |
| 6,507,727 B1 | 1/2003 | Henrick |

(Continued)

FOREIGN PATENT DOCUMENTS

| | | |
|---|---|---|
| CN | 1893356 A | 1/2007 |
| CN | 101635635 A | 1/2010 |

(Continued)

OTHER PUBLICATIONS

Examiners Report dated Nov. 20, 2012 for Japanese Application No. 2009545565 from Japan Patent Office, pp. 1-7, Tokyo, Japan (English-language translation included, pp. 1-4).

(Continued)

*Primary Examiner* — Vivek Srivastava
*Assistant Examiner* — Hermon Asres
(74) *Attorney, Agent, or Firm* — Sughrue Mion, PLLC

(57) ABSTRACT

A method and apparatus is disclosed for transferring digital content from a computing cloud to a computing device and generating recommendations for the user of the computing device.

24 Claims, 44 Drawing Sheets

(56) References Cited

U.S. PATENT DOCUMENTS

| | | |
|---|---|---|
| 6,795,859 B2 | 9/2004 | Parker |
| 6,810,080 B1 | 10/2004 | Wise |
| 7,065,342 B1 | 6/2006 | Rolf |
| 7,080,124 B1 | 7/2006 | Shankar |
| 7,136,934 B2 | 11/2006 | Carter et al. |
| 7,191,193 B2 | 3/2007 | Ben-Yaacov et al. |
| 7,191,215 B2 | 3/2007 | Ganesan |
| 7,281,034 B1 | 10/2007 | Eyal |
| 7,370,063 B2 | 5/2008 | Vilcauskas et al. |
| 7,403,769 B2 | 7/2008 | Kopra et al. |
| 7,457,484 B2 | 11/2008 | Wakeland |
| 7,523,136 B2 | 4/2009 | Toorn et al. |
| 7,640,565 B2 | 12/2009 | Zhang et al. |
| 7,642,443 B2 | 1/2010 | Gould |
| 7,783,773 B2 | 8/2010 | Wu |
| 7,805,129 B1 | 9/2010 | Issa et al. |
| 7,865,571 B2 | 1/2011 | Ho et al. |
| 7,865,572 B2 | 1/2011 | Ho et al. |
| 7,937,451 B2 | 5/2011 | Ho et al. |
| 8,082,321 B2 | 12/2011 | Ho et al. |
| 8,122,479 B2 | 2/2012 | Britt |
| 8,209,337 B2 | 6/2012 | Park |
| 8,250,172 B2 | 8/2012 | Ho et al. |
| 8,666,524 B2 | 3/2014 | Ben-Yaacov et al. |
| 8,881,233 B2 | 11/2014 | Chrysanthakopoulos et al. |
| 2002/0002039 A1 | 1/2002 | Qurshey |
| 2005/0015467 A1 | 1/2005 | Noda |
| 2005/0044235 A1 | 2/2005 | Balahura et al. |
| 2006/0008180 A1 | 1/2006 | Wakeland |
| 2006/0143297 A1 | 6/2006 | Korhonen et al. |
| 2006/0173974 A1 | 8/2006 | Tang |
| 2006/0184609 A1 | 8/2006 | Deng |
| 2006/0184675 A1 | 8/2006 | Salmre et al. |
| 2006/0227673 A1 | 10/2006 | Yamashita et al. |
| 2006/0265738 A1 | 11/2006 | Chrysanthakopoulos et al. |
| 2007/0121743 A1 | 5/2007 | Zuckerman et al. |
| 2007/0180063 A1 | 8/2007 | Qureshey et al. |
| 2008/0010372 A1 | 1/2008 | Khedouri |
| 2008/0052371 A1 | 2/2008 | Partovi et al. |
| 2008/0091763 A1 | 4/2008 | Devonshire et al. |
| 2009/0043783 A1 | 2/2009 | Wakasa et al. |
| 2009/0076821 A1* | 3/2009 | Brenner ............ G06F 17/30053 704/260 |
| 2009/0132526 A1* | 5/2009 | Park .................. G06F 17/30722 |
| 2009/0216620 A1* | 8/2009 | Lee ........................ G06Q 30/02 705/14.49 |
| 2010/0257059 A1* | 10/2010 | Fujioka et al. ............. 705/14.66 |
| 2010/0287033 A1* | 11/2010 | Mathur ............ G06F 17/30867 705/319 |
| 2011/0119364 A1* | 5/2011 | Zarkesh ........................ 709/223 |
| 2011/0208831 A1 | 8/2011 | Ho et al. |
| 2011/0307791 A1* | 12/2011 | Pierre .................... G06Q 10/10 715/736 |
| 2012/0089702 A1 | 4/2012 | Ho et al. |
| 2013/0007208 A1 | 1/2013 | Tsui et al. |
| 2013/0290485 A1 | 10/2013 | Ho et al. |

FOREIGN PATENT DOCUMENTS

| | | |
|---|---|---|
| CN | 101681332 A | 3/2010 |
| EP | 2149847 A1 | 2/2010 |
| JP | 2001297263 | 10/2001 |
| JP | 2002369174 A | 12/2002 |
| JP | 2003284029 A | 3/2003 |
| JP | 2003510734 A | 3/2003 |
| JP | 2004054914 | 2/2004 |
| JP | 2004104704 A | 4/2004 |
| JP | 2005130087 | 5/2005 |
| JP | 200601177 | 1/2006 |
| JP | 2006014177 | 1/2006 |
| JP | 2006268957 | 5/2006 |
| JP | 2006178741 A | 7/2006 |
| JP | 2006-254241 | 9/2006 |
| JP | 2006254241 | 9/2006 |
| JP | 2006521761 A | 9/2006 |
| JP | 2007164653 | 6/2007 |
| JP | 2007-213401 | 8/2007 |
| JP | 2007-265362 | 11/2007 |
| JP | 2007534009 | 11/2007 |
| JP | 2009-044374 | 2/2009 |
| JP | 2009-123102 | 6/2009 |
| JP | 2009-294775 A | 12/2009 |
| KR | 10-2008-0022080 A | 3/2008 |
| KR | 10-2008-0034084 A | 4/2008 |
| KR | 10-2009-0051540 A | 5/2009 |
| WO | WO01/24474 A1 | 4/2001 |
| WO | WO 2004/061547 A2 | 7/2004 |
| WO | WO 2005/064945 A1 | 7/2005 |
| WO | WO 2005/106876 A2 | 11/2005 |
| WO | WO 2005/109224 A1 | 11/2005 |
| WO | WO 2006/019608 A1 | 2/2006 |
| WO | WO 2006/058149 A2 | 6/2006 |
| WO | WO 2008/070062 A2 | 6/2008 |
| WO | 2009012901 A1 | 10/2009 |

OTHER PUBLICATIONS

Chinese Office Action dated Nov. 23, 2012 for Chinese Application No. 200880007398.A from Chinese Patent Office, pp. 1-17, Beijing, China (English-language translation included, pp. 1-14).

Korean Office Action dated Dec. 10, 2012 for Korean Application No. 2010-7024131 from Korean Intellectual Property Office, pp. 1-8, Seo-gu, Daejeon, 302-701, Republic of Korea (English-language translation included, pp. 5-8).

International Preliminary Report on Patentability dated Dec. 20, 2012 for International Application No. PCT/US2011/032372 from International Bureau of WIPO, pp. 1-6, Geneva, Switzerland.

European Search Report dated Mar. 4, 2010 for European Application No. EP 08705466 from European Patent Office, pp. 1-6, Rijswijk, Netherlands.

European Office Action dated Jun. 10, 2010 for European Application No. EP 08705466 from European Patent Office, pp. 1-4, Rijswijk, Netherlands.

International Search Report and Written Opinion dated Apr. 10, 2008 for International Application No. PCT/US2008/000055 from International Bureau of WIPO, pp. 1-6, ISA, United States.

International Search Report and Written Opinion dated May 27, 2009 for International Application No. PCT/US2009/038457 from International Bureau of WIPO, pp. 1-7, ISA, United States.

Supplementary European Search Report dated Apr. 7, 2011 for European Application No. 09725812.3 from European Patent Office, pp. 1-8, Rijswijk, Netherlands.

English-language translation of Chinese Office Action dated Jun. 9, 2011 for Chinese Application No. 200880007398.4 from Chinese Patent Office, pp. 1-12, Beijing, China.

English-language translation of Japanese Office Action dated Jul. 27, 2011 for Japanese Application No. 2009-545565 from Japan Patent Office, pp. 1-4, Tokyo, Japan.

European Office Action dated May 13, 2011 for European Application No. 08705466.4 from European Patent Office, pp. 1-5, Rijswijk, Netherlands.

Korean Notice of Preliminary Rejection dated May 31, 2012 for Korean Application No. 2010-7024131 from Korean Intellectual Property Office, pp. 1-5, Seo-gu, Daejeon, 302-701, Republic of Korea (English-language translation included, pp. 6-9).

European Office Action dated Mar. 21, 2012 for European Application No. 09725812.3 from European Patent Office, pp. 1-5, Rijswijk, Netherlands.

Chinese Office Action dated Jun. 5, 2012 for Chinese Application No. 200880007398.4 from Chinese Patent Office, pp. 1-7, Beijing, China (English-language translation included, pp. 8-19).

U.S. Non-Final Office Action mailed Dec. 15, 2009 for U.S. Appl. No. 11/788,711.

U.S. Final Office Action mailed Apr. 30, 2010 for U.S. Appl. No. 11/788,711.

U.S. Non-Final Office Action mailed Aug. 5, 2010 for U.S. Appl. No. 11/788,711.

(56) References Cited

OTHER PUBLICATIONS

U.S. Notice of Allowance mailed Nov. 1, 2010 for U.S. Appl. No. 11/788,711.
U.S. Non-Final Office Action mailed Apr. 5, 2010 for U.S. Appl. No. 12/355,546.
U.S. Non-Final Office Action mailed Aug. 5, 2010 for U.S. Appl. No. 12/355,546.
U.S. Notice of Allowance mailed Nov. 1, 2010 for U.S. Appl. No. 12/355,546.
U.S. Non-Final Office Action mailed Aug. 6, 2010 for U.S. Appl. No. 12/761,313.
U.S. Notice of Allowance mailed Dec. 27, 2010 for U.S. Appl. No. 12/761,313
U.S. Non-Final Office Action mailed Mar. 4, 2011 for U.S. Appl. No. 12/981,476.
U.S. Notice of Allowance mailed Aug. 22, 2011 for U.S. Appl. No. 12/981,476.
U.S. Notice of Allowance mailed Oct. 6, 2011 for U.S. Appl. No. 12/981,476.
U.S. Non-Final Office Action mailed Mar. 8, 2011 for U.S. Appl. No. 12/981,479.
U.S. Non-Final Office Action mailed Sep. 2, 2011 for U.S. Appl. No. 12/981,479.
U.S. Notice of Allowance mailed Apr. 2, 2012 for U.S. Appl. No. 12/981,479.
U.S. Non-Final Office Action mailed Feb. 6, 2012 for U.S. Appl. No. 13/332,196.
U.S. Non-Final Office Action mailed Oct. 12, 2012 for U.S. Appl. No. 13/332,196.
U.S. Non-Final Office Action mailed Jul. 25, 2011 for U.S. Appl. No. 13/098,404.
U.S. Non-Final Office Action mailed Apr. 13, 2012 for U.S. Appl. No. 13/098,404.
U.S. Non-Final Office Action mailed Dec. 27, 2012 for U.S. Appl. No. 13/098,404.
Japanese Office Action dated Nov. 7, 2013 for Japanese Application No. 2012-189845 from Japan Patent Office, pp. 1-4, Tokyo, Japan (English-language translation pp. 1-2).
Japanese Office Action dated Dec. 13, 2012 for Japanese Application No. 2011502073 from Japanese Patent Office, pp. 1-3, Japan (English-language translation included, pp. 1-3).
Canadian Office Action mailed Feb. 25, 2013 for Canadian Application No. 2,677,181 from the Canadian Intellectual Property Office, pp. 1-5, Quebec, Canada.
U.S. Notice of Allowance for U.S. Appl. No. 13/098,404 (357314-991159) mailed Apr. 25, 2013.
U.S. Final Office Action for U.S. Appl. No. 13/332,196 mailed Mar. 21, 2013.
U.S. Final Office Action for U.S. Appl. No. 13/332,196 mailed May 3, 2010.
Notification of Grant of Patent Right for Invention dated Jun. 21, 2013 for Chinese Application No. 200880007398.4 from Chinese Intellectual Property Office, pp. 1-2, Beijing, China (English language translation p. 1).
Japanese Office Action dated Jun. 12, 2013 for Japanese Application No. 2011-502073 from Japan Patent Office, pp. 1-8, Tokyo, Japan (English-language translation included, pp. 1-4).
U.S. Advisory Action for U.S. Appl. No. 13/332,196 mailed May 28, 2013.
U.S. Notice of Allowance for U.S. Appl. No. 13/332,196 mailed Jul. 17, 2013.
Japanese Appeal Decision dated Jul. 17, 2013 for Japanense Application No. 2009-545565 from Japan Patent Office, pp. 1-12 , Tokyo, Japan (English-language translation included, p. 1 ).
European Search Report dated Mar. 24, 2014 for European Serial No. 11769547.8 from the European Patent Office, pp. 1-9, Munich, Germany.
Japanese Office Action dated Dec. 26, 2013 for Japanese Application No. 2013-505113 from Japan Patent Office, pp. 1-7, Tokyo, Japan (English-language translation pp. 1-3).
Canadian Office Action dated Jan. 29, 2014 for Canadian Application No. 2,677,181 form Canadian Intellectual Property Office, pp. 1-3, Gatineau, Quebec, Canada.
Japanese Office Action dated Apr. 9, 2014 for Japanese Application No. 2013-084645 from Japan Patent Office, pp. 1-6, Tokyo, Japan (English-language translation pp. 1-3).
Japanese Decision of Grant dated Jul. 16, 2014 for Japanese Application No. 2012-189845 from Japan Patent Office, pp. 1-3, Tokyo, Japan.
Korean Office Action dated Jun. 27, 2014 for Korean Application No. 10-2012-7028641 from Korean Patent Office, pp. 1-13, Republic of Korea (English-language translation, pp. 8-13).
Korean Office Action dated Jun. 24, 2014 for Korean Application No. 10-2013-7003376 from Korean Patent Office, pp. 1-10, Republic of Korea (English-language translation, pp. 6-10).
Canadian Office Action mailed Jun. 23, 2014 for Canadian Application No. 2,796,119 from the Canadian Intellectual Property Office, pp. 1-3, Quebec, Canada.
Japanese Decision of Final Rejection dated Jul. 23, 2014 for Japanese Application No. 2013-505113 from Japan Patent Office, pp. 1-5, Tokyo, Japan (English-language translation pp. 1-2).
U.S. Non-Final Office Action for U.S. Appl. No. 13/567,516 mailed Sep. 16, 2014.
Communication issued on Mar. 18, 2015 by the European Patent Office in related Application No. 08705466.4.
Campbell et al., "Dig-Music: An on Demand Digital Musical Selection System Utilizing CATV Facilities", IEEE Transactions on Consumer Electronics, IEEE Service Center, vol. 53, No. 3, Aug. 1, 1982, 10 total pages, Cited in comm. issued on Mar. 18, 2015 in App. No. 08705466.4.
Essl et al., "Mobile STK for Symbian OS", Deutsche Telekom Laboratories, Tu-Berlin, 2006, 4 total pages, retrieved from <http://web.eecs.umich.edu/~gessl/georg_papers/icmc2006mobilestk.pdf> , Cited in comm. issued on Mar. 18, 2015 in App. No. 08705466.4.
Chinese Office Action mailed Oct. 10, 2014 for Chinese Application No. 201180027056.0 from the State Intellectual Property Office, pp. 1-23, Beijing, China (English-language translation included, pp. 1-16).
Japanese Final Office Action dated Oct. 27, 2014 for Japanese Application No. 2013-084645 from Japan Patent Office, pp. 1-6, Tokyo, Japan (English-language translation pp. 1-3).
U.S. Non-Final Office Action for U.S. Appl. No. 13/931,683 mailed Dec. 4, 2014.
Korean Notice of Final Rejection dated Jan. 14, 2015 for Korean Application No. 10-2013-7003376 from Korean Patent Office, pp. 1-11, Republic of Korea (English-language translation, pp. 7-11).
Communication dated Nov. 30, 2015, issued by the Japanese Intellectual Property Office in counterpart Japanese Application No. 2013-84645.
Communication dated Dec. 9, 2015, issued by the Korean Intellectual Property Office in counterpart Korean Application No. 10-2013-7003376.

\* cited by examiner

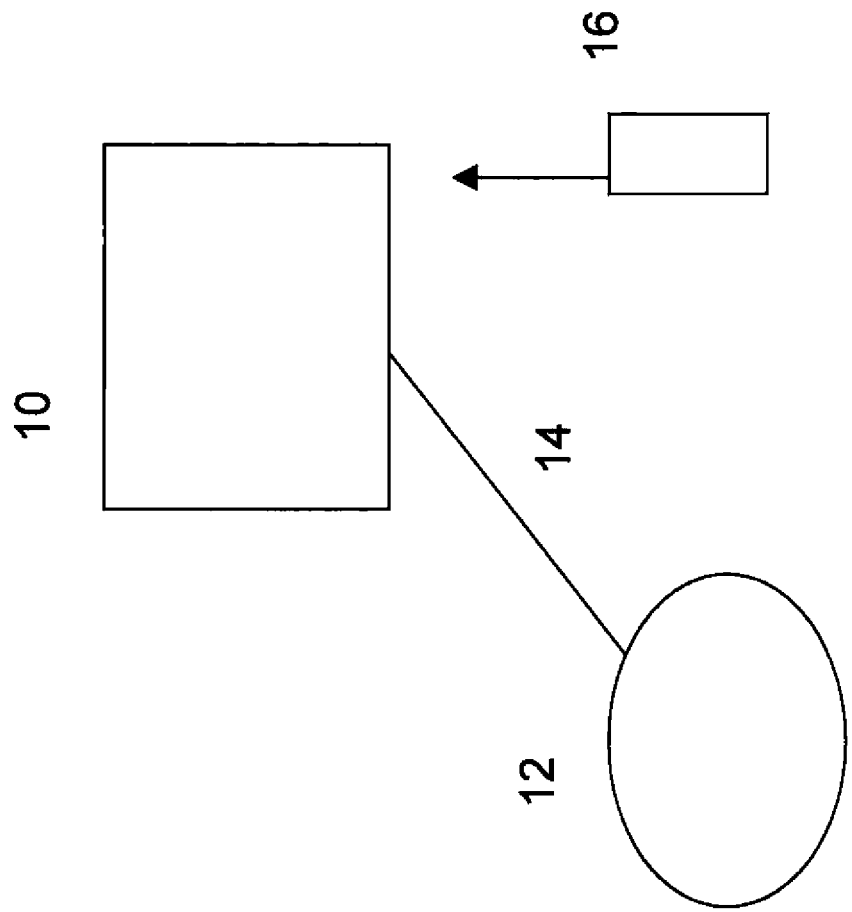

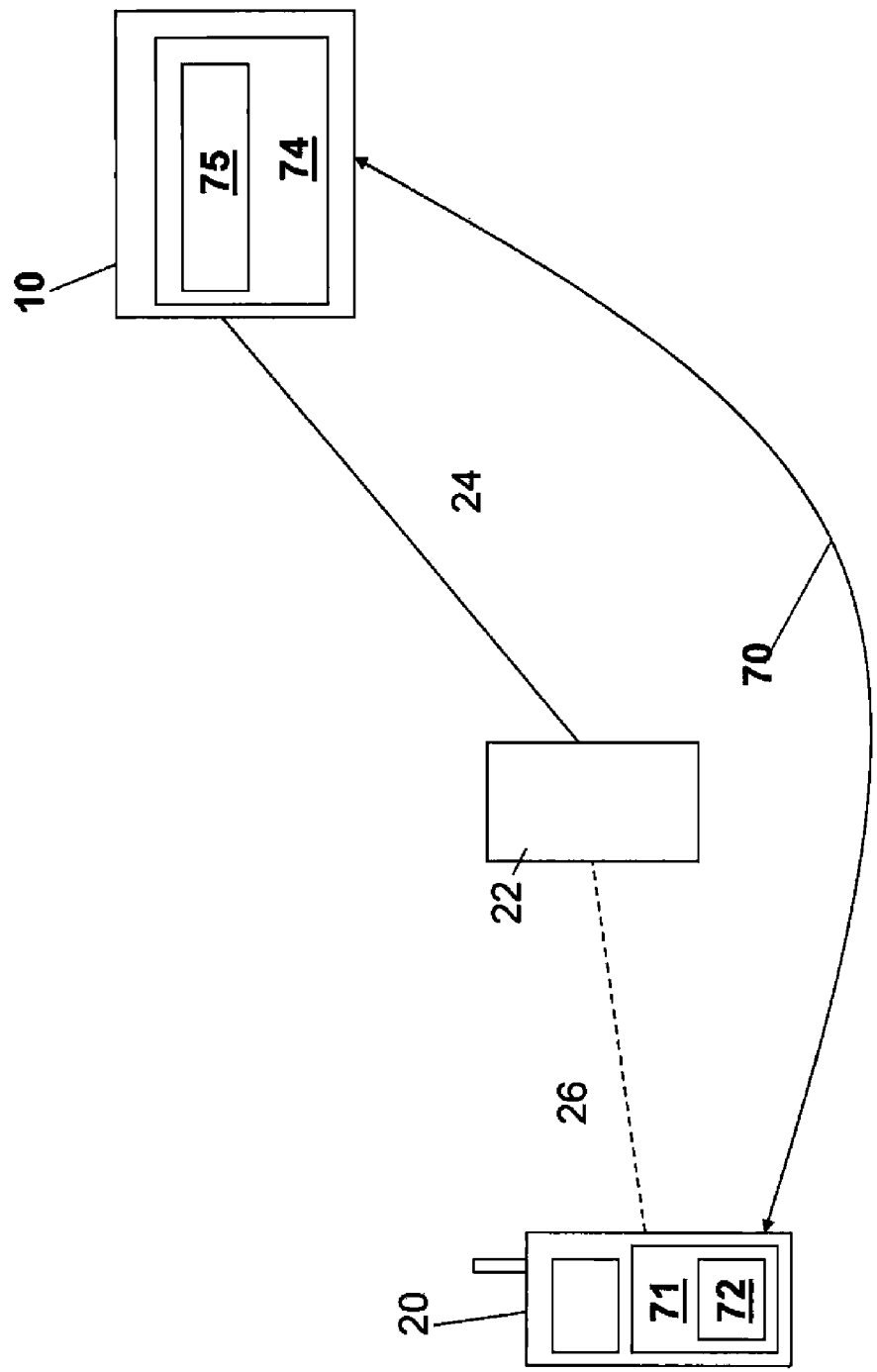

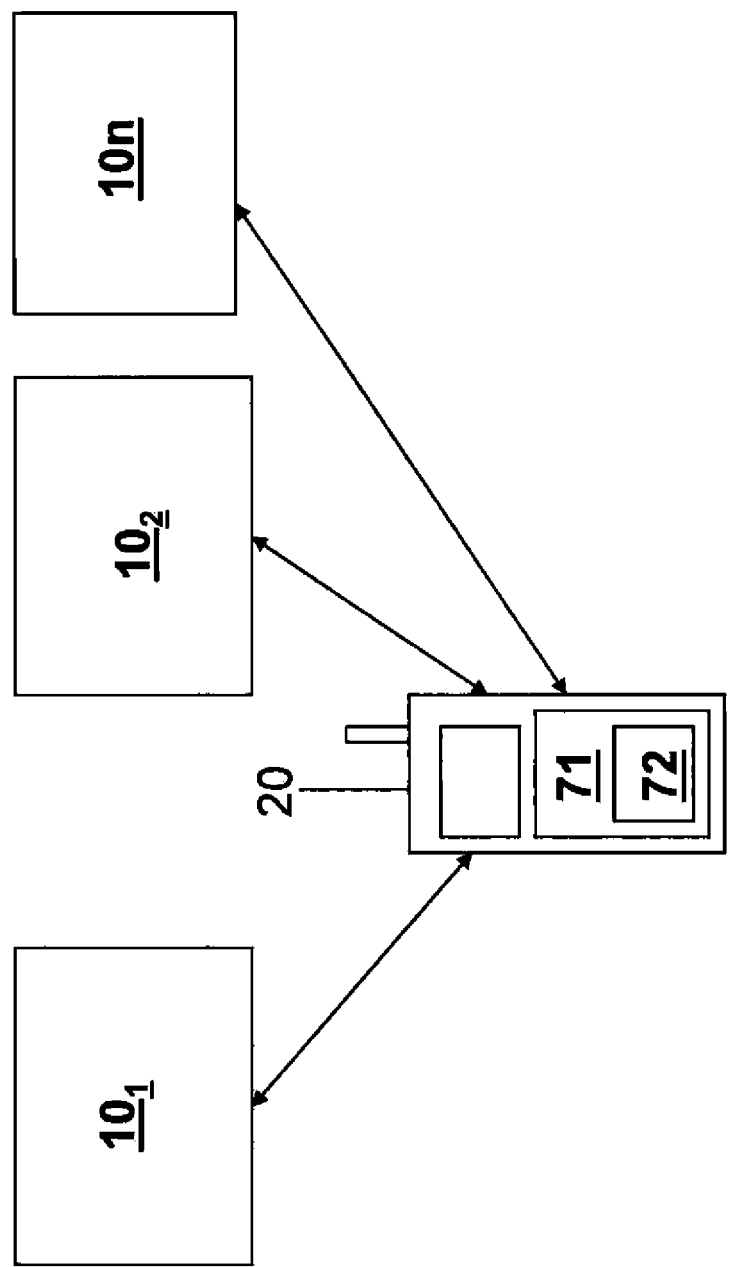

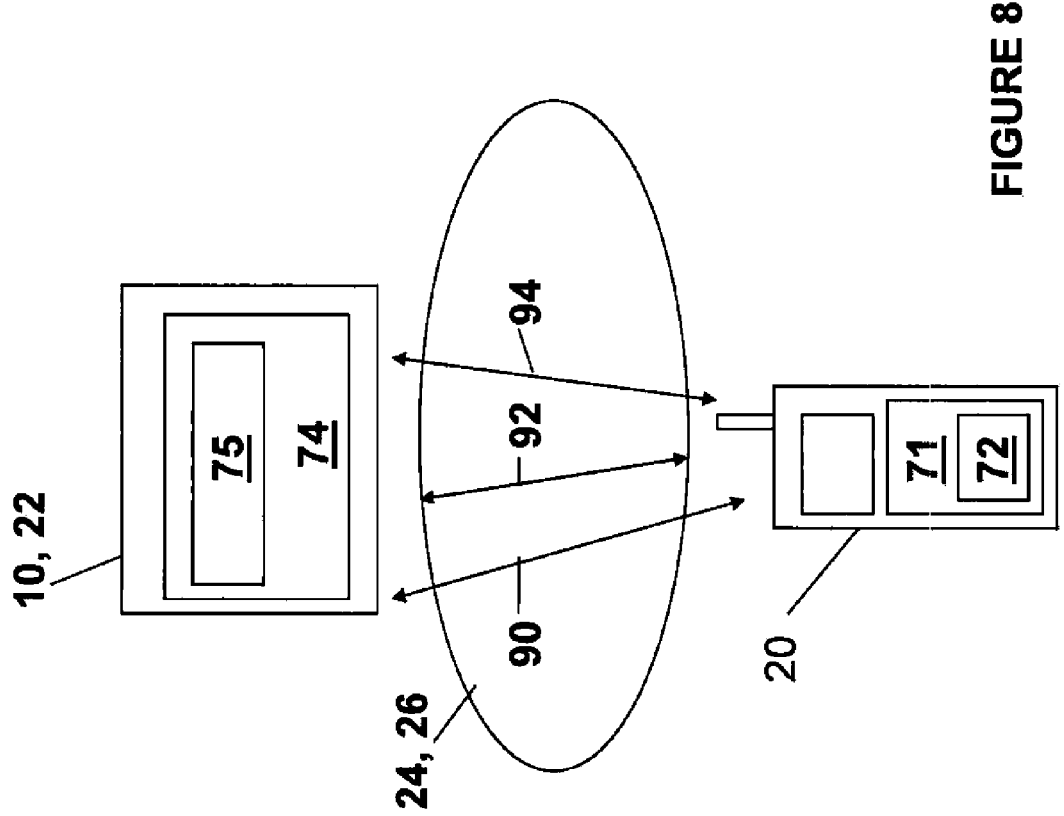

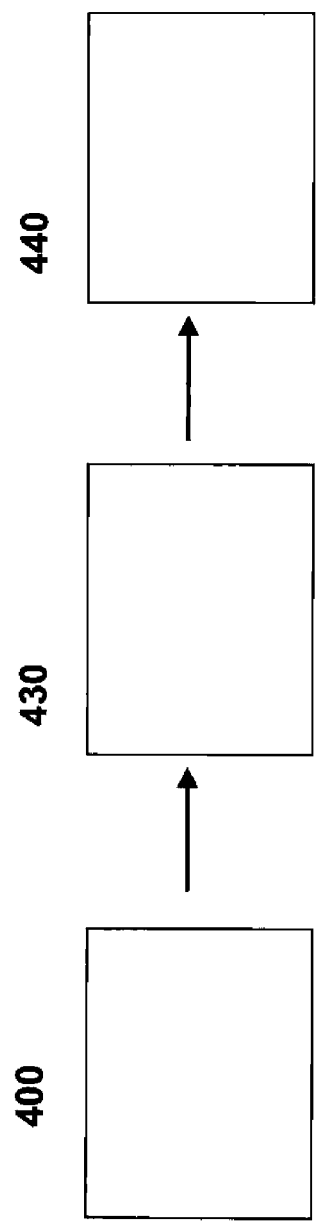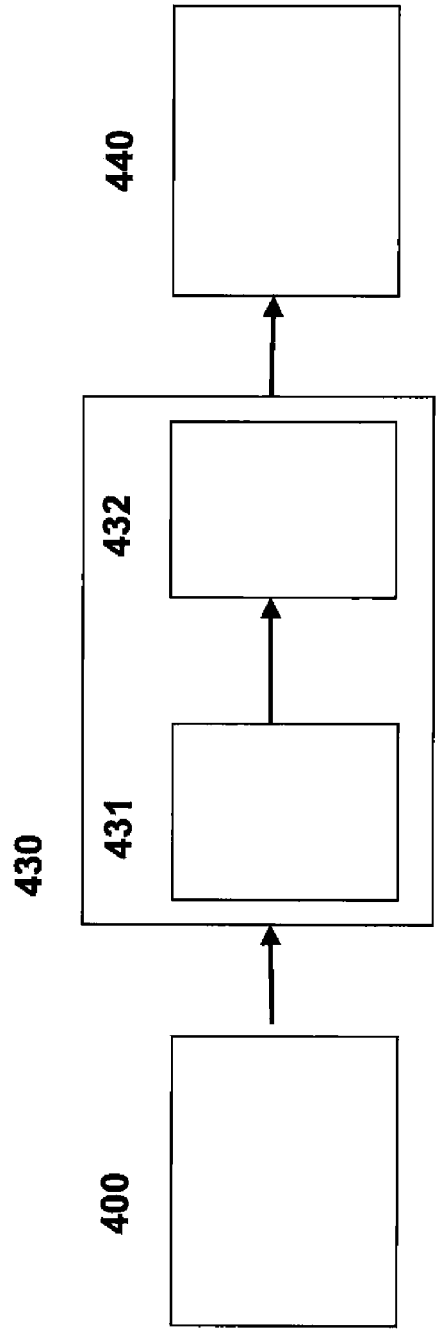

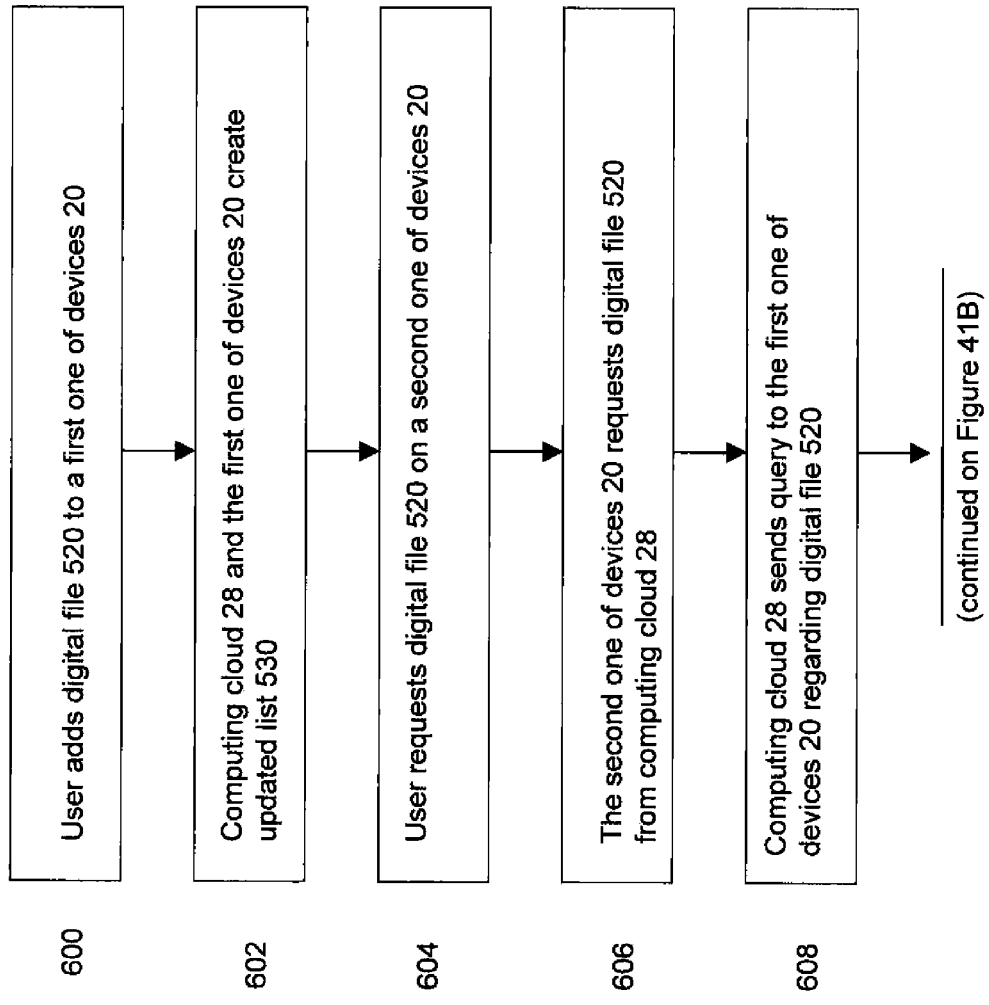

Figure 41B (continued from Figure 41A)

610 — The first one of devices 20 verifies status of digital file 520 and sends response to computing cloud 28

612 — If the first one of devices 20 confirms positive status of digital file 520, computing cloud 28 sends digital file 521 to the second one of devices 20

METHOD AND APPARATUS FOR PROVIDING RECOMMENDATIONS TO A USER OF A CLOUD COMPUTING SERVICE

PRIORITY CLAIM

This application claims the benefit under 35 USC 119(e) to U.S. Provisional Patent Application Ser. No. 61/563,320, filed on Nov. 23, 2011. This application also claims priority under 35 USC 120 and is a continuation-in-part of U.S. patent application Ser. No. 12/761,313, filed on Apr. 15, 2010 and titled "Method And Apparatus For Transferring Digital Content From A Personal Computer To A Mobile Handset," now U.S. Pat. No. 7,937,451, which is a continuation-in-part of U.S. patent application Ser. No. 12/355,546, now U.S. Pat. No. 7,865,572, filed on Jan. 16, 2009 and titled "Method And Apparatus For Transferring Digital Content From A Personal Computer To A Mobile Handset," which in turn claims the benefit under 35 USC 119(e) to U.S. Provisional Patent Application Ser. No. 61/040,131, filed on Mar. 27, 2008, which in turn is a continuation-in-part and claims priority under 35 USC 120 to U.S. patent application Ser. No. 11/788,711, now U.S. Pat. No. 7,865,571, filed on Apr. 20, 2007 and titled "Method And Apparatus For Transferring Digital Content From A Personal Computer To A Mobile Handset," which in turn claims priority under 35 USC 119(e) and 120 to U.S. Provisional Patent Application Ser. No. 60/879,416 filed on Jan. 8, 2007. U.S. Provisional Patent Application Ser. No. 61/563,320, filed on Nov. 23, 2011, of which this application claims the benefit, also claims priority under 35 USC 120 and is a continuation-in-part of U.S. patent application Ser. No. 12/414,548, filed on Mar. 30, 2009 and titled "Content Based Social Networking System and Method." All of these preceding applications and patents are incorporated by reference herein.

FIELD

The embodiments relate generally to a method and apparatus for generating recommendations for the user of a cloud computing service.

BACKGROUND

With the increase in storage capacity of hard disk drives and the prevalence of optical CD and DVD drives, users now can store their entire musical libraries on their personal computer (PC). For example, various software programs such as iTunes (offered by Apple Computer) allow a user to load musical content from CDs, store it on the computer's hard disk drive, organize the different content, and then play the music on the PC or burn all or part of the musical collection onto a CD or DVD. Users also can transfer the musical files to other devices, such as an iPod (offered by Apple Computer) or an MP3 player. These transfers typically require a direct, hardwired connection between the PC and the device, such as through a USB cable.

In recent years, mobile handsets (such as cellular phones and PDAs) have evolved beyond mere telephone and data collection devices. For example, many cellular phones now have sophisticated display screens and audio capabilities. Various companies (including mSpot, Inc., the assignee of this application), offer audio and video content that is "streamed" to the cellular phone using a wireless cellular network. This allows cellular phone users to listen to music or other audio content and watch movies or other video content on their cellular phones. However, the user's choices are limited to the content offered by the provider. What is needed in the art is a system that allows a user of a mobile handset to obtain digital content that he or she previously had stored on a personal computer or other device by downloading the content over a wireless network and to store it on the mobile handset.

In addition, today's systems offer fragmented digital content services that require a user to go to different web-sites, different devices or different services to be able to gain access to their digital content, such as Internet radio, music collections, news, local radio and full track music for example. Thus, it is desirable to provide a system that can store all of the different types of digital content in one location and allow the user to access the digital content and it is to this end that the disclosure is directed.

In addition, with the vast volume of digital content that is stored and potentially can be stored in a computing cloud, it is desirable to provide recommendations to users who access the computing cloud to assist them in finding digital content that is correlated with their personal preferences and patterns. It would also be desirable for the recommendations to be based at least in part on the preferences and patterns of members of a user's social network.

The prior art also includes digital content players, such as iPods or other computing devices, that allow a user to select a playlist or other grouping of digital content and to play an item in that playlist or other grouping, and then once the player has finished playing that item, to select another item from that playlist or grouping and begin playing that item without further user instruction. Using this prior art device, the player will always be playing digital content and the user can enjoy the content without constantly instructing the player what to play next. The prior art also includes a queuing feature, such as on the Rhapsody music service, whereby a user can create a queue of digital content and then the computing device plays items in the order contained in the queue. Once the computing device finishes playing all of the items in the queue, the computing device typically will have nothing left to play and will remain idle until further instructed by the user. This results in an undesirable downtime where nothing is being played. In addition, in the prior art, if the user is playing items in the queue and then selects an item that is not in the queue (for example, a song that is listed elsewhere), the computing device typically will stop playing items in the queue and will start playing the item selected by the user. Once that item is done playing, the computing device will have nothing to play and will go into downtime again. It would be desirable to create an improved system whereby the user can create a queue, while the queue is playing select an item that is not in the queue, and then have the system automatically play other items within the selection from which that item was chosen so there is no downtime.

BRIEF DESCRIPTION OF THE DRAWINGS

FIG. 1 is a block diagram of the prior art system involving a PC and an audio device such as an iPod or MP3 player and/or a portable storage device;

FIG. 5 illustrates another embodiment of the system that allows a mobile handset to share content with a computing device;

FIG. 6 illustrates another embodiment of the system that allows a mobile handset to share content among a plurality of computing devices;

FIG. 7A illustrates a piece of content segmented into smaller pieces;

FIG. 7B illustrates a method for downloading content to a mobile device that does not support progressive downloading;

FIG. 8 illustrates a network aware mobile handset application of the content sharing system;

FIG. 35 illustrates an implementation of an embodiment for a recommendation engine.

FIG. 41 illustrates another embodiment of a system and method that allows a device to download music from a computing device;

DETAILED DESCRIPTION OF ONE OR MORE EMBODIMENTS

FIG. 1 depicts the prior art system in which a user stores digital content (such as music, video, etc.) on computer 10. Computer 10 can be a desktop, notebook, server, or any other type of device that can store digital data. User connects portable entertainment device 12 to computer 10 using interface 14. Portable entertainment device 12 can be an iPod, MP3 player, or any other device that can store and play digital content. Interface 14 is a direct connection between computer 10 and portable entertainment device 12 and typically is a USB cable or Firewire cable.

In the alternative, a user can connect portable storage device 16 to computer 10 to download the digital data, and then disconnect portable storage device 16 from computer 10 and then connect portable storage device 16 to portable entertainment device 12 to download the data onto portable entertainment device 12. Portable storage device 16 can be a Flash ROM chip, a hard disk drive, or other storage device.

Figure 2A:
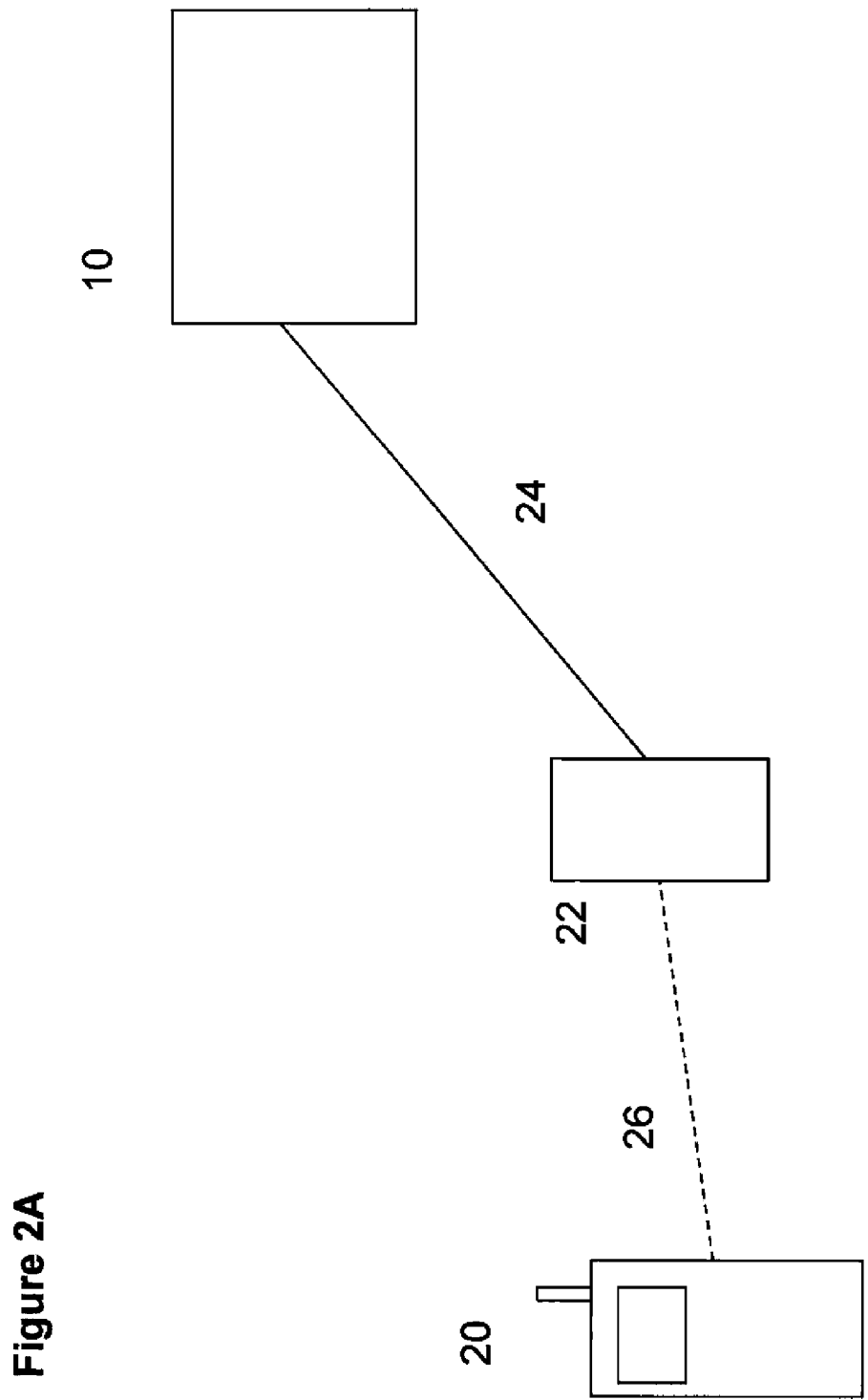
FIG. 2A illustrates a first embodiment of a system that allows a device to download music from a computing device using a wireless network and the Internet.

FIG. 2A depicts a first embodiment of a system that allows a mobile handset to download digital content from a computer using a wireless network. As in the prior art, a user stores digital content (such as photos, music, videos, Internet radio, news, local radio, podcasts, etc.) on a computing-based system 10. However, in this embodiment, the user downloads the digital data from computer 10 to a device 20 in a wireless fashion over a wireless communication path. Device 20 may be a PDA, mobile phone, wireless email device (such as the Blackberry), or other handheld device that has wireless connectivity to be able to communicate with the computer 10 and download digital content from the computer 10. Computer 10 communicates with a device 22, such as a server computer, over network 24. Network 24 can be any type of network, such as the Internet, and can be hardwired, wireless, or some combination of the two. Computer 10 runs a software application that allows a user to catalog and organize the digital content of the user. The device 22 can be accessible over the Internet (such as through a URL address). The device 22 is shown in FIG. 2 as a single device. However, it is to be understood that the device 22 can instead comprise multiple devices, such as multiple servers.

Device 20 connects to device 22 over a wireless network 26. Wireless network 26 can be a cellular telephone network, a WiFi network (such as an 802.11 network), a wireless data network (such as EV-DO, EDGE, 3G or LTE), WiMAX, a broadband network or any other wireless network. It is to be understood that wireless network 26 need not connect directly to server device 22, but instead can connect through an indirect means such as by the Internet or through another network. The embodiment will be further described with reference to FIG. 3.

Figure 2B:
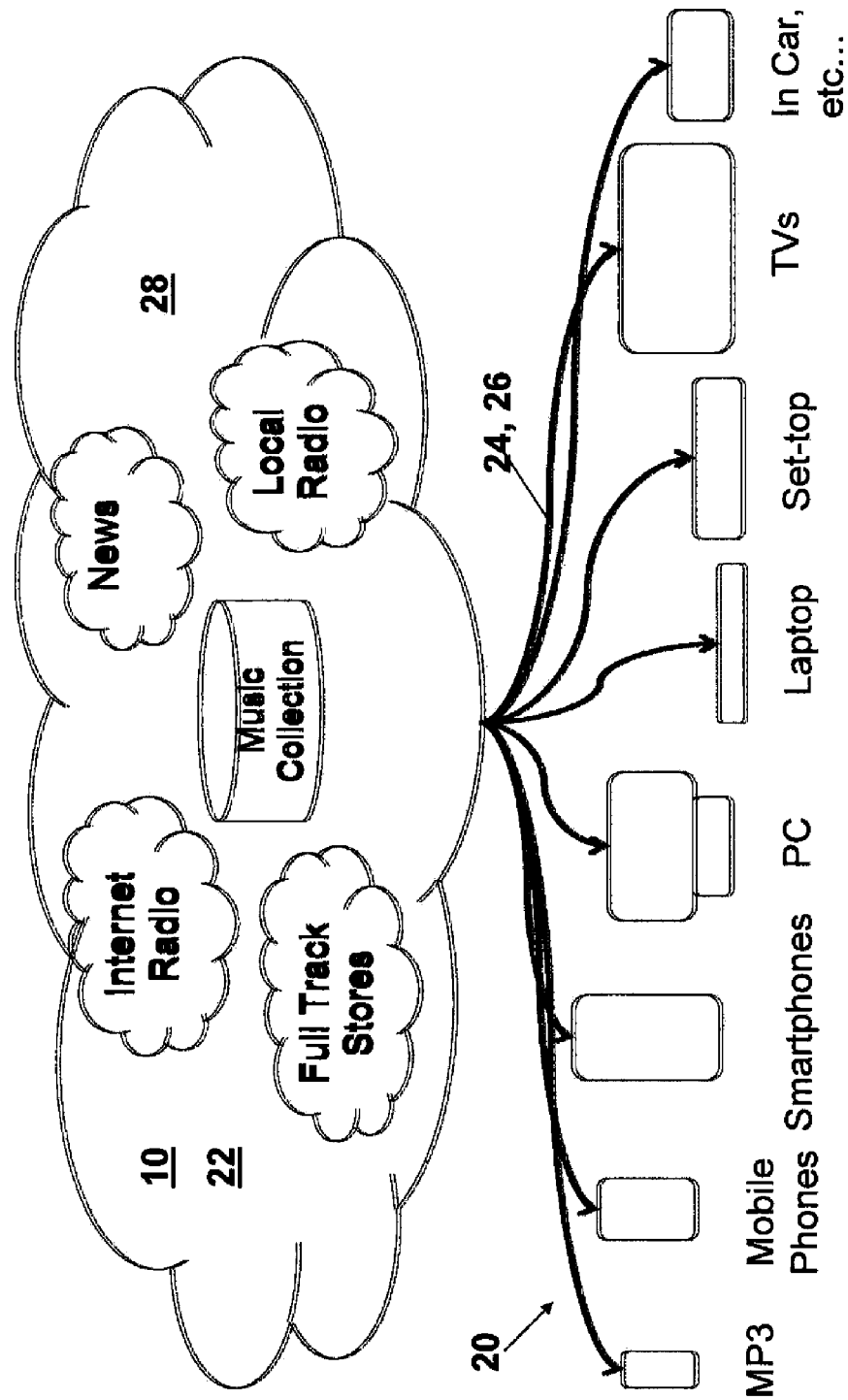
FIG. 2B illustrates a second embodiment of a system that allows a device to download music from a computing device using a wireless network and the Internet.

FIG. 2B illustrates a second embodiment of a system that allows a device 20 to download digital content from a computing device 28 using a wireless network and the Internet 24, 26. In this embodiment, the computing device 28 may be a computing cloud (with a plurality of processing unit based devices, storage devices, etc.) that allows a user to store their digital content in a digital content store for the user. Thus, in this embodiment, the computing device may include the computer 10 and the device 22 described above. As shown, the cloud may store the various digital content, such as photos, ringtones, Internet radio, full track stores, music collections, news and local radio, in a store associated with the user so that access to the digital content of the user is limited to the user and other authorized people and devices 20. Thus, the user can connect to the cloud to interact with their digital content that is no longer siloed on a particular device or in a particular location. In this embodiment, each device 20 may be a processing unit based device with sufficient processing power, memory and connectivity, such as an MP3 player, smart phones, mobile phones personal computer, laptop, set-top box, television, in car digital content system or game consoles, to interact with the computing device 28 and play/display/interact with the digital content using the application described below. Each device may also have a digital content store that may be implemented in software and stored in the memory of the device. The system may also use various applications/access devices/application to access the digital content on the computing device 28 since the digital content can be accessed using typical browser applications, facebook or other applications or proprietary mobile device applications and browsers.

In this embodiment, each device 20 may include an plug-in/application/plurality of lines of code that is downloaded/stored on the device 20, stored in the memory of the device and executed by the processor of the device wherein the plug-in/application/plurality of lines of code, among other things, implements a digital content user interface on each device as described below in more detail. Each plug-in/application/plurality of lines of code on each device may also automatically in the background (passive sync) or when a low cost network is available, transfer all of the digital content on the device up to the computing device 28 to provide for the intelligence upload of the digital content. The plug-in/application/plurality of lines of code on each device may also actively sync the digital content (an active process that syncs the digital content), batch sync the digital content (synchronize a group of pieces of digital content at a predetermined time, periodically or when a particular link is available) or a priority sync.

In the priority sync, the pieces of digital content for each user are prioritized and then synchronized between the device(s) and the content store based on the priorities. The priorities can be determined based on manual prioritization or automatic prioritization (based on storage size limits or scoring of the digital content) or a combination of manual and automatic prioritization. The automatic prioritization can be manually overridden by the user. Manual prioritization allows the user to designate certain pieces of digital content so that those pieces of digital content are synched first. In one implementation, all manual prioritized digital content is synched before other digital content. The storage size limits prioritization may prioritize the digital content for synching based on the overall size of the digital content in the collection of the user, the size of the digital content store in the cloud of the user and/or the storage size of a particular device 20. The scoring of the digital content may use one or more different metrics, such as for example the number of times a piece of digital content has been played, whether a piece of digital content appears on a playlist, whether or not the piece of digital content was recently added/purchased by the user, the popularity of the piece of digital content, etc.) to rank each piece of digital content and sync the digital content based on the rankings. When the manual and automatic prioritization are used together, the content system may, for example, include all manually prioritized digital content, and then include as much of the automatically prioritized digital content for the storage size available (on the cloud/computer or on the device) unless the user has overridden the automatically prioritized digital content.

Figure 26:
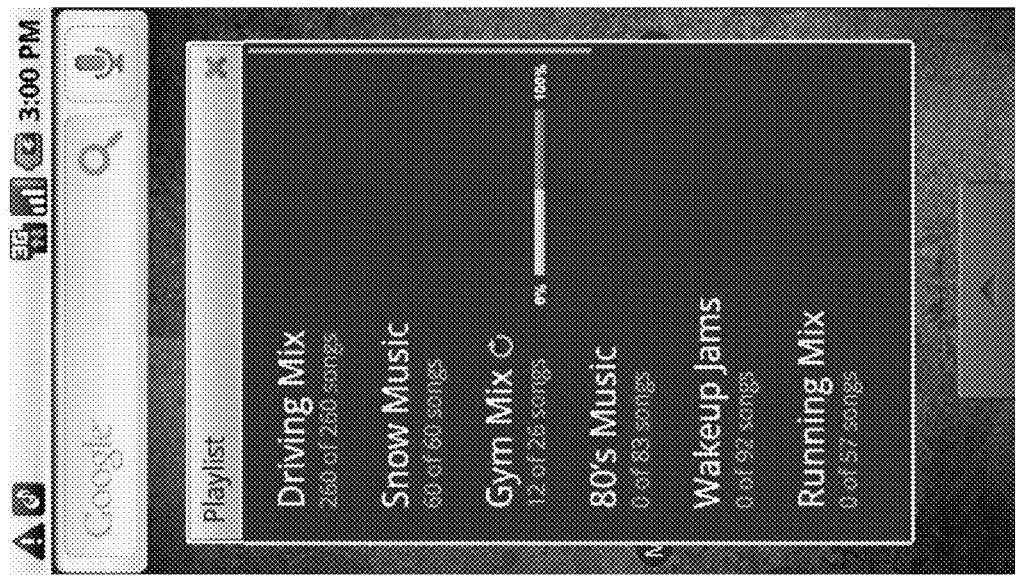
FIG. 26 illustrates an example of live folders of the digital content system on a particular device.

At all times, each plug-in/application/plurality of lines of code on each device 20 may have a list of the digital content of the user (which may be just the content on the device or all of the content of the user), but the actual digital content filed may be stored in the computing device 28. The plug-in/application/plurality of lines of code on each device 20 may also include a digital content replacement process to ensure that each device has sufficient memory space to store the newest downloaded digital content. The replacement strategy may be a least recently used strategy (where the least recently used digital content is deleted), a least recently played strategy and the like. In addition, for certain devices 20 that allow multiple executive threads (such as devices using the Android operating system, for example), the plug-in/application/plurality of lines of code may incorporate a background process that synchronizes the digital content list to the device without user involvement. FIG. 26 illustrates an example of a user interface of this type of device that provides live folders and background synching.

In the embodiment shown in FIG. 2B, the content store in the cloud 28 or computer 10 may store digital content for each household member/member of the group that owns the digital content. Then, each user or each device 20 may select some portion or all of the entire digital content store for the group to synchronize to the device 20 of the user. For example, in a family with a father, a daughter aged 12 and a son aged 16 who share the digital content store in the cloud 28, the father, daughter and son may have different musical tastes, for example, and therefore each of the father, daughter and son may synchronize (using playlists, etc.) a subset of the entire digital content store to their personal device. The owner of a particular content store in the cloud 28 or computer 10 may also be allowed to authorize one or more additional devices 20 (up to N devices) to synchronize with the content store such as to allow a new device to use the digital content in the content store.

In addition to the downloading and exchanging of the digital content between the device 20 and the computer 10, the second embodiment of the system also allows a user to directly transfer digital content between the various devices 20 using a wired or wireless connection. In one implementation, the computing device 28 may include a manager unit (that may be implemented in software on a server computer that is part of the overall computing device 28) that manages the device 20 to device direct transfer of digital content (authentication, protocols, etc.) and the devices 20 interact with the manager unit. In another implementation, the plug-in/application/plurality of lines of code each device may include lines of code to implement the direct transfer of digital content since each device is aware of its neighbors of certain networks, such as LANs, and can thus initiate a transfer of the digital content. The device to device transfer may occur over a hardwire link, such as a USB cable or a LAN, a wireless link, such as Bluetooth, Wifi or 3G, or using a hardware device, such as an SD card. The system may select the fastest link available when transferring the digital content. The device to device transfer may be controlled/managed by a computer of the content system. For example, the computer of the content system may determine the identifier of each device that wants to participate in the direct transfer, authenticate that each device is authorized to synchronize with the content store and then allow the direct transfer if both device are authenticated. The computer or each device may determine the appropriate link over which to exchange the digital content.

The synching of digital content directly between devices as well as the synching between the computer/cloud 10, 28 can be managed in a number of ways. For example, the synching can always operate over the lowest cost network available to reduce the data costs. For the device 20 that is plugged into a power source, synching can be done in the background since the synching will not drain the battery of the device whereas a device operating on battery power may deactivate background synching or slow down the synching even if a fast network is available to prevent battery drain. On a computer 10, the content system may throttle the synching based on the other usage of the computer by the user. For example, when the screen saver is active (meaning no use by the user), the synching may go as fast as possible whereas when the computer is being used by the user for other activities, the synching process may be reduced so that the synching does not interfere with the overall operation of the computer.

Figure 3:
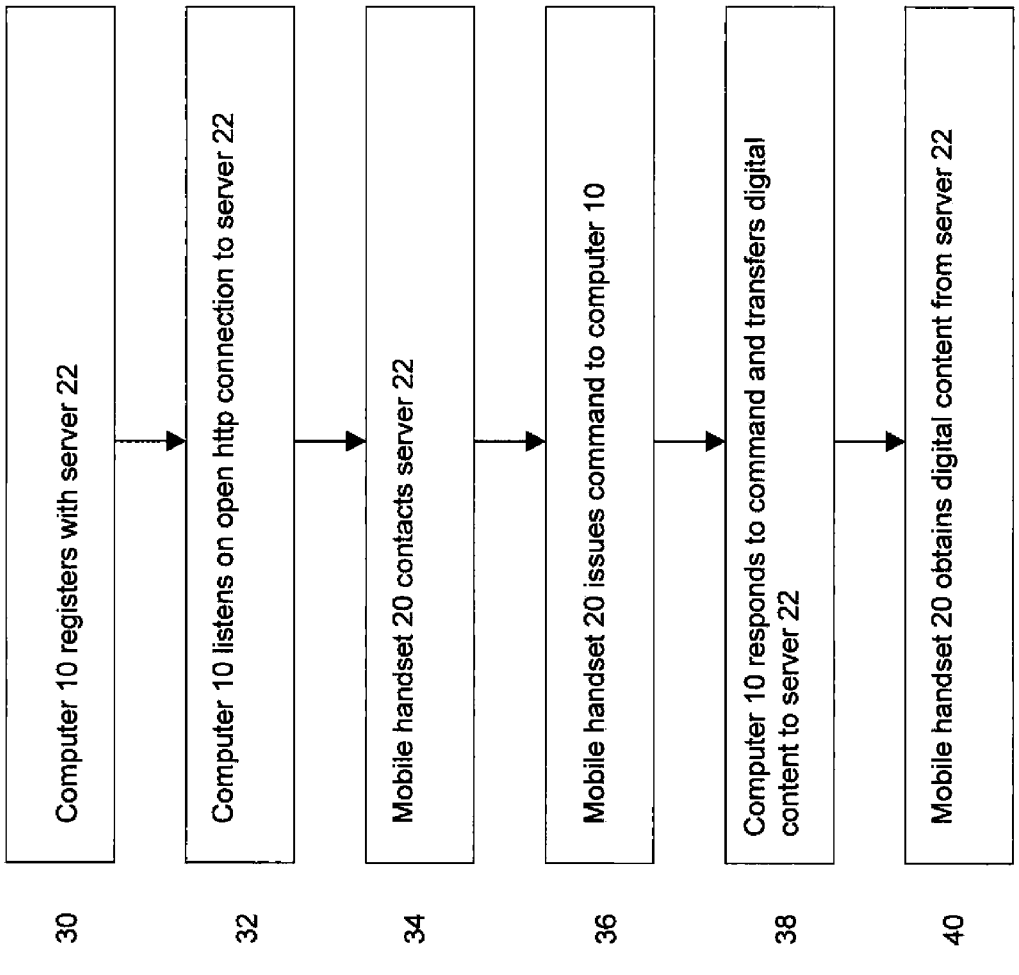
FIG. 3 is a flowchart showing a method for downloading music from a PC to a mobile handset.

FIG. 3 is a flowchart depicting the interaction of the various elements shown in FIG. 2. Computer 10 connects to device 22 over network 24. Computer 10 then registers with device 22 (30) so that device 22 associates the digital content in the computer 10 with a particular user and a particular mobile handset. Computer 10 then listens on an open http connection to device 22 (32) and waits for communications from server device 22. Mobile handset 20 contacts server device 22 (34) over wireless network 26. Once the computer 10 is registered with the device 22, the user of the mobile handset, when the handset is turned on, sees the digital content actually stored on the mobile handset as well as the digital content stored in the computer 10 in a single display as shown in more detail in FIG. 4. When the user of the mobile handset wants to use a piece of digital content stored on the computer 10, the mobile handset 20 issues a command to computer 10 (36), such as a command to transfer a certain piece of digital content. Computer 10 responds to the command and transfers the digital content to device 22 (38). Mobile handset 20 then obtains digital content from device 22 (step 40). Thus, mobile handset 20 is able to obtain digital content (such as a music file) from computer 10 in a fashion that is at least partly wireless. Using the above system and method, a user may have digital content stored on his/her computer as well as on the mobile handset and may synchronize the digital content between the computer and the mobile handset in a wireless manner. For example, the system permits a user to have a much larger digital content catalog available for use than can be stored in the mobile handset. In addition, the system permits the user to download particular digital content at any time, such as downloading a particular movie before a long airplane flight. The user also can download additional data associated with the digital content, such as metadata (artist information, duration, title, etc.), cover art, and other data.

Figure 4:
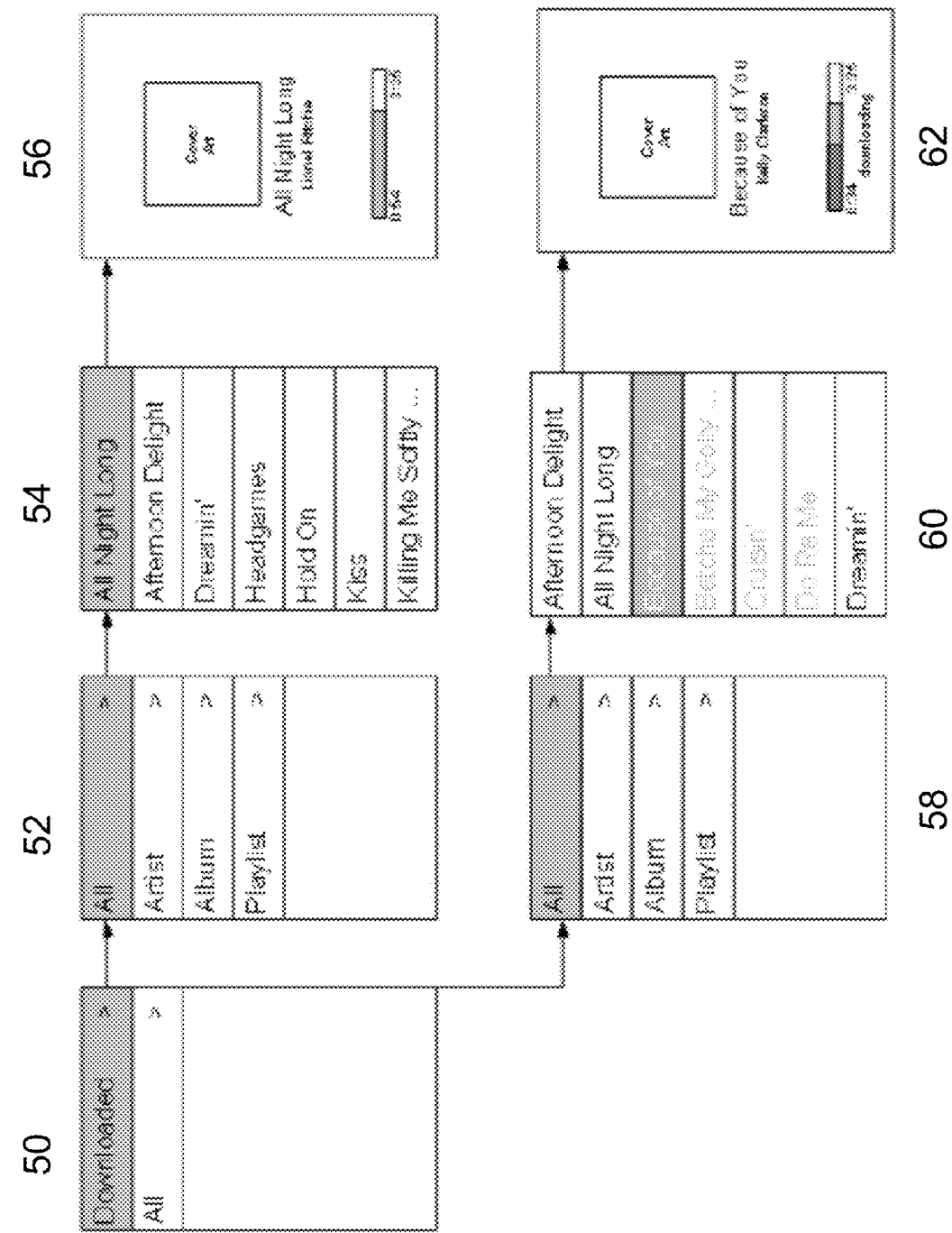
FIG. 4 shows an example of a user interface on the mobile handset for downloading music from a PC to the mobile handset.

FIG. 4 shows an embodiment of a user interface for mobile handset 20 once the computer 10 is registered with the device 22. FIG. 4 shows a number of different screens that might be displayed on mobile handset 20. These screens are generated by a software application running on mobile handset 20. The software application on the mobile handset obtains (when the digital content is not already stored in the mobile handset), organizes, displays (both digital content on the mobile handset and the computer 10), stores and plays digital content and can generate the user interface described below.

Screen 50 provides the user with two choices—to view a list of files that have been downloaded from computer 10 ("Downloaded") and are stored on the mobile handset, or to view a list of all files ("All") including the digital content stored on the mobile handset and the digital content stored on the computer 10. If the user selects the "Downloaded" option, then in screen 52, the user can then choose a subset of the files (by artist, album, or playlist) or to view all of them. If the user selects "All," then mobile handset 20 displays all available music files, including files that have been or can be downloaded from computer 10. In this embodiment, song titles in normal, black text already have been downloaded to mobile handset 20, and song titles in gray text have not yet been downloaded but can be downloaded. In Screen 54, the user selects the song "All Night Long," which already has been downloaded, and in Screen 56, the song plays on mobile handset 20 while cover art and other relevant information is displayed for the song "All Night Long."

When the user selects the "All" option in screen 50, the user is presented with a menu (58) that permits the user with options to view all of the digital content (both stored on the mobile handset and stored on the computer) including "All", by Artist, by Album and/or by Playlist. When the user selects to view all of the digital content (which are songs in this example), a screen 60 shows all of the digital content (both on the mobile handset and on the computer) wherein certain pieces of digital content are shown in gray text indicating that those pieces of digital content are stored on the computer and are available for download to the mobile handset and other pieces of digital content are shown in black indicating that those pieces of digital content are stored on the mobile handset. If the user selects "Because of You" (which is shown in gray text), mobile handset 20 then issues a command to computer 10 (36), such as a command to transfer the song "Because of You" from the computer to the mobile handset. Computer 10 responds to the command and transfers the requested digital content to server device 22 (38) and the mobile handset 20 then obtains the digital content from server device 22 (40). Once the piece of digital content (or at least a buffer full of the piece of digital content as the piece of digital content continues to download in the background) is downloaded to the mobile handset, screen 62 then shows the cover art and other relevant information for the song "Because of You" as the song is being played. When the digital content is downloaded onto mobile handset 20, it is played on mobile handset 20 and is also stored in a storage system within mobile handset 20 (such as on Flash RAM chip or disk drive) while it is being played. The digital content (a song in the example in FIG. 4) is thus added to the music collection stored on mobile handset 20. When that song is displayed in a menu in the future, it will be displayed in normal, black text rather than gray text since it has now been downloaded and stored on mobile handset 20.

In this manner, the digital content on mobile handset 20 can be synchronized with the digital content on computer 10 in a wireless fashion. This allows a user to listen to or watch the digital content that is stored on computer 10, even when the user is in a location remote from the computer 10.

Device 22 can implement security or verification measures to ensure that the person operating mobile handset 20 is the same person who owns computer 10, for copyright protection and other reasons. For example, device 22 can require that computer 10, when the computer registers with the device 22, provide device 22 with the phone number for the mobile handset that will be allowed to access the digital content stored on computer 10. When mobile handset 20 then contacts device 22 with a request to obtain data from computer 10, device 22 can then determine if the phone number associated with mobile handset 20 is the same phone number that previously had been registered by computer 10. Device 22 can be designed to proceed with the requested transfer only if the two phone numbers match. Other security or verification measures can be implemented, and this example is only illustrative.

Mobile handset 20 may include circuitry for running an operating system and applications, circuitry for processing data and metadata, and circuitry for rendering and playing the digital content, such as audio content and video content. All of the circuitry can be contained in a single integrated chip, in multiple integrated chips, or in a combination of some number of integrated chips and other electronic components.

A user of mobile handset 20 can run various applications on the handset, such as an application that enables the user to listen to music or to watch video content. Mobile handset 20 can include a video display and a speaker, which would enable a user of mobile handset 20 to watch video content on the video display and listen to audio content through the speaker.

FIG. 5 illustrates another embodiment of the system that allows a mobile handset 20 to share content with a computing device 10. In this embodiment, the mobile handset 20 can share content with the computing device 10 through the device 22 (as described above), but may also share content/synchronize content with the computing device 10 over a link 70, such as a cable, a docking station, by removing a memory card from the mobile handset 20 and reading the memory card using a memory card reading device coupled to the computing device 10 or by other wireless protocols such as a Bluetooth network. In this embodiment, the synchronization of the content over the two different methods (through the device 22 and over the link) requires that the system tracks the synchronization by both methods. The system may also permit multiple computing devices and multiple handsets (assuming that the user has the proper authorizations to share the content) to share the content.

The mobile handset may include a content store 71, such as a database, that may include one or more playlists 72 and the computing device 10 may a content store 74, such as a database, and one or more pieces of content 75. In the computing device 10, the one or more pieces of content may have a plurality of different formats (such as MP3, AAC, ACC+, m4a for music content) and the system may be used with multiple different types of content including music content, photo content, file content, video content, podcasts and any other type of digital content. The computing device, using the content store 74, identifies any new content files so that those new content files can appear in the user interface of the mobile handset described above and new files downloaded directed to the mobile handset appear in the master content store maintained on the computing device 10. The content store 71 on each mobile handset may include an identification code (ID) so that the computing device 10 may contain a plurality of content stores for a plurality of mobile handsets wherein the content stores for each mobile handset are distinguished by the identification code. A user can also create a new playlist on the mobile handset that is stored in the content store 71 and then is synchronized back to the computing device 10 so that the computing device also maintains the playlists for the particular mobile handset in the content store for that particular mobile handset as identified by the identification code.

In the system and method described above, the playlists generated on the mobile handset may be an on-the-fly playlist which allows content (both local to the mobile handset and the computing device 10 as well content from any source that can be later pulled down to the mobile handset) to be stored into a playlist on the mobile handset. As above, the on-the-fly playlist may be synchronized back to the computing device 10. In addition, when content stored on the computing device changes (content is removed, for example or the user no longer has rights to play a particular'piece of content), the on-the-fly playlist (and other playlists on the mobile handset) are automatically updated to reflect those changes.

FIG. 6 illustrates another embodiment of the system that allows a mobile handset 20 to share content among a plurality of computing devices wherein the mobile handset has the content store 71 and playlists 72. As shown, the system permits the mobile handset 20 to synchronize its content with a plurality of computing devices $10_1, 10_2, \ldots, 10n$ and each computing device maintains a content store of the content on the mobile handset. For example, in a family in which the different family members each have their own computing device, the mobile handset of a particular family member can be synchronized to the multiple computing devices so that the content purchased by each member of the family can be shared. Similarly, the system permits multiple mobile handsets to synchronize their content with a single computing device (such as might be the case of a family) or multiple mobile handsets can synchronize their content with multiple computing devices. Thus, the system permits the computing devices to effectively share content between the computing devices.

Figures 7A, 7B:
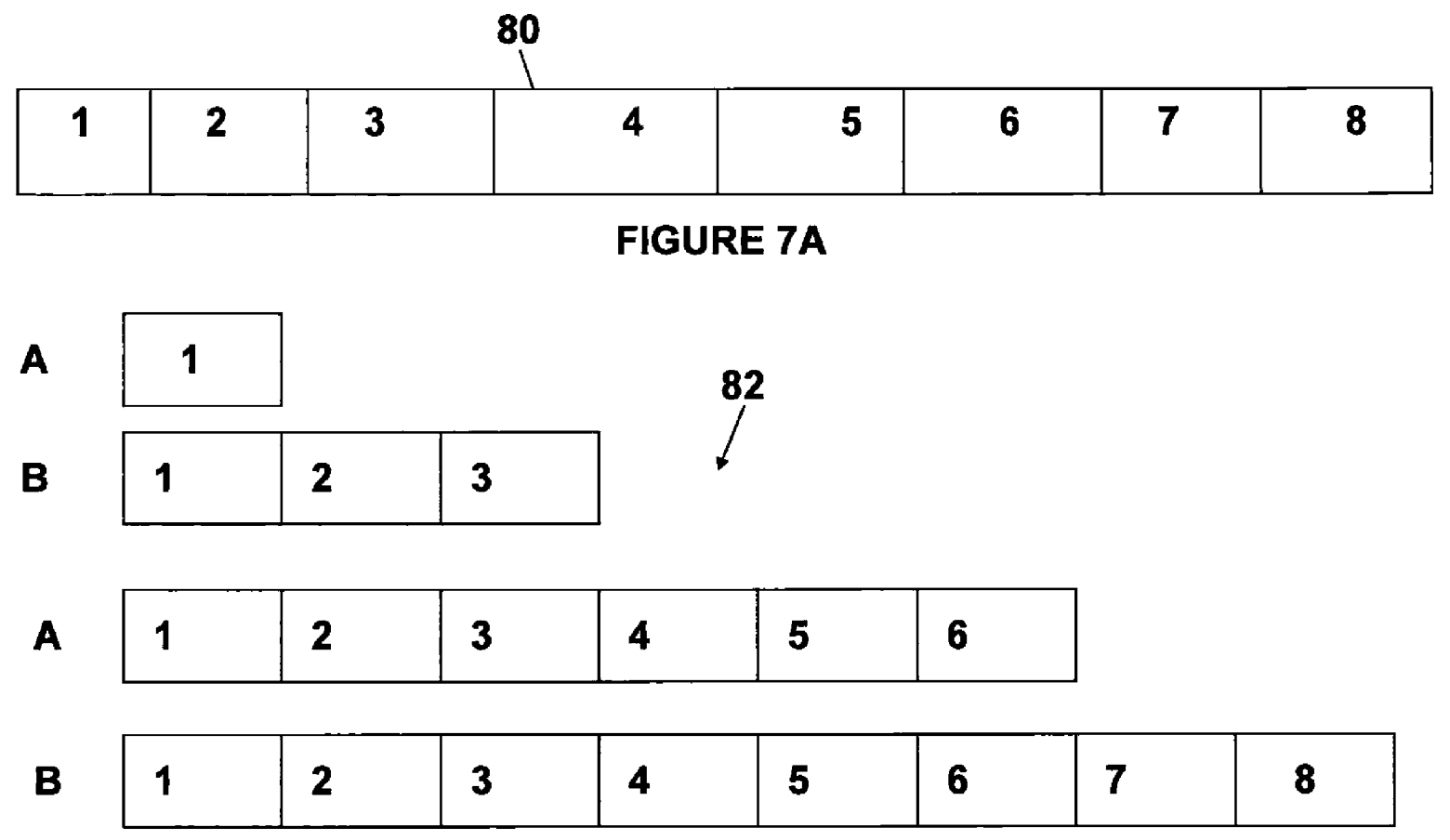

FIG. 7A illustrates a piece of content 80 segmented into smaller pieces. In most mobile handsets, it is not possible to download an entire piece of content (or the downloading of the entire content causes an unacceptable delay in the user experience) so that the piece of content is segmented into segments, such as segments 1-8, in order to download the segments to mobile handset. For example, the system is able to download the segments in sequential manner and therefore begin to play the piece of content prior to the entire piece of content being downloaded to the mobile handset that provides a better user experience. A mobile handset, depending on the type of mobile handset, may have a progressive download mode. In the progressive download mode, the mobile handset can start the download of the segments and then start to play the content while the remainder of the segments of the content are downloaded to the mobile handset. If the mobile handset is capable of progressive downloading, then the downloading of the content to the mobile handset is straight-forward. However, if the mobile handset does not support progressive downloading (which is the case for most mobile handsets such as mobile phones), a buffering method is used to permit the segmentation of the content and then the downloading of the segments of the content.

FIG. 7B illustrates a method for downloading/streaming content to a mobile handset that does not support progressive downloading. When the mobile handset does not support progressive downloading, the mobile handset does not permit any download into a buffer while any portion of the content is being played from the buffer. The mobile handset 20 includes the application, as described above, that manages the content on the mobile handset and displays the user interface shown in FIG. 4. In the embodiment in which the mobile handset does not support progressive downloading, the application may also segment a memory space of the mobile handset into a first buffer A and a second buffer B wherein the downloading of the segments of the content occurs by ping-ponging between the first and second buffers. In particular, as shown in FIG. 7B, a new piece of content (having segments 1-8 in this example) has its first segment downloaded into the first buffer and then the segment is played from the first buffer. While the segment of content is being played in the first buffer, the next segments of the piece of content (which must include the first segment to maintain the file integrity and download the file header) of the piece of content is downloaded to the second buffer B (segments 1-3 in this example). Then, when the first segment is completed, the content in the second buffer starting at segment 2 is played. During the switch from the first buffer to the second buffer, a 20 ms silence occurs but it is not noticeable by the user. As the segments of content are being played from the second buffer B, addition segments (segments 4-6 in this example) are downloaded to the first buffer A (along with the prior segments to maintain content file integrity and download the file header). When the playing of the second and third segments is completed, the mobile handset switches back to the first buffer A so that segments 4-6 can be played. While the segments in the first buffer A are being played, the last segments of the piece of content (along with the prior segments to maintain content file integrity) are downloaded into the second buffer and the mobile handset then plays the remaining segments from the second buffer once segments 4-6 are completed so that the mobile handset ping-pongs between the first and second buffers. The use of the two buffers results in a better user experience since the only silence gaps are approximately 20 ms gaps that are not noticeable by the user and permits streaming of the content. Without the two buffers, a mobile handset that does not support progressive downloading: 1) must wait to play the content until it is completely downloaded (which takes too long); or'2) introduces a pause (2 seconds or more) each time that the mobile handset needs to download the next segments of the content. In addition, a mobile handset that does not support progressive downloading and does not have the two buffers cannot be adaptive to bandwidth changes in the network and thus cannot take advantage of good network coverage and good network speed to provide a better user experience.

In another embodiment, the memory space of the mobile handset may be divided into the first and second buffers (as described above) and a third buffer wherein the segments of the content are downloading into the third buffer so that the third buffer has all of the currently downloaded segments of the content (or all of the segments of the content if the downloading is completed).

The mobile handset application may also include a mode in which the application, when the user is playing a playlist for example, looks ahead in the playlist and downloads the next piece of content in the playlist (if it is not already on the mobile handset) in a streaming manner wherein the first piece of content will have the 20 ms silence gaps (due to the streaming and ping-ponging between the buffers), but any subsequent pieces of content will not have the silence gaps since the subsequent content may be pre-downloaded in the entirety to the mobile handset.

The mobile handset/application of the mobile handset may also include an "airplane" mode in which the mobile handset and application determines when the mobile handset is connected to the network (either the wireless network or the link). When the application determines that the mobile handset does not have any connection to the computing device 10, the application does not display any content that is only on the computing device 10, but permits the user to play the content already stored on the mobile handset. However, when the mobile handset is again connected to the computing device 10, the content on the mobile handset and on the computing device (shown in FIG. 4 above) is again shown to the user.

FIG. 8 illustrates a network aware mobile handset application of the content sharing system. As with the system shown in FIG. 5, the mobile handset 20 may include the content store 71, such as a database, that may include one or more playlists 72 and the computing device 10 may the content store 74, such as a database, and one or more pieces of content 75. The mobile handset may further include the content application that is executed on the mobile handset. In this embodiment of the system, the computing device 10 or device 22 may have one or more links 24, 26 that allows the mobile handset 20 to exchange data and information with the computing device 10 or device 22. The link, in this embodiment, may be one or more different links that each have different characteristics. For example, the links may be cellular/mobile or 3G network 90, a wireless computer network 92 and a Bluetooth network 94. Each of these link have different characteristics such as cost to use, bandwidth available and download speed and protocol. For example, a 3G network is expensive, requires a 3G enabled mobile device and has very fast download speeds, a wireless computer network may be free, require a WLAN card or circuit and has a slower download speed as compared to the 3G network.

In the network aware mobile handset application of the content sharing system, the application on the mobile handset has a behavior (when and how its uses each different link when available and how it synchronizes content with the computing device 10 or device 22) that changes based on the particular link that is available and accessible to the mobile handset. For example, the application on the mobile handset may be configured to download any and all content not already on the mobile handset automatically whenever the mobile handset can access a free link and also configured to only download the next piece of content as needed when the mobile handset has access only to an expensive link, such as 3G. As another example, the application on the mobile handset may have a dormancy timer to turn off network access to an expensive link until a button/user action reactivates the link access. As another example, the application on the mobile handset may disable any content prefetch when the mobile handset can only access an expensive link. As another example, if the user has selected to download a movie onto their mobile handset, the application may stream at a minimum speed when the mobile handset has access only to an expensive link, but may then download the entire movie onto the mobile handset when the mobile handset has access to a wireless computer network which is low cost or free. Thus, the application in the mobile handset has behaviors that change depending on the link access of the mobile handset.

In the embodiments described above, the content system may additionally provide digital content data aggregation. In particular, the system may include a unit/device/module that can aggregate data obtained from users when they upload their digital content into the cloud or computer. This data can include web interaction data (data about the user's browsing, etc.), popularity data, other third party data, playlist information, song playback information (e.g., time of last playback, number of times played over past month, etc.), user profile information (e.g., demographic information), metadata for each piece of digital content (e.g., artist name, title of song, cover art, etc.), lyrics, synching information for the lyrics that can be used to display the lyrics in a synchronized fashion with the digital content, and a digital fingerprint for the song (which is a representation of the digital data constituting the song). In addition to data about the digital content from the user, the content system may also gather third party data that can be combined with the user data to enhance the overall user experience of the content system. For example, the system may gather song popularity information that is generated by a third party. The data can be aggregated in a database and can be used as a basis for providing additional services to users. The services may include: recommendations, lyric synching, social networking, digital fingerprinting and others.

Recommendations: Using the data stored for the user (in the cloud or computer), the system may generate recommendations for the user. In particular, the store for the digital content may include playlists from numerous users. These playlists provide a correlation between pieces of digital content, since the songs on that playlist have something in common—for example, the user who created the playlists likes all of those songs, or those songs all fall within the same genre or other category. This correlation information can be used to generate recommendations. For example, if several playlists contain both Song A and Song B, and a particular user has Song A but not Song B, a recommendation engine of the content system can recommend Song B to that user. Furthermore, the recommendations generated by the content system may be based on digital content of other users as described above as well as digital content of the user. The recommendation feature is discussed in greater detail below.

Lyric Synching: In the current art, service providers can offer lyrics with audio or video content for that, for example, the words to a song can be displayed on a mobile device when the song is playing. One constant challenge is to synchronize the lyrics with the words in the song so that the right lyrics appear right when the same words are being sung. Certain applications allow a user to "click" when the next word in the displayed lyrics is sung so that the system can better synchronize itself. Using the content system, all synching information for a given pairing of digital content and lyrics is aggregated by the content system which then performs a normalization process on that pairing to dampen the affect of the "outlier" data, e.g., synchronization information that is significantly different than the average of the synchronization information collected from all users for that pairing. For example, the system may use a deviation process in which line by line synchronization is performed and the standard deviation is determined to remove outlier data which results in better synchronization of the music to the lyrics.

Figure 15:
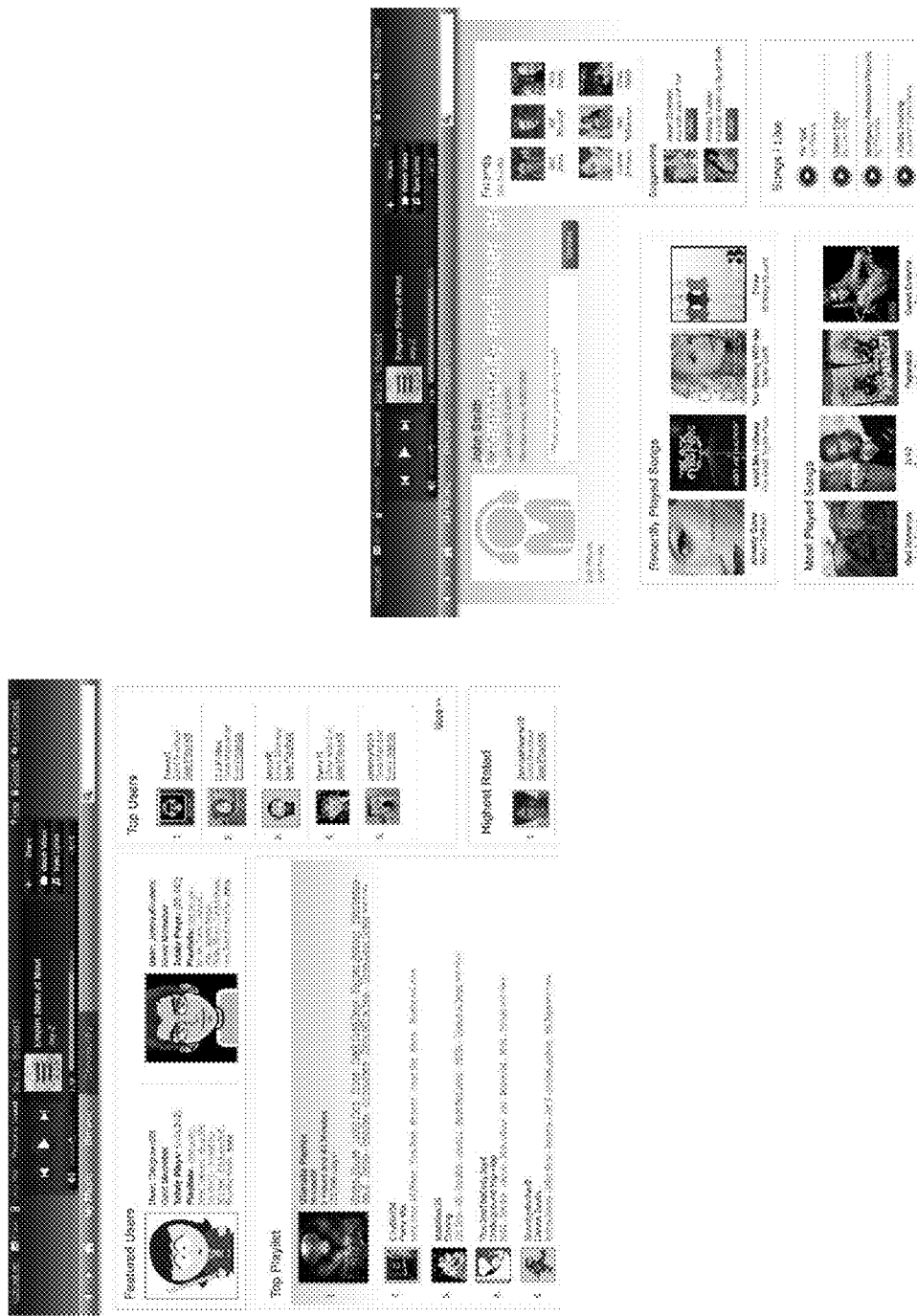
FIG. 15 illustrates an example of a community user interface of the content system.

Social Networking: The content system may also use the uploaded playlists for each user to assist in social networking. For example, the content system can determine that two users have similar musical tastes based on their playlists and then could introduce a user to a different user based on the similarity in musical tastes as determined by analyzing their playlists. The content system would do this introduction because the content system has an API that allows it to interact with various different social networking systems or may have its own social networking/community system. The content system also can be used to recommend music—e.g., once it determines a similarity, it can make recommendations to User A based on User B's playlists, such as "User B listens to Song X but you do not; would you like to try it?" An example of a community user interface of the content system as shown in FIG. 15 wherein the community is within the content system and permits, among other things, personal profiles, connection to social networking sites, such as Facebook, Twitter and MySpace, and the user to share comments and playlists with other members of the community. In addition, the content system may also compare users who have a 90% match in their collections (macro level match) and connect those users to each other.

Digital Fingerprints: Currently, each piece of digital content can be processed to create a digital "fingerprint" for the song, which is a type of unique identifier that is based on the digital content and is useful in ensuring that copyrights are not violated and that appropriate license fees are paid. If users have digital fingerprints for their songs, these fingerprints can be aggregated in a database as well by the content system. These fingerprints can be used for several purposes by the content system. For example, the fingerprints can be used to verify the ID3 tags for a song because, if 80% of all ID3 tags have the same fingerprint, then that fingerprint is likely accurate and those ID3 tags are likely accurate. In one embodiment, the fingerprint can be an ASCII string consisting of up to 16K bits and can be based on the entire piece of digital content and not just a portion of it. The fingerprint of the entire piece of digital content can be used by the system to identify the digital content of other users.

Figure 14:
FIG. 14 illustrates an example of the user interface for on-demand digital content of the content system.

Other: The aggregated data also can be used for other purposes. For example, if a user searches for songs by Artist A, a store of the content system can determine what the five most popular songs by Artist A are (based on the data stored in the database that was collected from users), and it can then show those song in order of popularity among all users represented in the database. The content system also allows a user to search by artist or album and then download (purchase) some/all of the songs for a particular artist or album. An example of a user interface for on-demand digital content of the content system that allows the user to browse and search a library of digital content, play any piece of digital content and add any pieces of digital content to one or more playlists is shown in FIG. 14.

In addition, since the content system may be used to store the digital content for multiple devices 20 of the user as shown in FIGS. 2A and 2B, the digital content lists for each device 20 may be synchronized so that the list of digital content on each device is constantly updated based on the store of digital content in the content system. In addition, when the user buys a new device that has digital content capabilities, the content system may, automatically or on user command, download the digital content list to the new device. The content systems described above also permit two-way synchronization in that digital content (all or a subset) is synchronized from the content store to each device 20 and the digital content on any device 20 may be synchronized back to the content store.

The content system may also provide a playlist creation sub-system in which digital content of the user may be used to seed a new playlist of digital content. Alternatively, a playlist can be generated from a set of recommendations provided to the user. The playlist creation unit may offer a first level of service and an on-demand/interactive level of service. The first level of service may provide playlists generated based on a user's digital content. The on-demand/interactive level of service may provide playlists based on any digital content on a playlist and allow the user to add or delete digital content/playlists.

The content system may also provide streaming download or progressive download to the devices 20 of the digital content instead of the download of the entire piece of digital content. If the device can accommodate progressive download, then progressive download is used. If the device cannot use progressive download, then streaming download is used. Now, examples of the user interface of the content system are described in more detail.

Figure 9:
FIG. 9 illustrates an example of a computer interface of the content system that allows synchronization of digital content and adding digital content.

FIG. 9 illustrates an example of a computer interface 100 of the content system that allows synchronization of digital content and adding digital content. This computer interface can be seen by accessing the content system using a computer, for example. As shown in FIG. 9, the system may handle movies, music and ringtones wherein the user interface has tabs that can be chosen by the user to view the pieces of digital content of the user associated with each type of digital content. The user interface also may have a lyric portion 102 that displays the lyrics of the digital content being currently played by the user. The user interface also may have a digital content list portion 104 that shows the digital content, the digital content play lists and the various lists of the different types of digital content which may be selected by tabs in the user interface. Each list of digital content may include the following fields including: a name of the digital content, an artist of the piece of digital content, an album that contains the piece of digital content (for music), a genre assigned to the digital content (if any), and a rating of each piece of digital content (if any).

Figure 10:
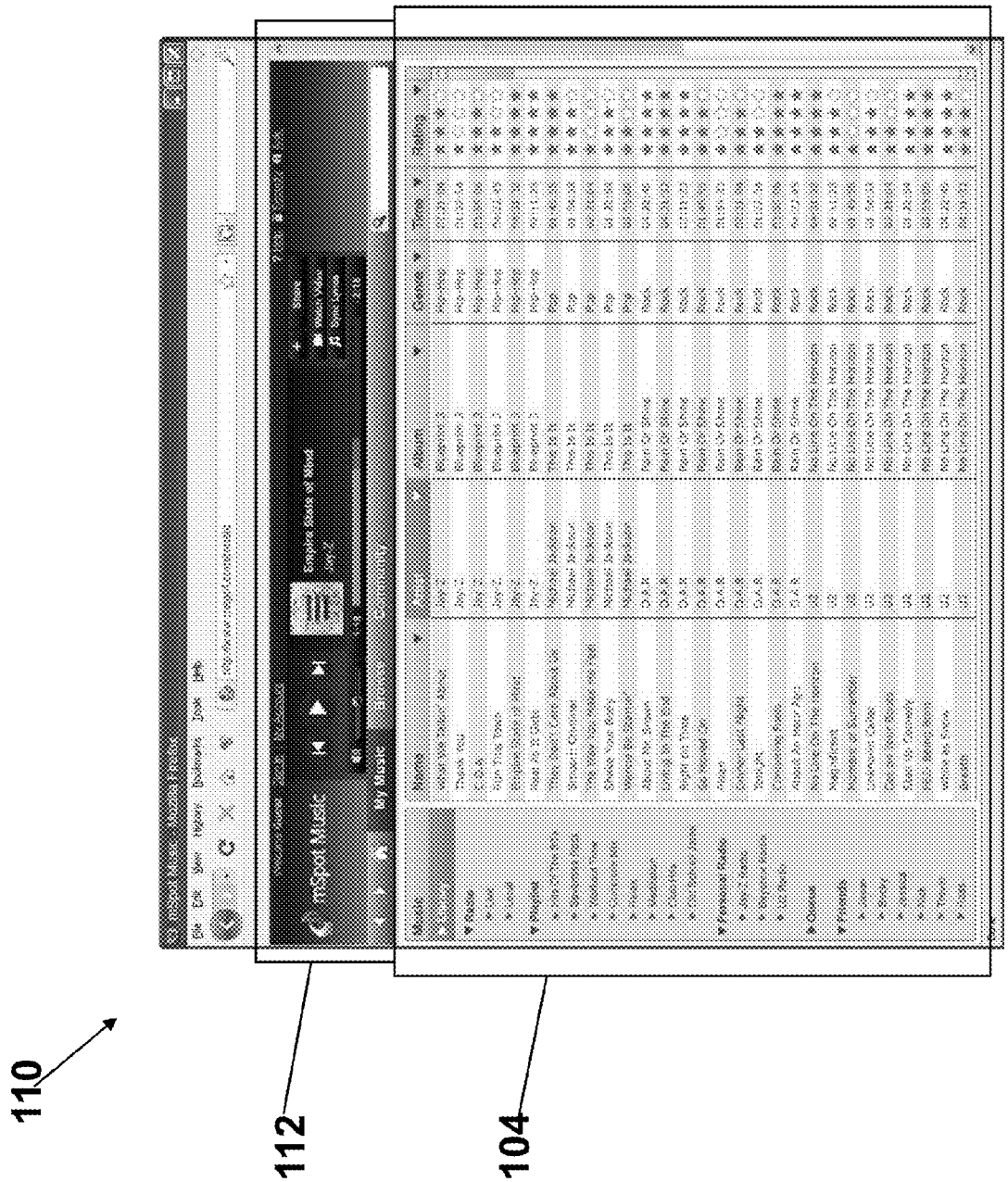
FIG. 10 illustrates an example of a web interface of the content system that allows synchronization of digital content.
Figure 11:
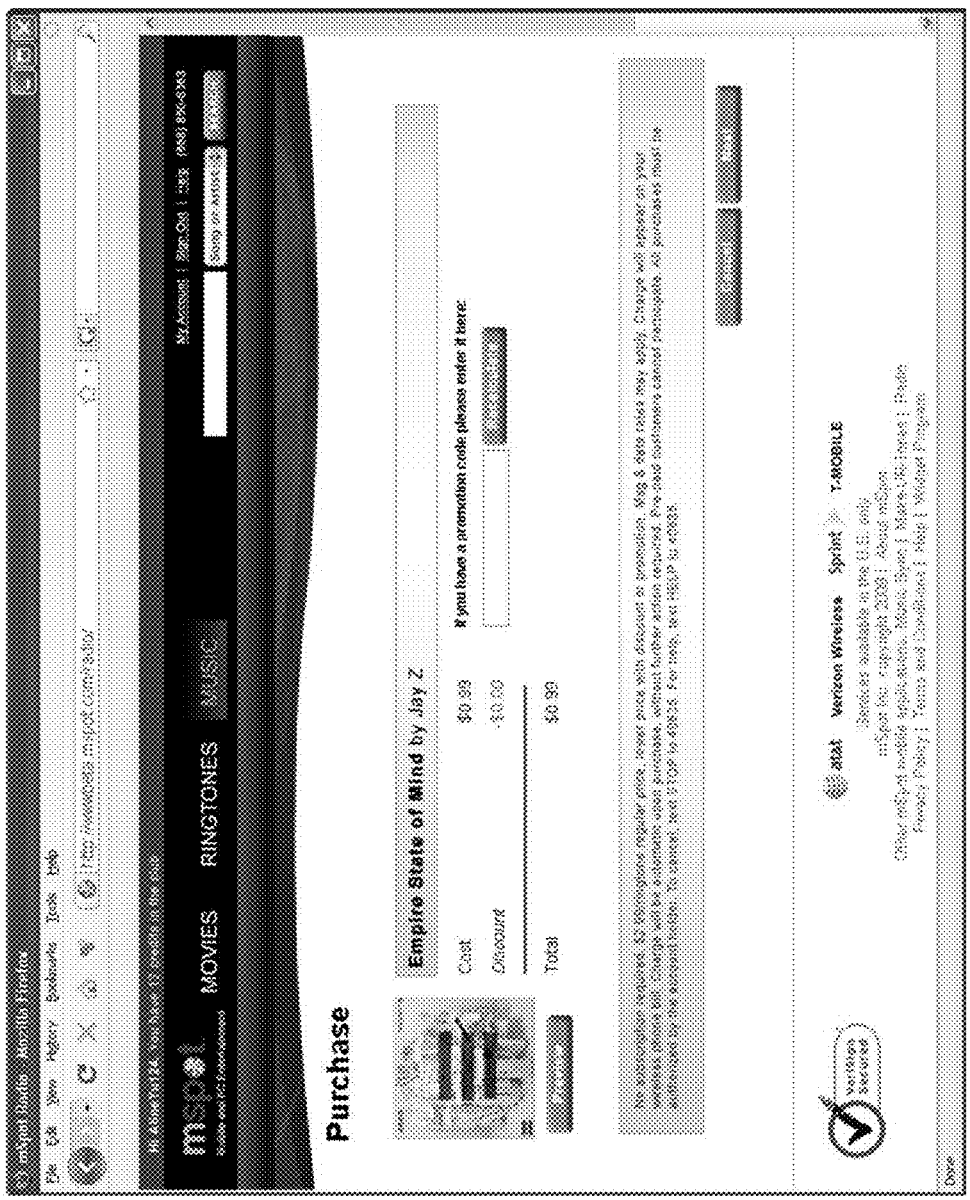
FIG. 11 illustrates an example of a user interface that allows the user to purchase a piece of digital content.
Figure 12:
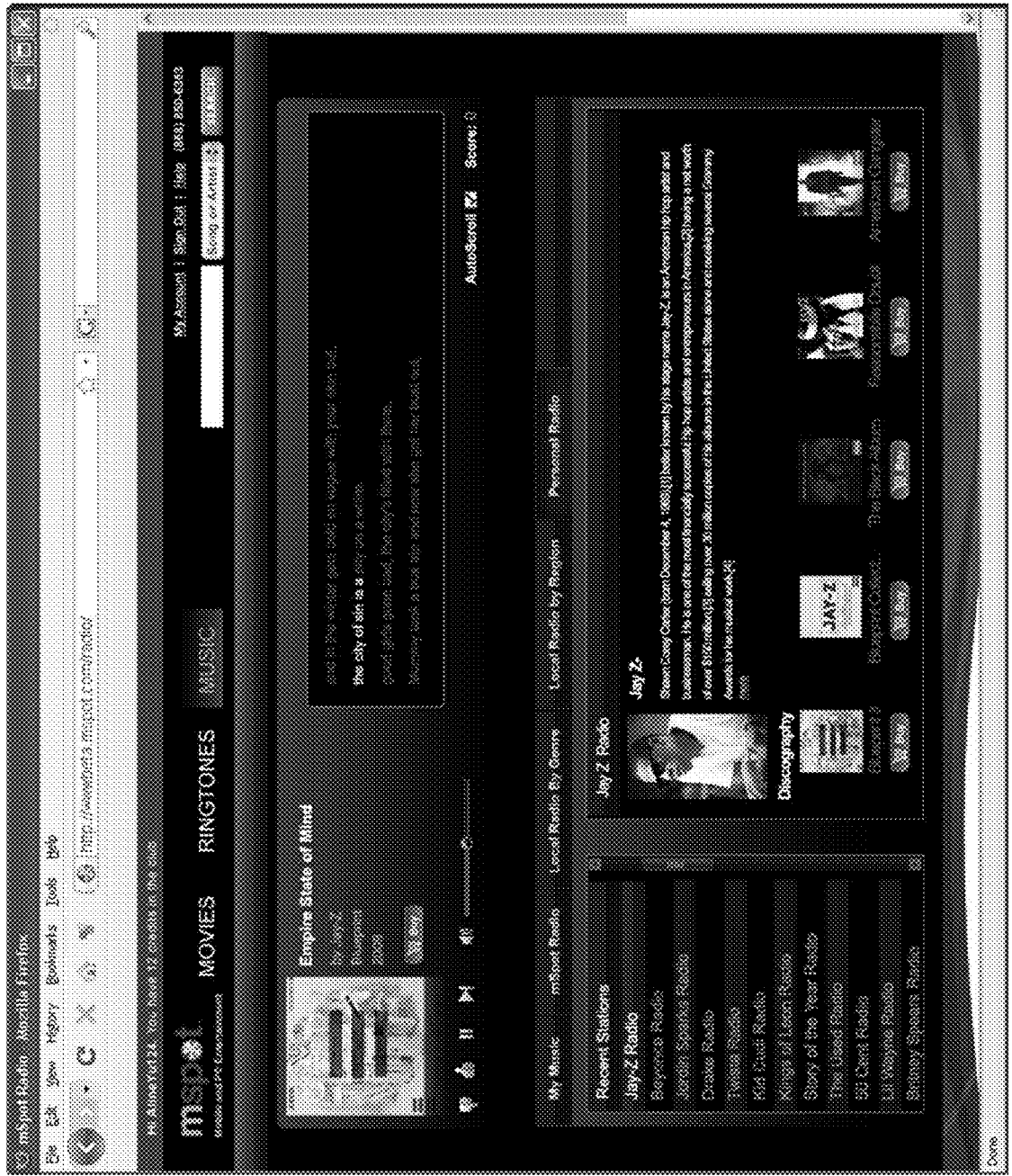
FIG. 12 illustrates an example of a user interface that allows the user to listen to a personal radio station using the content system.

FIG. 10 illustrates an example of a web interface 110 of the content system that allows synchronization of digital content wherein this illustrates an example of a user interface when the user logs into the content system over the web. As shown, the user interface has the same portion 104 as with the computer user interface and also has a condensed digital content control portion 112 that allows the user to start, stop, play, etc. digital content, share content, watch the video associated with the digital content (for music) and see/sync the lyrics with the digital content (for music). The digital content portion 104 in this user interface also has a time period of the digital content field shown that may also be present in the user interface shown in FIG. 9. For both of the user interfaces of FIGS. 9 and 10, the content system also allows the user to purchase digital content using, for example, the user interface shown in FIG. 11. In addition, the content system allows the user to listed to a personal radio station as shown in FIG. 12.

Figure 13:
FIG. 13 illustrates an example of a television interface of the content system.
Figure 16B:
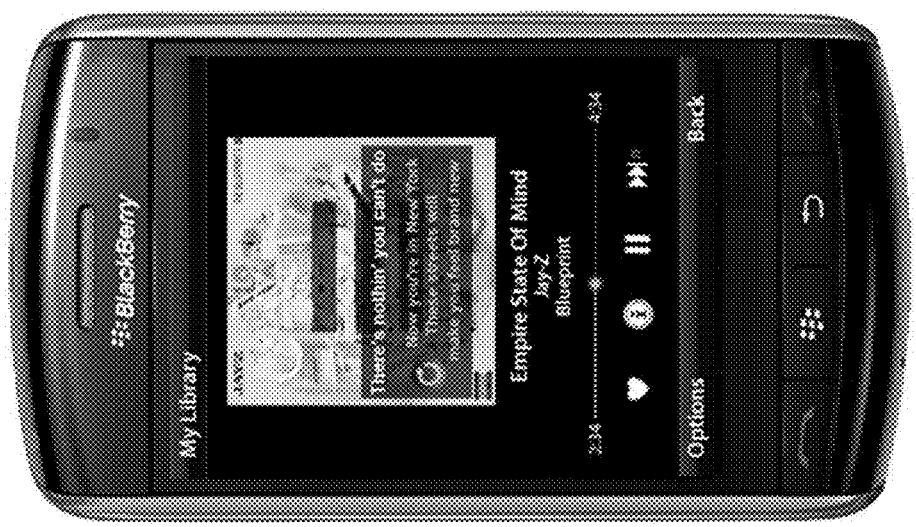
FIGS. 16A and 16B illustrate two examples of a user interface of the content system on a device.
Figure 16A:
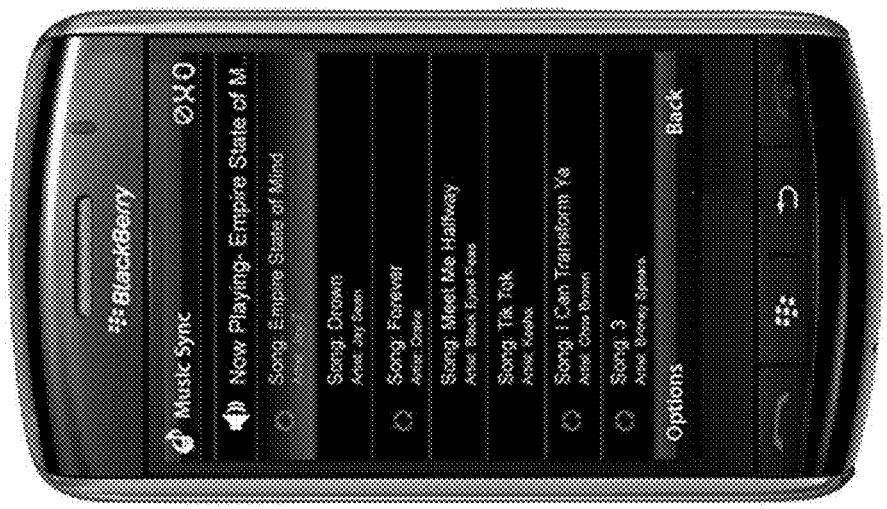
Figure 17:
FIG. 17 illustrate examples of a user interface of the content system on several different devices.

FIG. 13 illustrates an example of a television interface of the content system wherein the user can interact with the content system from an IP enabled television and thus interact with the digital content. FIGS. 16A and 16B illustrate two examples of a user interface of the content system on a device, such as a RIM Blackberry device. FIG. 16A shows synching of digital content occurring while FIG. 16B shows the user interface when a piece of digital content being played. Furthermore, FIG. 17 illustrate examples of a user interface of the content system on several different devices including the RIM Blackberry, Motorola Droid and the Apple iPhone.

Figure 18:
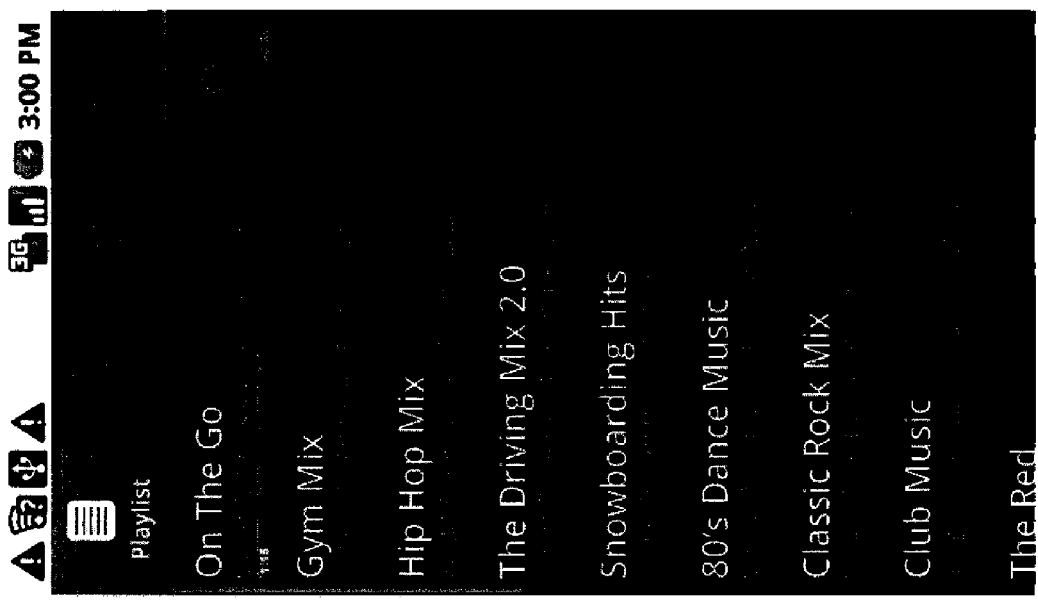
FIG. 18 illustrates an example of the user interface for songs/playlists available to a device.
Figure 19:
FIG. 19 illustrates an example of the user interface for a digital content player on a particular device.
Figure 20:
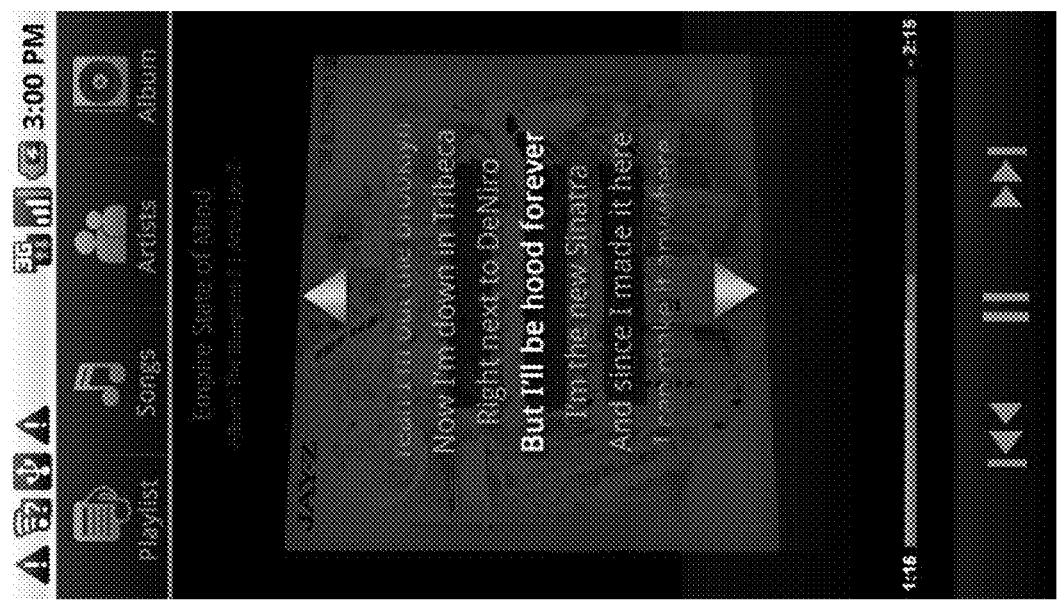
FIG. 20 illustrates an example of the lyric user interface for a digital content system on a particular device.

FIG. 18 illustrates an example of the user interface for songs/playlists available to a device 20 which allow a user of the device to request digital content (songs), playlists (shown in FIG. 18), artist playlists and album playlists from the digital content stored on the content system. Some of the digital content may be already stored on the device and the remainder can be downloaded wirelessly or over a USB cable as it is needed by the user. FIG. 19 illustrates an example of the user interface for a digital content player on a particular device that allows the user to control playback of the current playing digital content and have additional features specific to the digital content being played by the user. FIG. 20 illustrates an example of the lyric user interface for a digital content system on a particular device in which the user is viewing the lyrics as a song is being played by the user.

Figure 21:
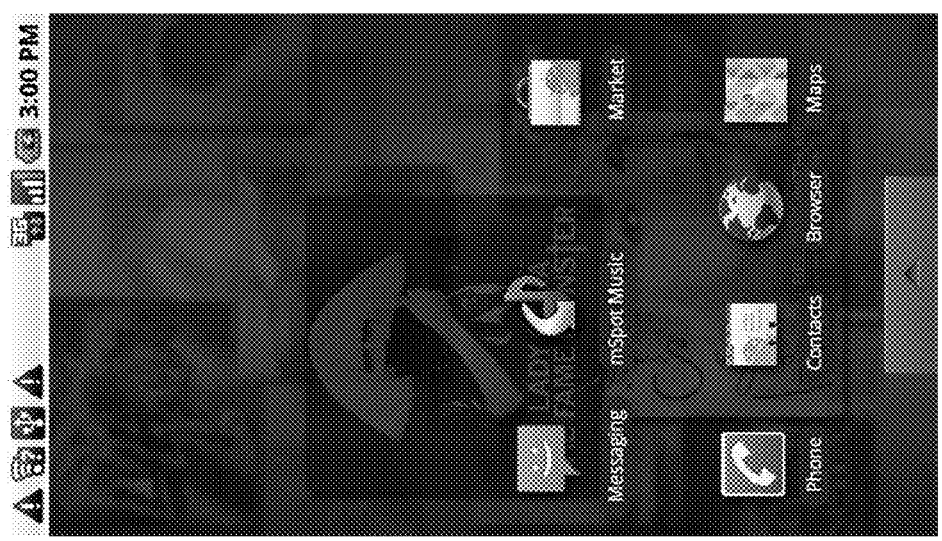
FIG. 21 illustrates an example of a live wallpaper function of a digital content system on a particular device.
Figure 23:
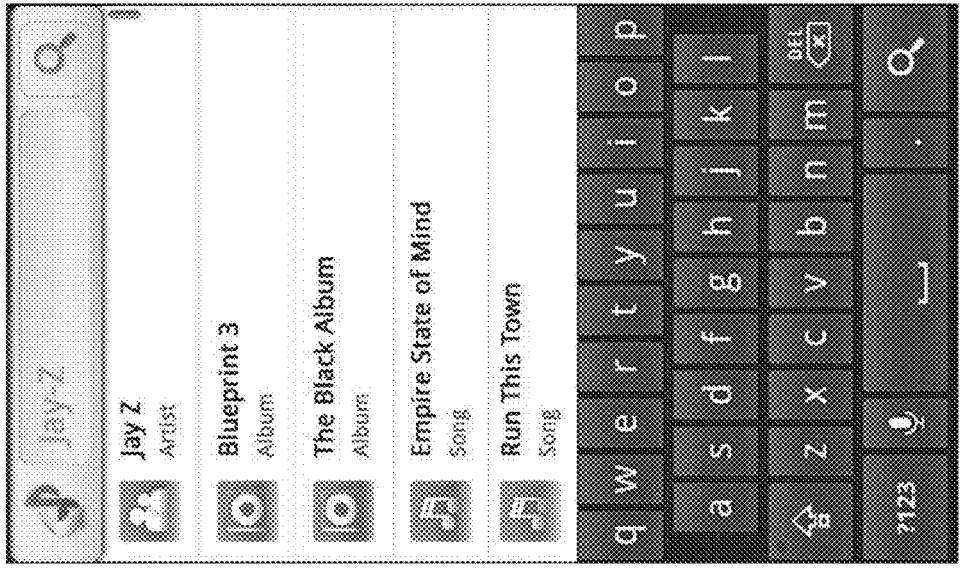
FIG. 23 illustrates an example of a quick search support function of a digital content system on a particular device.
Figure 22:
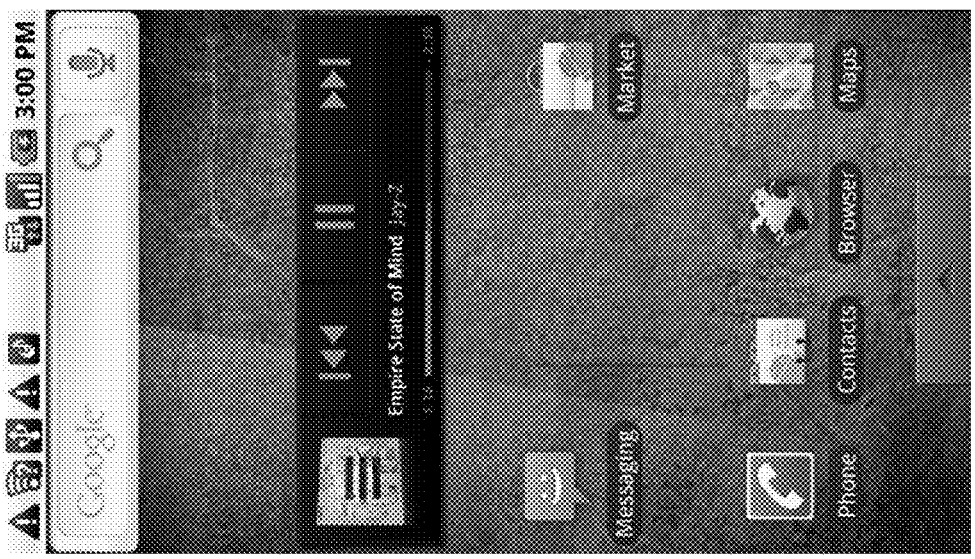
FIG. 22 illustrates an example of a desktop widget of a digital content system on a particular device.
Figure 24:
FIG. 24 illustrates an example of a docked playback client of the digital content system on a particular device.
Figure 25:
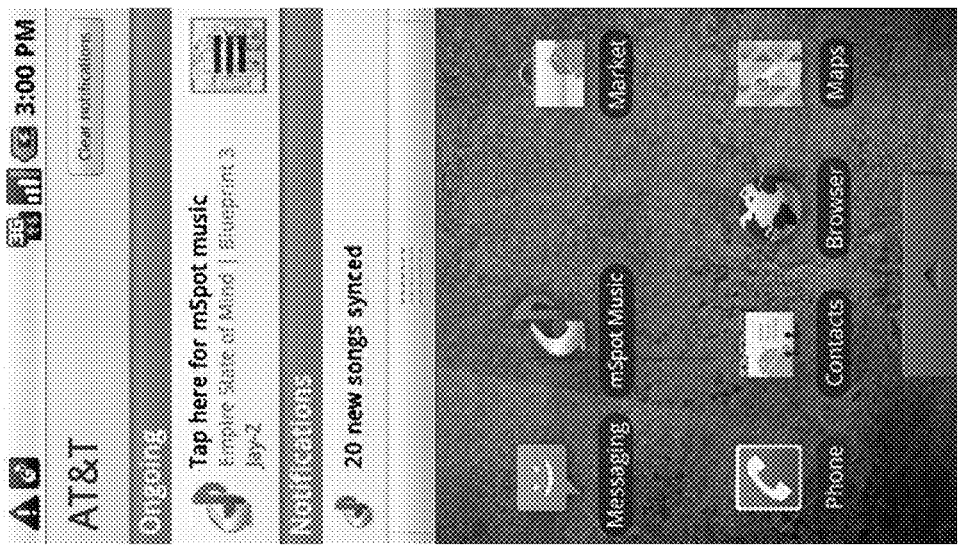
FIG. 25 illustrates an example of notification service integration of the digital content system on a particular device.

For certain devices 20, there may be some additional features of the content system. For example, the content system may enable live wallpaper (See FIG. 21 for example) in which the wallpaper may be cover art from the music in the content system. The background may be responsive to touch and change slowly when no music is playing and animate during song transitions. The certain devices may also have a desktop widget (See FIG. 22) that allows the user to control the playing of the digital content. Furthermore, the devices may integrate the content data into a quick search (See FIG. 23) to find pieces of digital content on the device or available on the computer/cloud. FIG. 24 illustrates an example of a docked playback client of the digital content system on a particular device wherein the user interface has a landscape layout. The device may also integrate the content system into a notification service (see FIG. 25 for example) in which the user has quick access to the current application as well as new/changed content on the computer/cloud.

Social Networking

Figure 27:
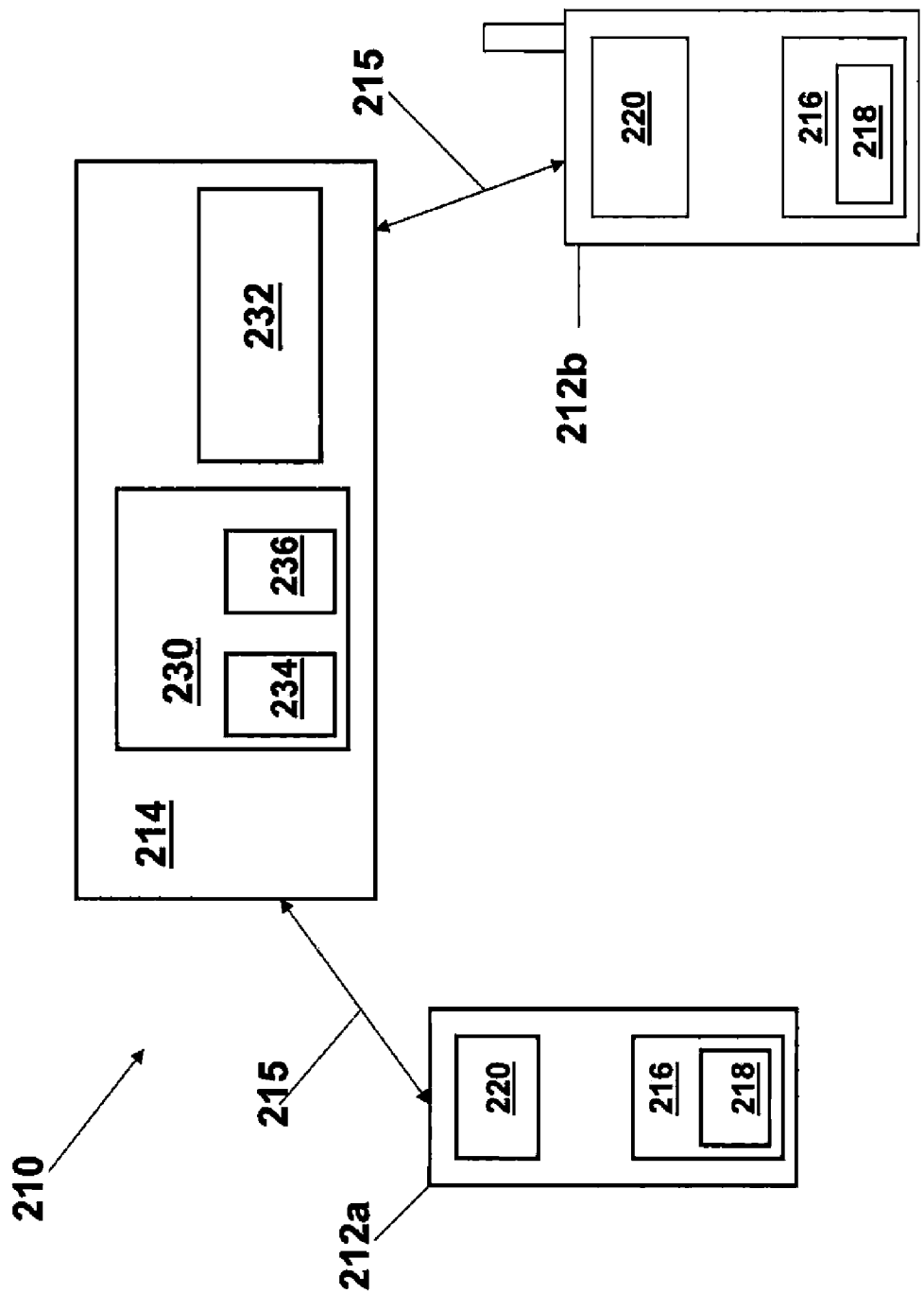
FIG. 27 illustrates an implementation of an embodiment of a system for content social networking.

Other embodiments involve social networking. FIG. 27 illustrates an implementation of an embodiment of a system 210 for content social networking. The system may be implemented as a hardware/software based system in this implementation. The system 210 may include one or more mobile handsets 212 (such as a first mobile handset 212*a* used by User A and a second mobile handset 212*b* used by User B as shown in FIG. 27) wherein the system allows the users to socially network/flirt with each other using pieces of content. Each mobile handset 220 may be a processing unit based device with sufficient processing power, display capabilities, connectivity capabilities and memory to interact with the system. Each mobile handset, for example, may be a PDA, a mobile phone, a wireless email device (such as the Blackberry or iPhone) that may or may not have phone capabilities, handheld digital content devices (such as iPods and the like) or other handheld device that are capable of downloading and playing digital content.

The system may further comprise a computer 214, such as one or more server computers, that can be connected to the one or more mobile handsets over one or more links 215. The links can be any type of link, such as the Internet, and can be hardwired, wireless, or some combination of the two. When the link is wireless, it can be, for example, a cellular telephone network, a WiFi network (such as an 802.11 network), a wireless data network (such as EV-DO or EDGE), or any other wireless networks. The links 215 allows the one or more mobile handsets 212 to exchange data and information with the computer 214 including digital content as described below in more detail. The computer 214 may have the appropriate one or more interfaces/circuitry that allow the mobile handsets to connect to and interact with the computer 214.

Each mobile handset 212 may further comprise a storage device 216, such as a hard disk drive, flash memory etc. that may be volatile or non-volatile, that stores one or more pieces of digital content 218 on the mobile handset 212. The digital content may be a song, a video, a picture, a podcast, a radio feed, an application, a document, music lyrics, artists' bios, concert information, or any other piece of digital content, and the storage device 216 may store one or more of these different types of digital content. Each mobile handset may also include a display 220 that allows the user to scroll through a user interface to select a piece of digital content to interact with. Each mobile handset may also include an interface (not shown) that allows the user to plug in a set of earphones, speakers etc into the mobile handset as well as a processing unit (not shown) that controls the operation of the mobile handset and a power source (not shown) to power the circuitry of the mobile handset. Each mobile handset may also include a input device that allows the user to interact with the mobile handset and connectivity circuitry (not shown) that allow the mobile handset to connect to and interact with the computer 214. For a wired link 215, the connectivity circuitry may be an interface that allows a conductor to be plugged into the mobile handset. For a wireless link 215, the connectivity circuitry may be wireless circuitry that allows the mobile handset to interact wirelessly with the computer 214.

The computer 214 may further comprise one or more processing units, storage devices and interfaces (not shown) as well a content networking unit 230 (implemented as a plurality of lines of computer code that are executed by the one or more processing units of the computer 14 in this embodiment) that performs various content social networking as described below in more detail. The computer 214 may further comprise a content storage 232 (implemented as a plurality of lines of computer code that are executed by the one or more processing units of the computer 214 in this embodiment) that stores content and allows a user to catalog and organize the digital content of the user. The content storage 232 may also have a listing of the pieces of digital content for each user (a library) which are pieces of digital content that the user has the rights to interact with. The content networking unit 230 may further comprise a content identification unit 234 (implemented as a plurality of lines of computer code that are executed by the one or more processing units of the computer 214 in this embodiment) that identifies content received by the computer from the one or more mobile handsets 212 and/or determines that the received content is or is not already stored in the content storage 232. The networking unit may further comprise a network unit 236 (implemented as a plurality of lines of computer code that are executed by the one or more processing units of the computer 214 in this embodiment) that determines the networking action to perform in response to the received content as described below with reference to FIG. 28. The content networking unit 30 thus may implement social networking among its users based on pieces of digital content as described below. Now, an example of the content social networking implemented by the system shown in FIG. 27 is described with reference to FIG. 28.

Figure 28:
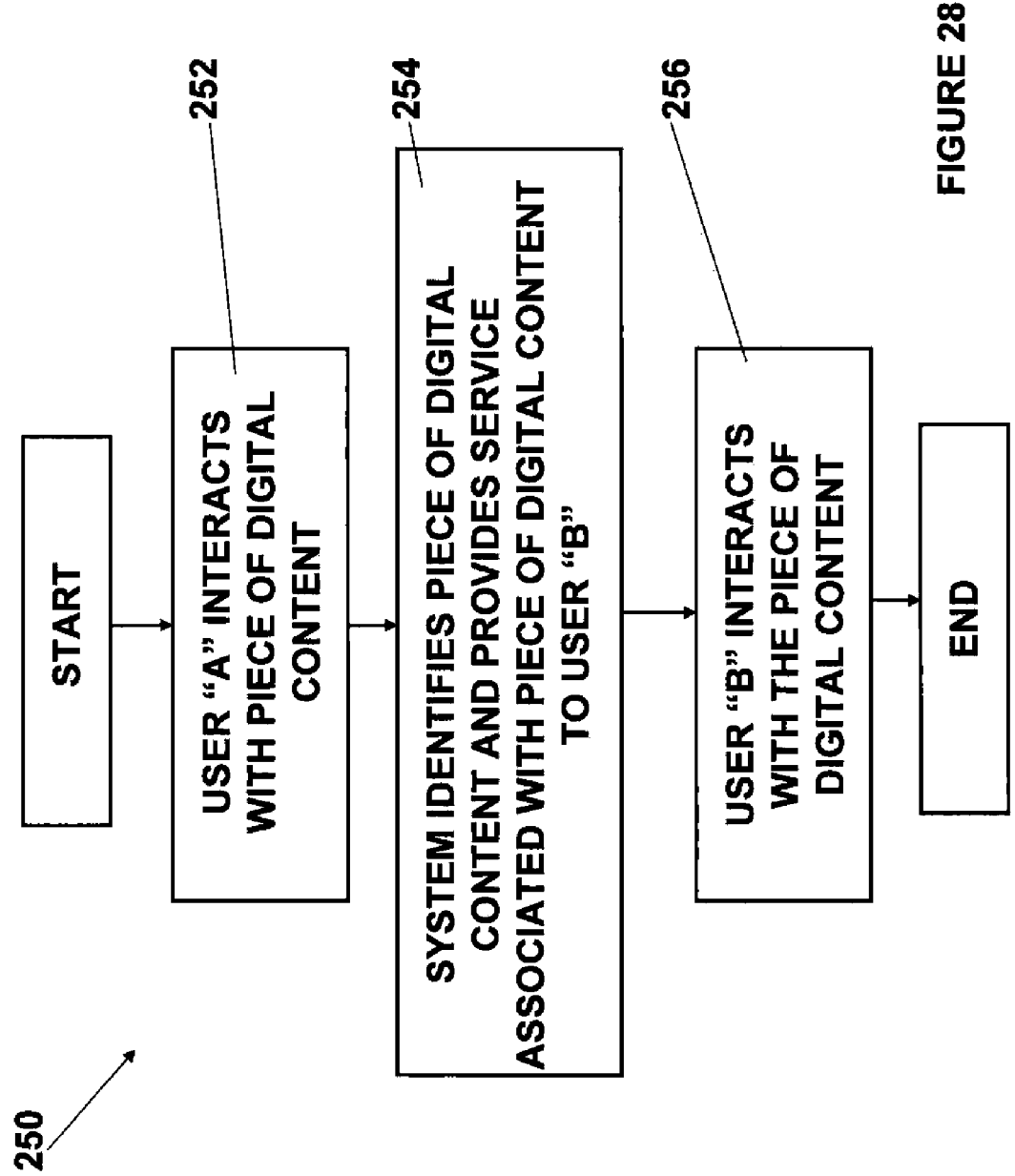
FIG. 28 illustrates an example of a method for content social networking.

FIG. 28 illustrates an example of a method 250 for content social networking that may be implemented using the system shown in FIG. 27, but may also be implemented using other systems. In the method, a user of a first mobile handset may interact with a piece of digital content (252) such as by the user playing/viewing the piece of content or browsing the piece of digital content. When the user interacts with the piece of digital content, the user optionally may also identify a person (a second user) who the user wishes to socially interact with/flirt with. The piece of digital content (or an identifier) and optionally the identity of the second user are sent to the computer 214 shown in FIG. 27. The computer 214 identifies the piece of digital content (by using the content identification unit 34 of FIG. 27, for example) and then provides a service associated with the identified piece of digital content to a user of a second mobile handset (254) such as by using the network unit 236 of FIG. 27. For example, the service may allow the first and second user to social network/flirt with each other using the piece of digital content based on the provided identifier of the second user. Alternatively, users may agree to socially network using the system and then the system will display what pieces of digital content each user, who agreed to socially network, is interacting with so that anyone can then communicate with the other users or with the system. As another alternative, the system may select one or more users to whom the received piece of digital content is to be shared based on various criteria. The criteria can include geographic proximity, membership in a social network or a "friends list," or belonging to a common service or network. The criteria can select from a private group (e.g., a user's social network) or a public group (e.g., all wireless customers of Sprint®).

The service associated with the piece of digital content may be varied. For example, the computer 214 shown in FIG. 27 may send the piece of identified digital content to the second user with an indication that the piece of digital content originated from the first user. As another example, if the identified piece of digital content is also in the library of the second user, then the computer 214 shown in FIG. 27 may provide an indication that the piece of digital content originated from the first user and allows the second user to interact with the identified piece of digital content (256) such as by using the second mobile handset. As another example, if the identified piece of digital content is not in the library of the second user (so the second user does not have rights to interact with the identified piece of digital content), then the computer 214 shown in FIG. 1 provides an indication that the piece of digital content originated from the first user and allows the second user to purchase the identified piece of digital content (256) such as by using the second mobile handset so that the second user can then interact with the piece of digital content. In this manner, the system shown in FIG. 1 may be used by the users to social network/flirt with each other using a piece of digital content. This communication can occur through SMS messaging, communication mechanisms offered by a social network such as Facebook®, or communication mechanisms offered by an application running on the mobile handset.

Figure 29:
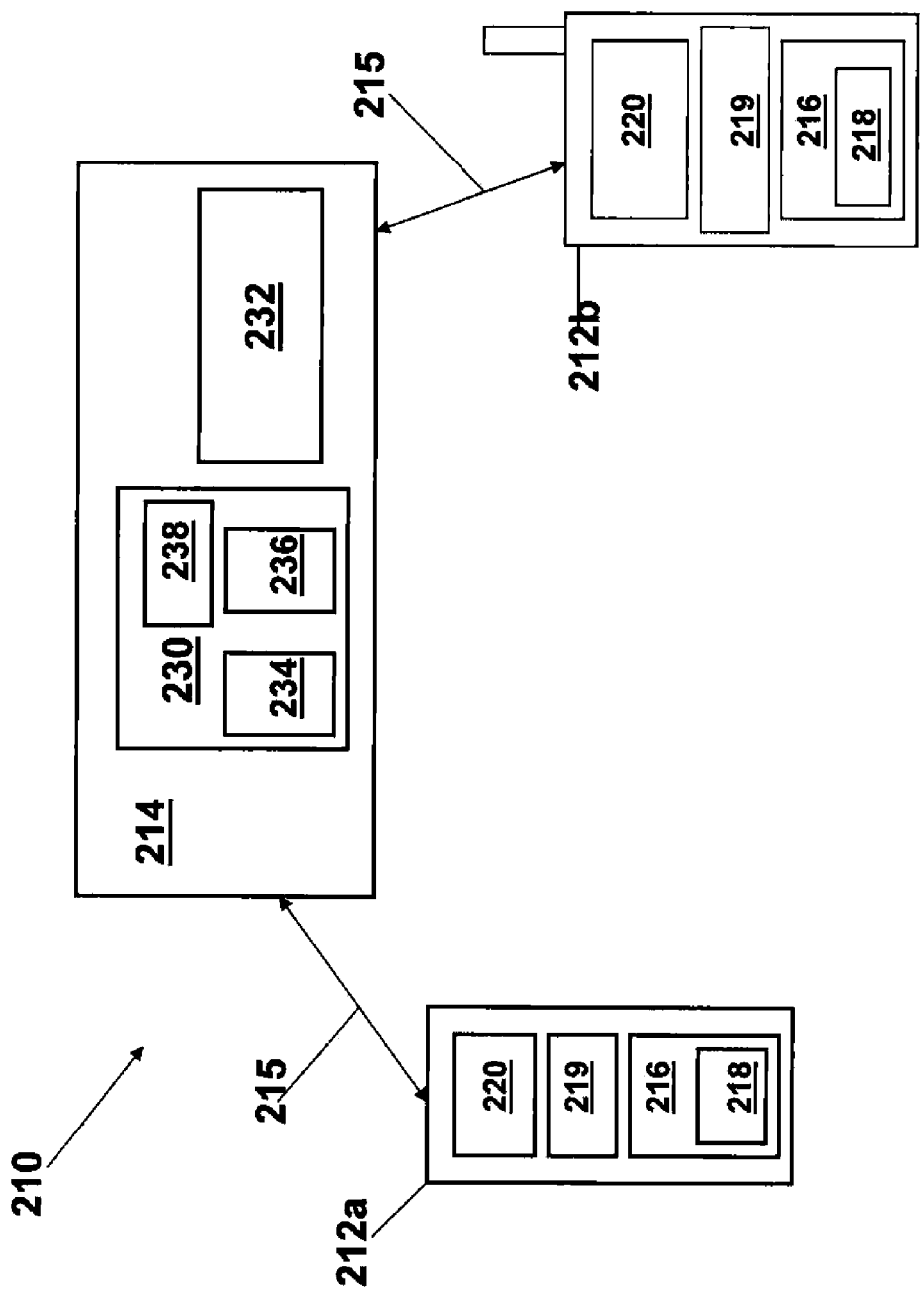
FIG. 29 illustrates an implementation of an embodiment of the system for content social networking that incorporates geography.
Figure 30:
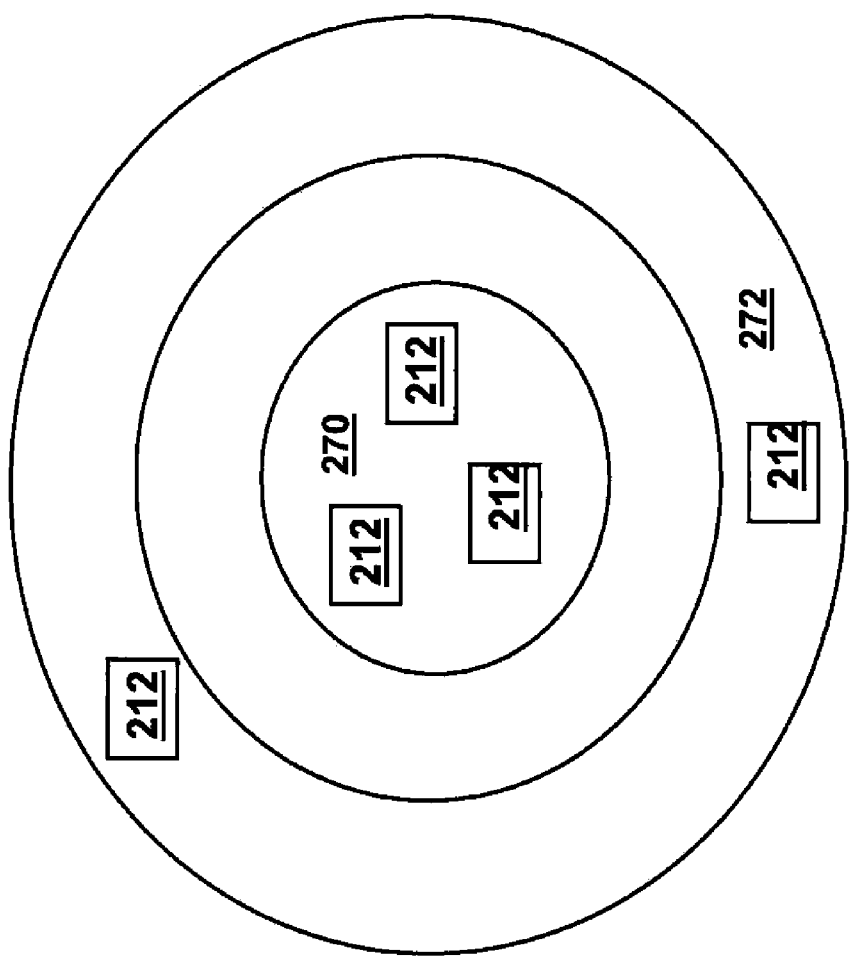
FIG. 30 illustrates a geographical embodiment for content social networking.

FIG. 29 illustrates an implementation of another embodiment of the system 10 for content social networking that incorporates geography. In this figure, elements with the same reference numerals as shown in FIG. 27 are the same and perform the same operations and functions and therefore will not be further described with respect to FIG. 29. In this implementation, the location of each user may be used to determine which users are able to social network/flirt with other users or the system may select the other users to social network/flirt with based on the locations of the users as described below with reference to FIG. 30. To implement this embodiment of the system, each mobile handset 212 has a unit 219 that determines the location of the mobile handset so that the location of the mobile handset can be transmitted to the computer 214. As an example, the unit 219 may be known GPS circuitry and software or it may be software that determines the position of the mobile handset based on the wireless link towers. The content networking unit 230 may further comprise a unit 238 (implemented as a plurality of lines of computer code that are executed by the one or more processing units of the computer 214 in this embodiment) that receives the location information from the mobile handsets, processes the location information as needed and supplies the location information to the network unit 236. The network unit 236, in this embodiment, may then use the location information of each mobile handset to determine which users to social network together using the piece of digital content. In particular, it is more likely that users in a particular geographic area (same town, for example) are more likely to social network and date each other than users in disparate geographic areas. Thus, as shown in FIG. 30, the mobile handsets in a first geographic area 270 may be socially networked together using the system while users in the outer geographic area 272 are not socially networked to each other due to the distance between the users. The system shown in FIG. 29 may also be used to determine the type of digital content being interacted with by users in a particular geographic area and then socially networking those users in the particular geographic area together as described above.

Figure 31:
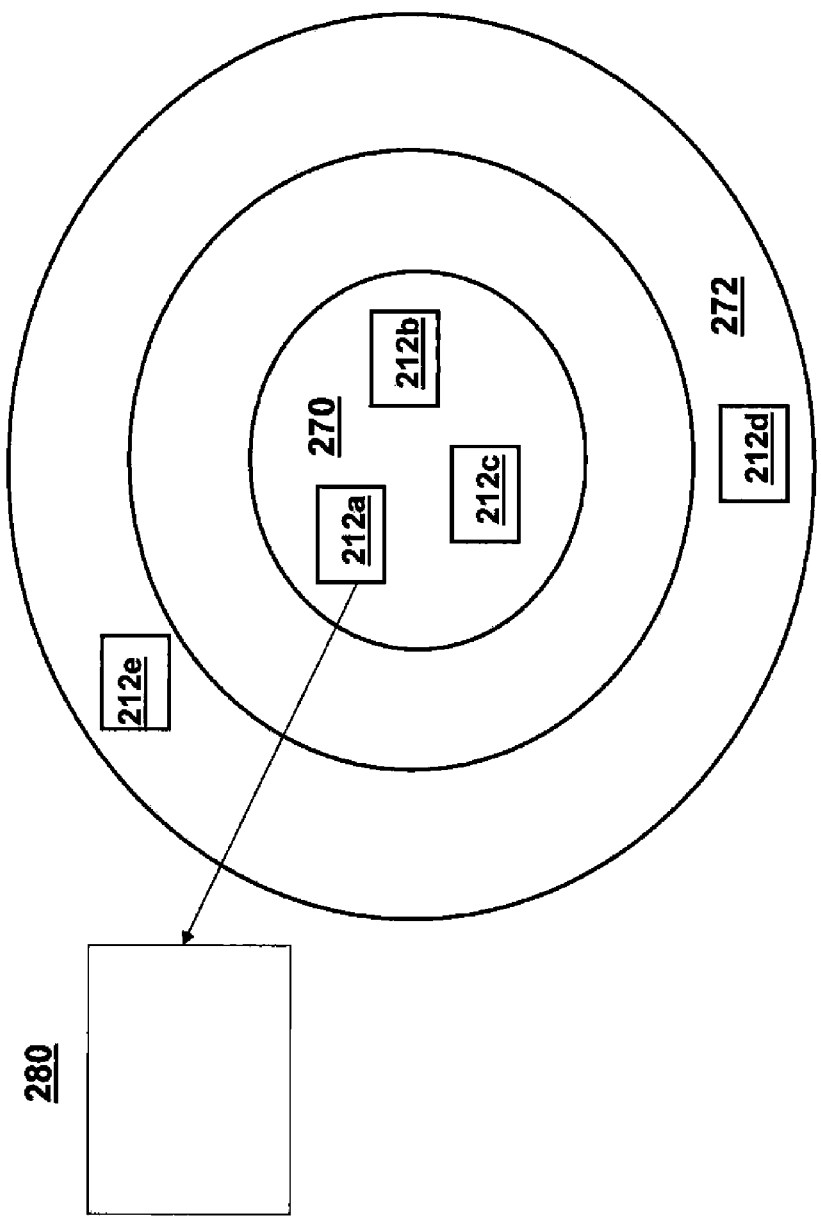
FIG. 31 illustrates a geographical embodiment for content social networking.

Alternatively, the system can determine the digital content that users in a particular geographic area are interacting with and then display representations of the users and their digital content to the other users of the system. For example, in FIG. 31, mobile handsets 212a, 212b, and 212c are within a first geographic area 270. The users operating those mobile handsets already are part of an existing social network, such as through Facebook®. The system shown in FIG. 29 will recognize that handsets 212a, 212b, and 212c are being operated by members of an existing social network and will then transmit information regarding one or more of them to one or more of the others. For example, mobile handset 212a at a particular moment in time may be associated with content 280. Content 280 could be a ringtone, music clip (such as a favorite song), video clip, artwork or other media content. The system shown in FIG. 29 will transmit this information to mobile handset 212b (for example), and mobile handset 212b can then show its user that mobile handset 212a and its user are associated with content 280 and are located at a particular geographical location. For example mobile handset 212b can generate a map showing first geographic area 270, the location of mobile handset 212a within that first geographic area 70, and information regarding content 280 associated with mobile handset 212a (for example, a pop-up window associating mobile handset 212a with a music clip or a depiction of a music clip that is currently playing on mobile handset 212a). In this manner, a member of a social network can learn which members of their social network are in close physical proximity to him or her, and also can learn what those members are doing at the present time by receiving information about content associated with the mobile handsets operated by those members at a particular moment in time.

Figure 32:
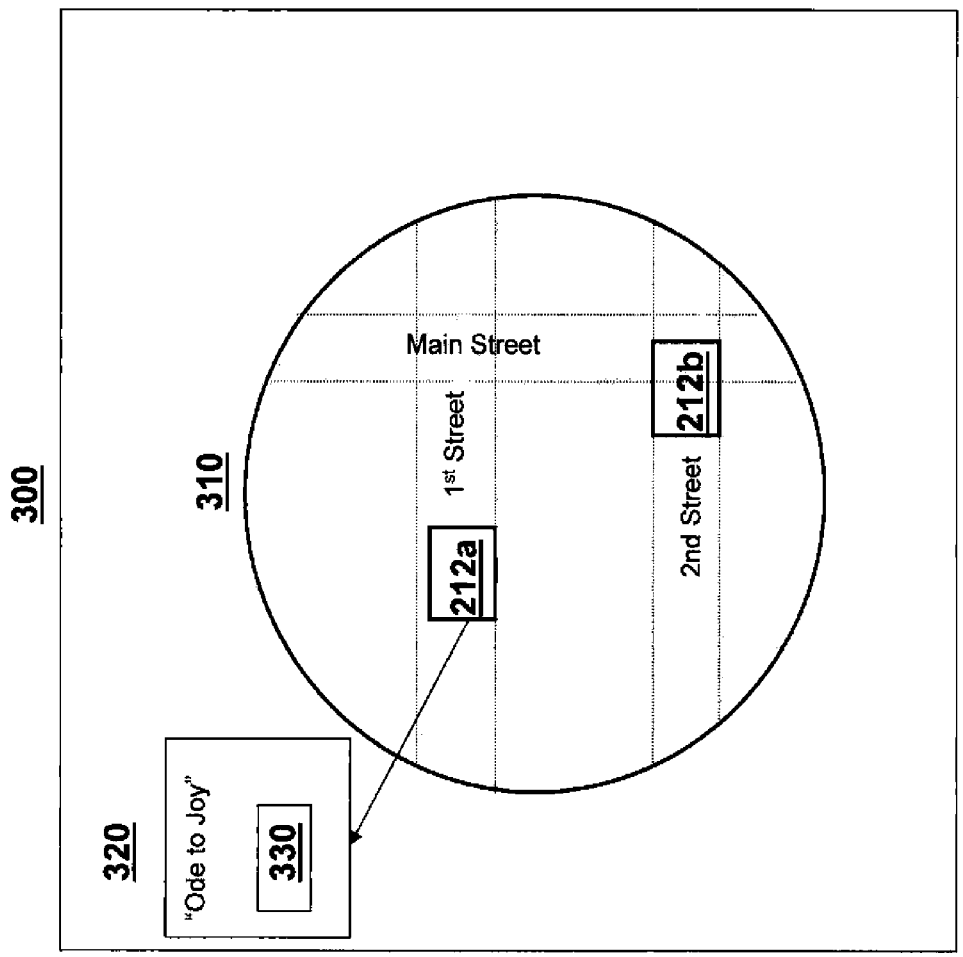
FIG. 32 illustrates an exemplary graphical user interface for a geographical embodiment for content social networking.

FIG. 32 shows an exemplary graphical user interface for a mobile handset. It shows display screen 300 of mobile handset 212b. Display screen 300 generates a map 310 showing the geographic location of mobile handset 212a and mobile handset 212b. Display screen 300 displays content information 320 concerning mobile handset 212a. In this example, the mobile handset 212a is playing "Ode to Joy" at that particular moment in time (for example, as a music clip, ring tone, streaming audio, etc.). Content information 320 shows information about that content, for example, the title ("Ode to Joy"), cover art, artist information, metadata, etc. Content information 320 optionally includes selector 130 that permits the user of mobile handset 212b to perform an action relating to mobile handset 212a, the user of mobile handset 212a, and/or the content associated with content information 320. For example, selector 330 can include a button that permits the user of mobile handset 212b to purchase or sample the content associated with content information 220 (for example, to listen to a clip of "Ode to Joy"), or to communicate with mobile handset 212a (for example, to send an SMS message, email, or a message via a social networking communication mechanism). One benefit of this embodiment is that the user of mobile handset 212b will know that the user of mobile handset 212a is nearby and will learn what he or she is doing at that moment in time with regard to digital content.

Although parts of the preceding discussion have focused on social networks, the same concepts can be applied to other groups or characteristics of users. For example, the same actions described previously with reference to FIG. 31 can be applied to all users who subscribe to the same service (e.g., a streaming radio service) or who have other characteristics in common (e.g., all users who have identified themselves as fans of a particular musical group), instead of all users who are part of the same social network.

Recommendation Engine

Figure 33:
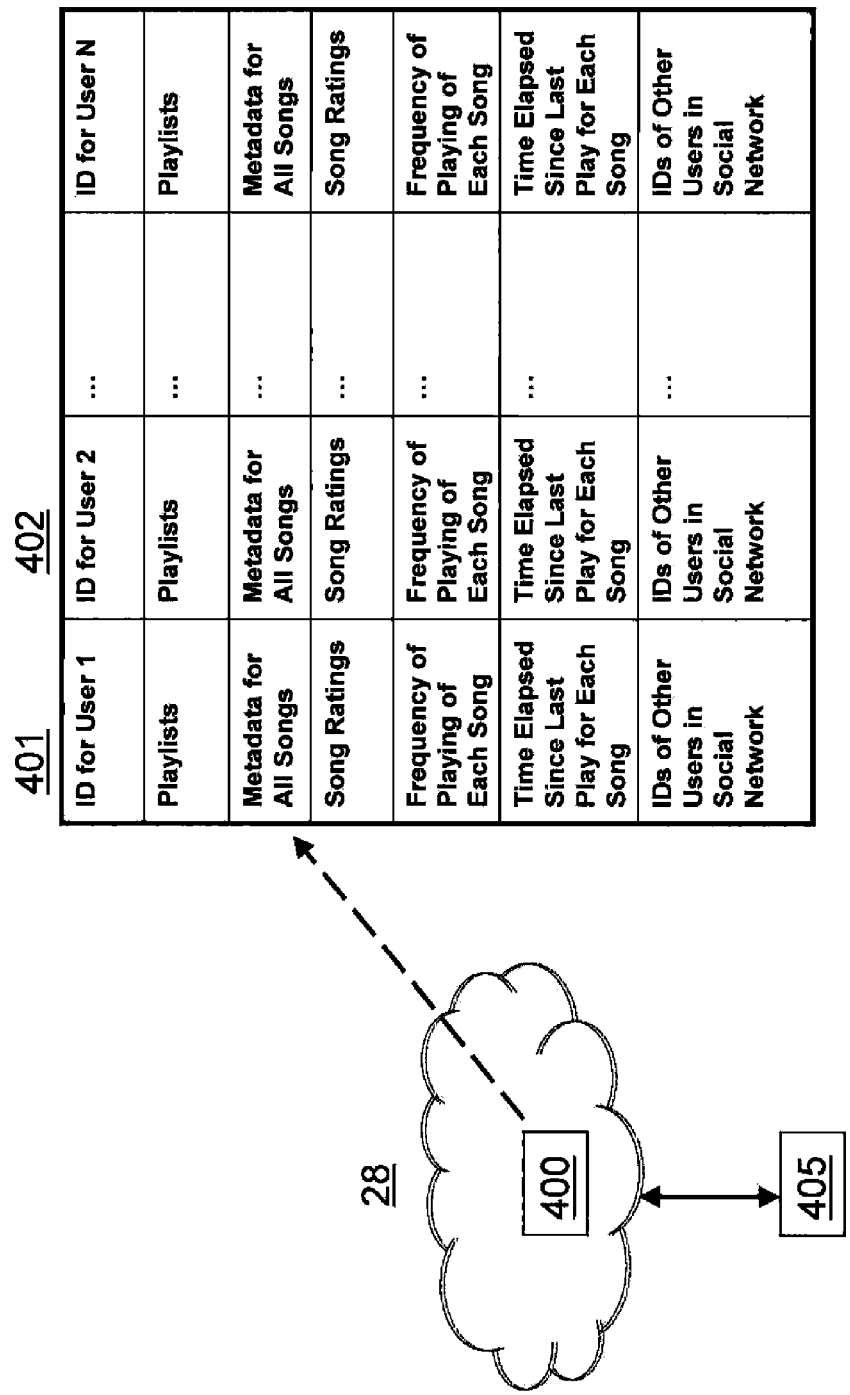
FIG. 33 illustrates an implementation of an embodiment for a content store and data structures therein.

In other embodiments, a recommendation engine is used. With reference to FIG. 33, computing device 28 of previous figures is depicted. As stated previously, computing device 28 may be a computing cloud (with a plurality of processing unit based devices, storage devices, etc.). Computing device 28 comprises a content store 400, such as a database. Content store 400 optionally creates and maintains data structures, such as a database table, for each user who has registered with or is otherwise known to computing device 28. For instance, data structure 401 can be assigned to User 1, data structure 402 can be assigned to User 2, etc. In this manner, a data structure can be assigned to each of the N Users, where N is the total number of users of a particular service offered by computing device 28.

As an example, when the relevant digital content is music, each data structure, such as data structures 401, 402, ..., 40n, optionally can include fields such as the following: an ID for the user, playlists (including the name of the playlist, other identifiers for the playlist, titles of the songs on the playlist, and other identifiers for the songs on the playlist), metadata for all stored songs, ratings for each song (whether by that user, other users, or an aggregate of users), the frequency with which the particular user has played each particular song (e.g., 8 times over the past 7 days), the time elapsed since the particular user has played each particular song (e.g., 256 minutes), the timestamp of the last time the particular user played each particular song, and IDs for other users of the service offered by computing device 28 who are within that particular user's social network (such as within Facebook®). Optionally, instead of playlists, the same approach can be used to track personalized radio stations or other collections of content accessed by each user. In addition to music, data structures can be created for other types of digital content as well (such as video, TV, movies, commercials, advertisements, etc.) that may or may not have similar fields to those shown in FIG. 33.

Identification information for persons who are within a particular user's social network can be readily obtained using publicly known APIs offered by providers of social networks. For example, computing device 28 can communicate with computing device 405 that is associated with the service that provides a social network (such as a server for Facebook®). This communication can occur via an API or other communication mechanism. Once obtained, the identification information for persons within a particular user's social network can then be compared to information provided to computing device 28 by all users, and computing device 28 can then determine which users are within the same social network.

Figure 34:
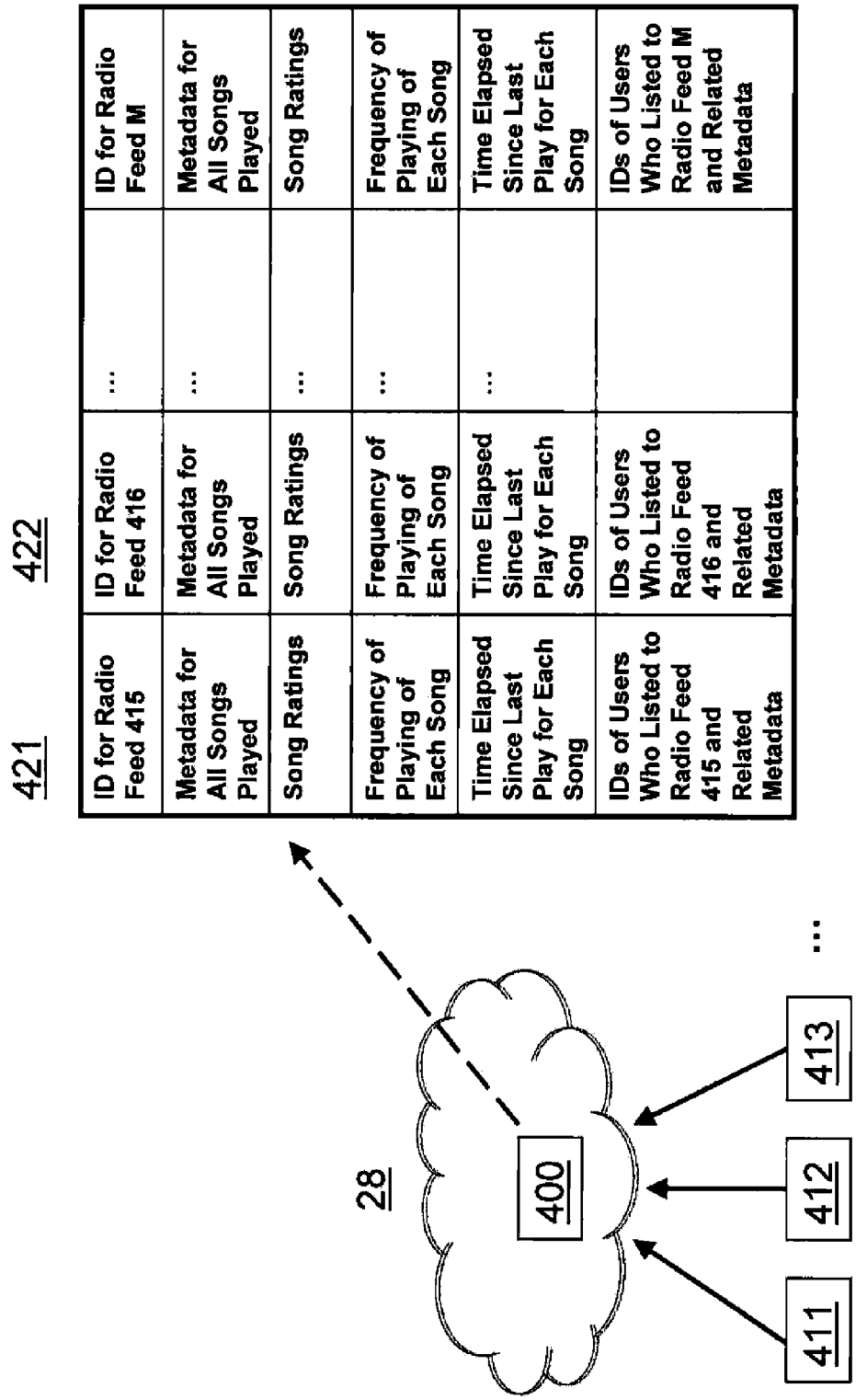
FIG. 34 illustrates another implementation of an embodiment for a content store and data structures therein.

With reference to FIG. 34, in another embodiment, content store 400 optionally creates and maintains data structures, such as a database table, for sequences of digital content that it receives and offers to its users. Examples of such sequences can include radio feeds or radio stations, video feeds or video stations, TV content, collections of commercials or advertisements, or other sequences of digital content.

For example, computing device 28 can be configured to receive live content feeds from content sources 411, 412, 413, and others (that may be, for example, radio sources). In one example, the Radio Sources 411, 412, 413, and others are computing devices that send live radio feeds over the Internet using standard HTTP communications and standard Internet radio formats such as SHOUTcast or Icecast. In this example, when the sources are radio stations, data structure 421 can be assigned to Radio Source 411, data structure 422 can be assigned to Radio Source 412, etc. In this manner, a data structure can be assigned to all M content sources, where M is the total number of content sources monitored or received by computing device 28. Each data structure, such as data structures 421 and 422, optionally can include fields, when the content sources are radio sources, such as the following: an ID for the radio source or radio feed, metadata for all songs played on that radio source or radio feed (including a running log of all songs played), ratings for each song (whether by that particular user, other users, or an aggregate of users), the frequency with which the radio source or radio feed has played (or streamed, downloaded, transmitted, etc.) each particular song (e.g., 14 times over the past 7 days), the time elapsed since the particular radio feed has played (or streamed, downloaded, transmitted, etc.) each particular song (e.g., 378 minutes), the timestamp of the last time the particular user played each particular song, and IDs for users who have listed to the radio source or radio feed and related metadata. Optionally, each data structure can be configured to store data for only the last R songs played (or streamed, downloaded, transmitted, etc.), where R is an integer chosen to correspond to an approximate time period of interest. For example, because musical popularity changes very quickly, R may be chosen to be 1000, as 1000 songs might be the approximate number of songs played in one week by a radio source. Using this approach, the data structures would contain data that reflects the most current trends in popularity of particular songs and radio feeds. The data can be collected from all devices used by each user, such as in the configuration previously described with reference to FIG. 2B. Instead of radio sources or radio feeds, data structures can be created for virtually any type of sequence of content, such as video stations or video feeds, TV stations, etc.

It should be evident that content store 400 can collect a vast amount of data that indirectly reflects the relative popularity of each particular piece of digital content. With reference to FIG. 35A, content store 400 is accessed a by recommendation engine 430. Recommendation engine 430 comprises a computing device that runs an application or lines of code that perform the recommendation functionality described herein. Recommendation engine 430 optionally can be within computing device 28 (e.g., as a component within a cloud system), or it can be separate from computing device 28.

Recommendation engine 430 receives one or more inputs and creates a recommendation 440 as an output in real-time. The inputs can include data stored in content store 400 as described previously with reference to FIGS. 33 and 34. For example, if User 1 has a social network through Facebook®, recommendation engine 430 can compare the playlists of User 1 (as stored in data structure 401) to the playlists of other users who are within User 1's social network. In one embodiment, recommendation engine 430 can find the user within User 1's social network who has playlists that most closely match those of User 1 (either on a playlist-by-playlist basis or in the aggregate). For example, suppose that User 2 is within User 1's social network, and that User 1 has a playlist X and User 2 has a playlist Y and 80% of the songs on playlist X are on playlist Y and that this is the closest match among all of User 1's playlists and all the playlists of all users within User 1's social network. Recommendation engine 430 will identify playlist Y as being a close match to one of User 1's playlists (playlist X).

Recommendation engine 430 will then identify the songs on playlist Y that are not on playlist X, and it can then recommend one or more of those songs to User 1. To enhance the social networking experience, recommendation engine 430 can inform User 1 that User 2 likes that particular song or songs, for instance, with a message that says, "Your musical tastes are similar to John [User 2]. He likes 'Firework,' which is not in your library. Click here to listen to or purchase it." In another embodiment, recommendation engine 430 can ask User 1 if User 1 wants to send a recommendation to User 2, as a mechanism for enhancing the social networking experience. For example, recommendation engine 430 can send a message to User 1 that says, "Based on the musical tastes for you and User 2, we think User 2 would like 'Firework,' which is in your library but not User 2's. Click here to send a recommendation to User 2 for that song." If User 1 clicks the selection field, recommendation engine 430 would then send the recommendation to User 2 and indicate that it came from User 1. In yet another embodiment, recommendation engine 430 can perform the same type of comparisons described above for other digital content, such as other audio content, movies, other video content, commercials, or any other digital content.

Recommendation engine 430 can be configured to apply different weighting coefficients to each element considered in making a recommendation. For example, it can apply a different weight to each of the elements stored in the data structures described previously with reference to FIGS. 33 and 34. It can then apply the coefficients to generate a number that reflects a raw value of a particular item, and it can then recommend the item with the highest raw value. The social network or social graph itself can be used as a weighting factor by recommendation engine 430. For example, if a particular song is on the playlist of a member of a particular user's social network, then recommendation engine 430 will give it a greater weight in deciding what to recommend than would be the case had that member not been the particular user's social network. An example of a formula that can be used to generate the raw number for each item as to User X (to determine which item to recommend to User X) is the following:

| For Song Y: | |
| --- | --- |
| Coefficient | Item |
| 1.0 | Percentage of Number of Times Song Y was Listened to By Members of User X's Social Network Compared to All Songs Within Last 24 Hours (normalized to scale of 0.00 to 1.00) |
| 0.5 | Percentage of Number of Times Song Y was Listened to By Users Who are Not Members of User X's Social Network Compared to All Songs Within Last 24 Hours (normalized to scale of 0.00 to 1.00) |
| 1.0 | Average Rating of Song Y By Members of User X's Social Network (normalized to a scale of 0.00 to 1.00) |
| 0.25 | Average Rating of Song Y by Users Who are Not Members of User X's Social Network (normalized to a scale of 0.00 to 1.00) |
| 2.0 | Percentage of Radio Stations that Have Played Song Y In Last 24 Hours (normalized to a scale of 0.00 to 1.00) |

In this example, each coefficient would be multiplied by its corresponding item, and the results would be summed to create a raw value. The item with the highest raw value that is not already in User X's library (or playlist, etc.) would be recommended to User X. These coefficients are merely exemplary and could be chosen to place greater or lesser weight on each item. As will be apparent in this example, greater weight can be placed on the activities of members of User X's social network compared to the user base in general.

In another embodiment, recommendation engine 430 can instead create recommendations using data collected from all users by using a vector method that is well-known in the art and is commonly used for recommendations made by retail websites. With reference to FIG. 35B, in a different embodiment, recommendation engine 430 comprises a first engine 431 which generates recommendations based upon a first set of users and a second engine 432 which culls the results of first engine 431 based upon a second set of users that is a sub-set of the first set of users. For example, first engine 431 might perform actions based on data from all users of a service offered by computing device 28, and second engine 432 might cull the results from first engine 431 by selecting results that correspond only to members of the particular user's social network. In this particular example, second engine 432 would comprise a social graph filter. Thus, in this embodiment, recommendation engine 430 would find the top users who most closely match the taste of a particular user, and then compare those users against the members of the particular user's social network, and if a match is found, issue a recommendation based on the member with the closet match.

In another embodiment, recommendation engine 430 can recommend a sequence or source of digital content for a particular user. For example, if a playlist or the total collection for User 1 has a close overlap with music recently played by an Internet radio source or radio feed (such as by comparing the last Q songs that User 1 has listened to with the last R songs that each radio source or radio feed has played and identifying the radio source or radio feed with the largest number of songs that also were listed to by User 1), recommendation engine 430 might recommend that radio source or radio feed to User 1, perhaps with a message that says, "Based on your musical taste, we think you would like the WABC radio station. Click here to access it" on the user interface of the user's computing device In another embodiment, recommendation engine 430 can determine the most popular song listened to or played by all users within a particular user's social network that the particular user does not yet have in his or her collection. It can then recommend that song to the particular user, perhaps with a message that says, "The most popular song listed to by people in your social network that you do not have in your collection is 'California Girls.' Click here to listen to or purchase it" on the user interface of the user's computing device.

Recommendation engine 430 and computing device 28 can be utilized to provide metrics to a particular user regarding patterns in that user's interactions with digital content. For example, because computing device 28 captures metadata for all digital music listened to by a particular user, computing device 28 can provide a graph, pie chart, or other descriptive image or data that shows the user's listening habits by genre, time period of music, or other aspect of the digital music. For example, computing device 28 can create a graph that shows the number of songs listened to by the user over a certain time period from the 1970s, 1980s, 1990s, 2000s, and 2010s. Recommendation engine 430 can them make a recommendation to the user. For example, if that user predominantly listens to music from the 1970s, recommendation engine 430 might inform the user, "You are stuck in the 1970s. You should listen to Song X, or Radio Station Y," where Song X is a recently-released song, and Radio Station Y mostly plays "current" music. Computing device also might provide the user with a pie chart indicating the proportion of songs listened to by the user over a certain time period that falls within each genre (Classic Rock, Hip Hop, etc.). Recommendation engine 430 then might inform the user, "You like Hip Hop music. You might enjoy Song X, or Radio Station Y," where here Song X is an R&B song, and Radio Station Y mostly plays R&B music. In this manner, the user learns about his or her own listening patterns, and recommendation engine 430 makes suggestions to the user that is designed to broaden that user's listening experience by exposing the user to music that is different but likely to be enjoyed by that user based upon correlations identified by recommendation engine when examining data stored in content store 400 collected from other users.

Computing device 28 also can indicate changes in listening patterns over time. For example, it can show a chart describing a user's listening patterns by month, or by year, so that the user can see how his or her tastes have changed over time.

In yet another embodiment, computing device 28 and/or recommendation engine 430 can generate charts or other data regarding the listening habits of all users or a sub-group of users (such as users within a social network). For example, it can send a list or graph of the most popular songs within a certain time period (based on, for instance, the song that was most frequently played over the past week). It also can send a list of graph of the most popular songs within a certain time period for users within a social network. ("The most popular song among you friends this week was 'Firework.'"). This also can be offered for other collections of people (e.g., all students at Stanford University). This is another way of exposing users to new music. In a variation of this embodiment, computing device 28 can provide this information to users by a news feed (such as through Twitter® or other devices), so that users will be provided with this information in real-time.

Computing device 28 also can inform a user whether his or her musical tastes are "hip" compared to the all users of computing device 28 or all users within that particular user's social network. Computing device 28 can compare a list of the most popular songs within all users or a particular user's social network with that particular user's listening habits over time. If the user listened to those songs several days or weeks before they became popular, then computing device 28 can inform the user that he or she is a "hip" music listener because he or she listened to music before it became popular. This will incent users to listen to music as soon as it becomes available to see if they can predict popularity.

In another embodiment, recommendation engine 430 or computing device 28 can provide a particular user with access to the playlists or other metadata of other users within that particular user's social network. This would allow, for instance, someone to see which songs their friends are listening to, and perhaps to have the option to purchase or sample that music.

In another embodiment, recommendation engine 430 can recommend to a particular user that they add another user to his or her social network based on the metadata collected for each one. For example, if the musical tastes of User 1 and User 2 are similar (based on a comparison of their playlists or listening habits) and User 1 and User 2 are not in the same social network, then recommendation engine 430 can send a message to User 1 such as "Your musical tastes are very similar to those of John [User 2]. Click this link to invite John to your social network" on the user interface of the user's computing device.

In another embodiment, recommendation engine 430 can create a new social network based on the musical tastes of two or more users. For example, if a collection of users have a substantial overlap in their playlists or listening habits, then recommendation engine 430 could invite them to join a new social network centered around the prevalent type of music (e.g., the Classic Rock User Network).

In yet another embodiment, recommendation engine 430 can recommend an entire set or playlist of content instead of just an individual piece of content. It can generate this set or playlist using the same methodology described previously.

Figure 36:
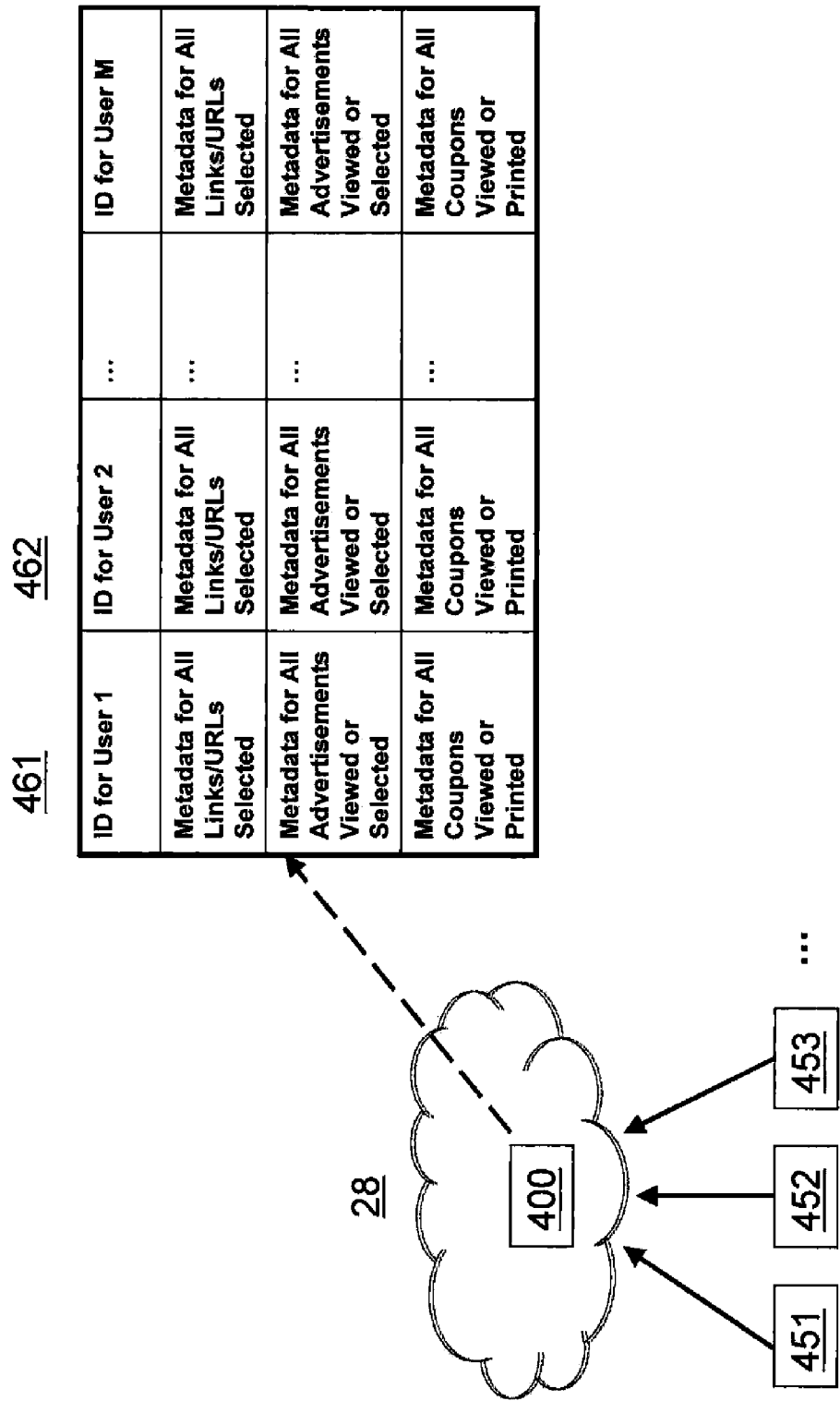
FIG. 36 illustrates another implementation of an embodiment for a content store and data structures therein.

In yet another embodiment, computing device 28 and content store 400 can gather and store information regarding other activities performed by users, such as links/URLs selected through a web browser or coupons or advertisements viewed or clicked upon. With reference to FIG. 36, User 1 operates device 451, User 2 operates device 452, and User 3 operates device 453. Computing device 28 and content store 400 collect information regarding all items selected by each user (such as links/URLs, coupons, advertisements, etc.). Content store 400 optionally includes a data structure for each user (such as Data Structure 461 for User 1 and Data Structure 462 for User 2). These data structures can include the following fields: User ID, metadata for all links/URLs selected, metadata for all advertisements viewed or selected, and metadata for all coupons viewed or printed. This data can then be accessed by recommendation engine 430 to create additional recommendations for a particular user, such as websites he or she is likely to enjoy (based on the history of links/URLs selected by other persons whose activities closely match those of the user), or coupons or advertisements he or she is likely to enjoy (again, based on the correlation between the user's history and those of other users with similar histories). These recommendations optionally can be constrained within that user's social network. For example, a message can be sent to User 1 stating, "10 of your friends in your social network printed the following coupon for Acme Materials today."

Figure 37:
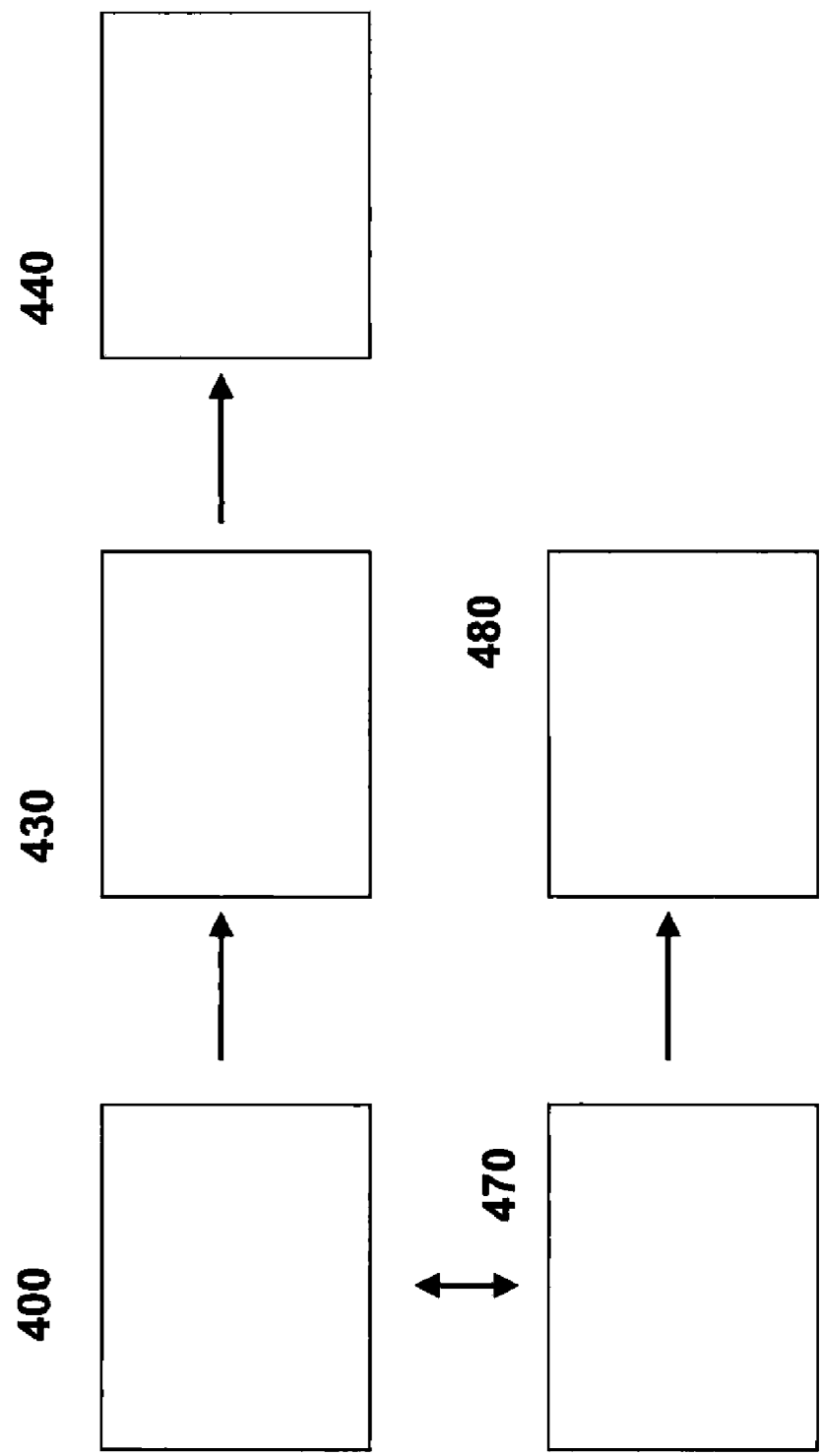
FIG. 37 illustrates an implementation of a recommendation engine and advertising engine.

In yet another embodiment, with reference to FIG. 37, an advertising engine 470 generates one or more advertisements 480 for a particular user based at least in part on data received from recommendation engine 430 and/or the content store 400. These ads can be chosen based on the online activity of members of a particular user's social network. For example, if Advertisement X was the most popular ad within the social network (based on times viewed or clicked, etc.), then recommendation engine 430 and/or content store 400 can recommend to advertising engine 470 to send Advertisement X to that particular user.

Figure 38:
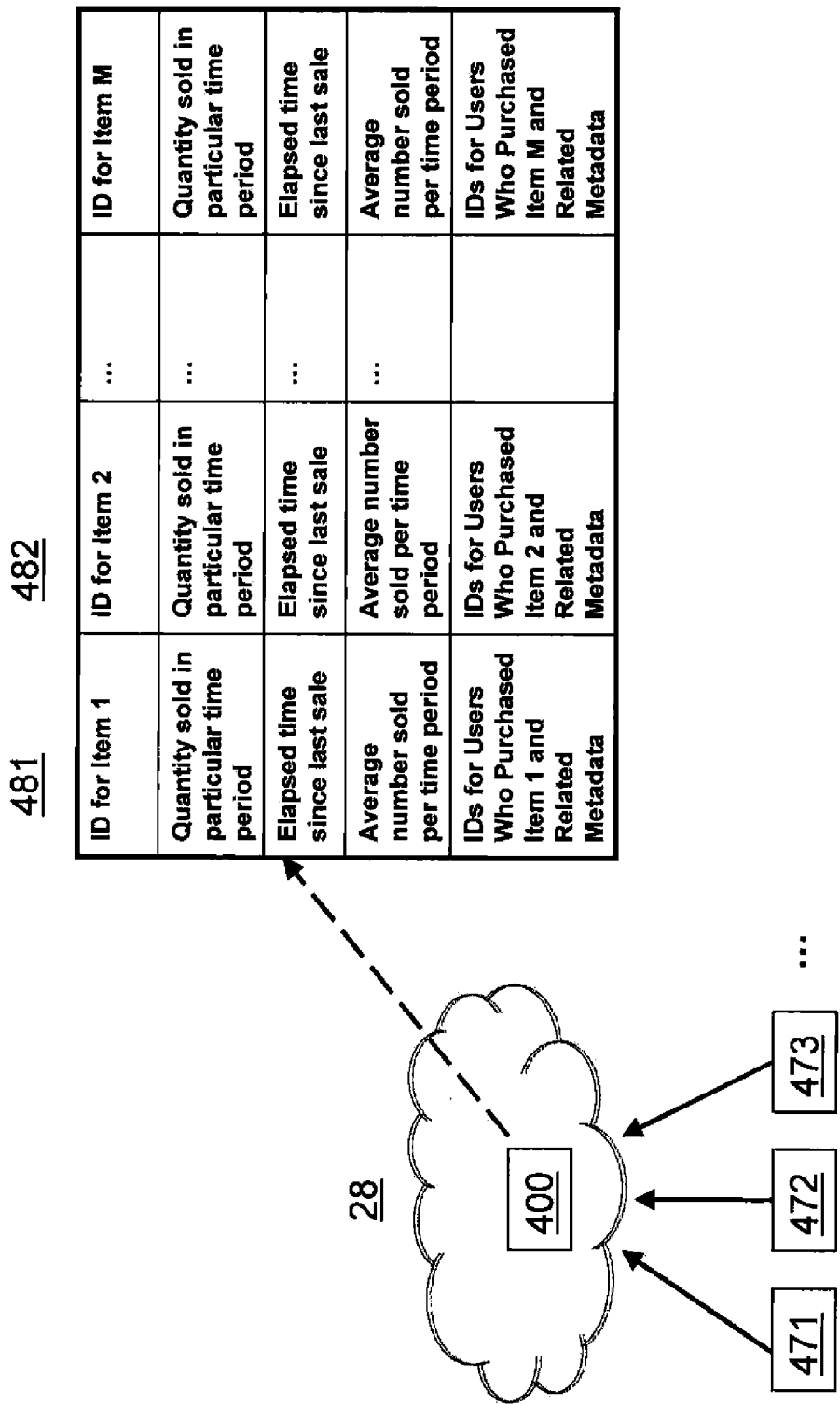
FIG. 38 illustrates another implementation of an embodiment for a content store and data structures therein.

In yet another embodiment, with reference to FIG. 38, computing device 28 and content store 400 can gather and store information regarding retail activity. Computing device 28 can obtain data from retail database 471, retail database 472, etc. These retail databases can be associated with a retail website, a "brick and mortar" store, or any other collection of retail data. Content store 400 optionally includes a data structure for each item, such as data structure 481 for item 1, data structure 482 for item 2, etc. The data structures 481 and 482 can include the following fields: item ID (such as a SKU number), quantity sold in particular time period (e.g., number sold in last 24 hours), elapsed time since last sale (e.g., 3 minutes), average number sold per time period (e.g., 27 per day over the last 7 days), and IDs of users who purchased the item and related metadata (date and time of purchase, quantity, etc.). Recommendation engine 430 then can generate recommendations for retail items based on the data collected (e.g., "Seven people in your social network have purchased Item X. Click here to purchase it.") on the user interface of the user's computing device.

Dynamic Content Verification

Figure 39A:
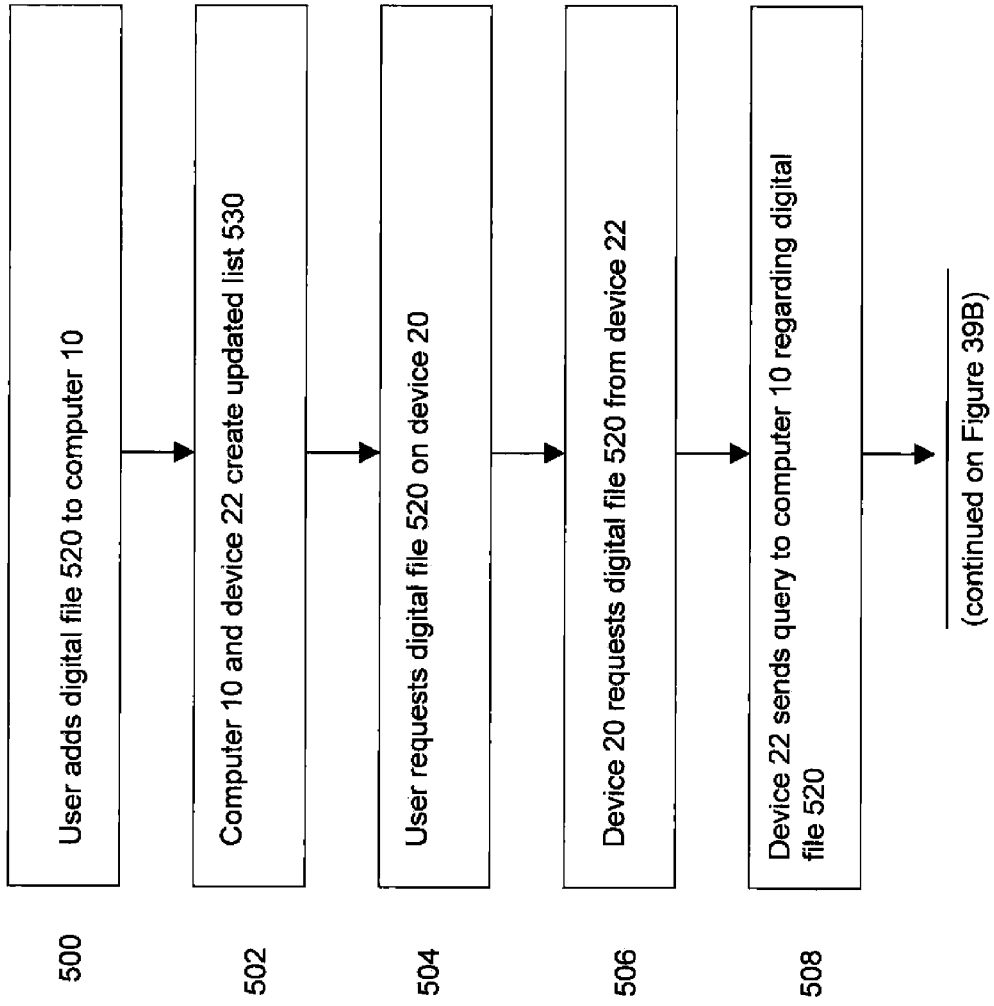
FIG. 39 illustrates another embodiment of a system and method that allows a device to download music from a computing device.
Figure 39B:
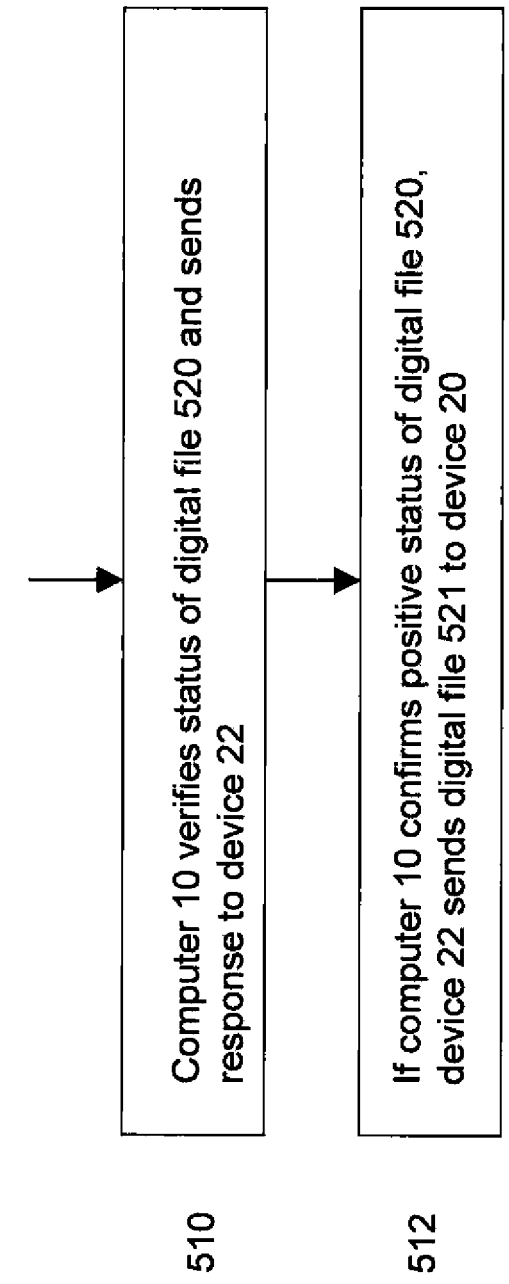

Another embodiment involves a variation of the system shown in FIG. 2A and previously described, and will be described with reference to FIG. 2A and FIGS. 39A and 39B. In this embodiment, as in certain previous embodiments, computer 10, device 20, and device 22 contain a list of the digital content of the user. The user adds digital file 520 to computer 10 (step 500). Computer 10 creates an updated list 530, and the new list or the updates are sent to device 22, which also creates updated list 530 (step 502). The user later requests digital file 520 on device 20 (step 504) using one of the embodiments previously described. Device 20 requests digital file 520 from device 22 (step 506). Device 22 sends a query to computer 10 regarding digital file 520 (step 508). Computer 10 verifies the status of digital file 520 and sends a response to device 22 (step 510). Step 510 optionally can include running a process to determine if the user has legitimate ownership rights to digital file 520, such as by generating a digital fingerprint for digital file 520 and comparing the digital fingerprint to a database of known, verified digital fingerprints to determine if digital file 520 was purchased legitimately or if it is an illegal "bootleg" copy. If computer 10 confirms the positive status of digital file 520 (such as by confirming that it was purchased legitimately), device 22 sends digital file 521 to device 20 (step 512). Digital file 521 contains the same exact content as digital file 520. However, digital file 521 was already stored in device 22 (as might be the case if device 22 contains a large collection of digital content, such as one might find in an online catalog or music provider), and therefore, digital file 520 need not be uploaded to device 22 from computer 10, which would reduce the waiting time for the user and would minimize the use of bandwidth between computer 10 and device 22.

Figure 40:
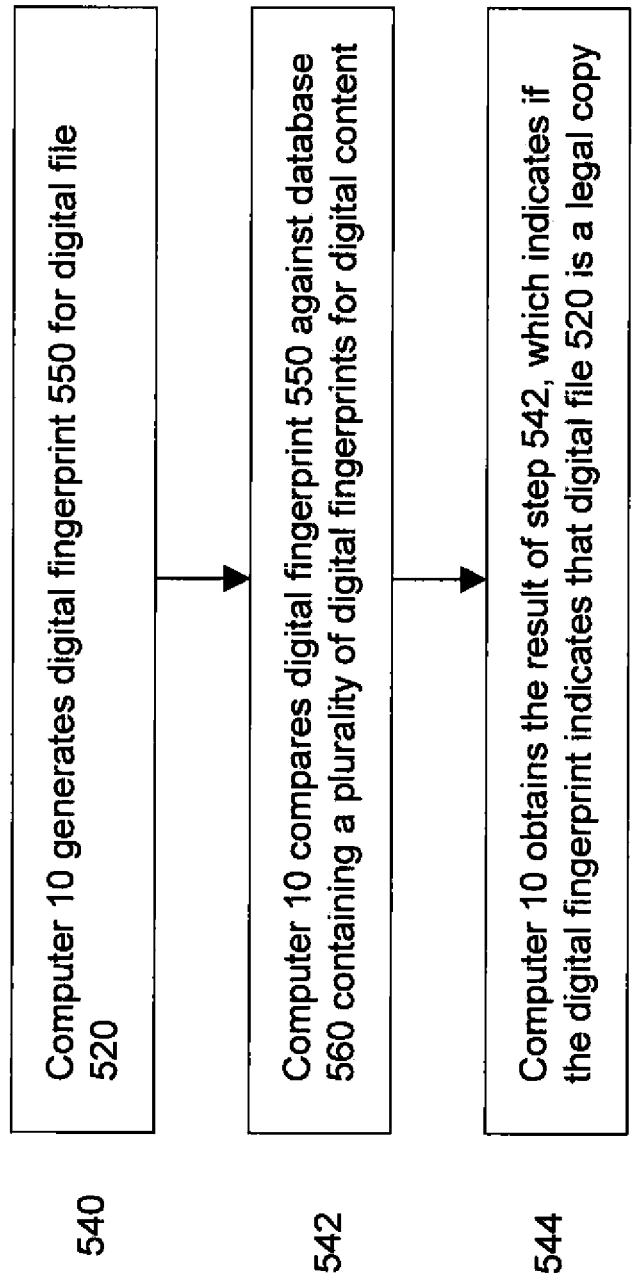
FIG. 40 illustrates an embodiment of a system and method that allows a device to confirm the ownership rights of a user to a particular piece of digital content.

Additional detail for an optional implementation of step 510 will now be described with reference to FIG. 40. The concept of a digital fingerprint was described previously. An additional method and system for generating a unique digital ID for a piece of digital content was described in U.S. patent application Ser. No. 11/874,720, filed on Oct. 18, 2007, and issued as U.S. Pat. No. 7,917,083 ("Tang"), on Mar. 29, 2011, the content of which is hereby incorporated by reference as if fully set forth herein. Tang discloses a type of digital fingerprinting that can be used with the embodiments described herein. With reference now to FIG. 40, computer 10 generates digital fingerprint 550 for digital file 520 (step 540), using the method and system of Tang or some other known method and system. Computer 10 compares digital fingerprint 550 against database 560 containing a plurality of digital fingerprints for digital content (step 542). Database 560 can be part of computer 10, or it can be accessed by computer 10 over a network.

For example, known services such as the Gracenote™ service offered by Gracenote, Inc., maintain a database of digital fingerprints for copyrighted music recordings and files and will make its database available for a fee. When used in conjunction with the Gracenote™ service, computer 10 will send database 560 (in this example, a server associated with the Gracenote™ service) a digital fingerprint that was generated on computer 10 using an algorithm provided as part of the Gracenote™ service, and database 560 will send back a "song key" to computer 10. The song key can then be compared to a table of song keys previously provided to computer 10 by the Gracenote™ service, and if a match is found, then computer 10 can conclude that digital file 520 is a confirmed, legitimate file, and the table can be used to obtain information about the song, such as title, artist, recording date, etc. Another known fingerprinting service is Echoprint by The Echo Nest.

Regardless of the exact type of database 560 used, step 542 will indicate if digital file 520 is a file obtained legally or if it is an illegal "bootleg" copy or a file that cannot be identified confirmed to be legitimate. Finally, computer 10 obtains the result of step 542, which indicates if the digital fingerprint indicates that digital file 520 is a legal copy or not (step 546). If digital file 520 is a legal copy, then device 22 sends digital file 521 to device 20 (step 512, described previously). If digital file 520 is not confirmed to be a legal copy, then device 22 can optionally send a message to device 20 indicating that it cannot send digital file 520 or digital file 521 to device 20 unless the user pays a fee to obtain the appropriate license rights to that file.

In a variation of this method, computer 10 can instead send the digital fingerprint 550 to device 22, and device 22 can compare digital fingerprint 550 against database 560 to determine if digital file 520 is a legal copy.

Another embodiment involves a variation of the system shown in FIG. 2B and previously described, and will be described with reference to FIG. 2B and FIGS. 41A and 41B. In this embodiment, as in certain previous embodiments, devices 20 and computing, cloud 28 contain a list of the digital content of the user. The user adds digital file 520 to a first one of devices 20 (step 600). The first one of device 20 creates an updated list 530, and the new list or the updates are sent to computing cloud 28, which also creates updated list 530 (step 602). The user later requests digital file 520 on a second one of devices 20 (step 604) using one of the embodiments previously described. The second one of devices 20 requests digital file 520 from computing cloud 28 (step 606). Computing cloud 28 sends a query to the first one of devices 20 regarding digital file 520 (step 608). The first one of devices 20 verifies the status of digital file 520 and sends a response to computing cloud 28 (step 610). Step 610 optionally can include running a process to determine if the user has legitimate ownership rights to digital file 520, such as by generating a digital fingerprint for digital file 520 and comparing the digital fingerprint to a database of known, verified digital fingerprints to determine if digital file 520 was purchased legitimately or if it is an illegal "bootleg" copy. If the first one of devices 20 confirms the positive status of digital file 520 (such as by confirming that it was purchased legitimately), computing cloud 28 sends digital file 521 to device 20 (step 612). Digital file 521 contains the same exact content as digital file 520. However, digital file 521 was already stored in computing cloud 28 (as might be the case if computing cloud 28 contains a large collection of digital content, such as one might find in an online catalog or music provider), and therefore, digital file 520 need not be uploaded to computing cloud 28 from the first one of devices 20, which would reduce the waiting time for the user and would minimize the use of bandwidth between the first one of devices 20 and computing cloud 28.

Figure 42:
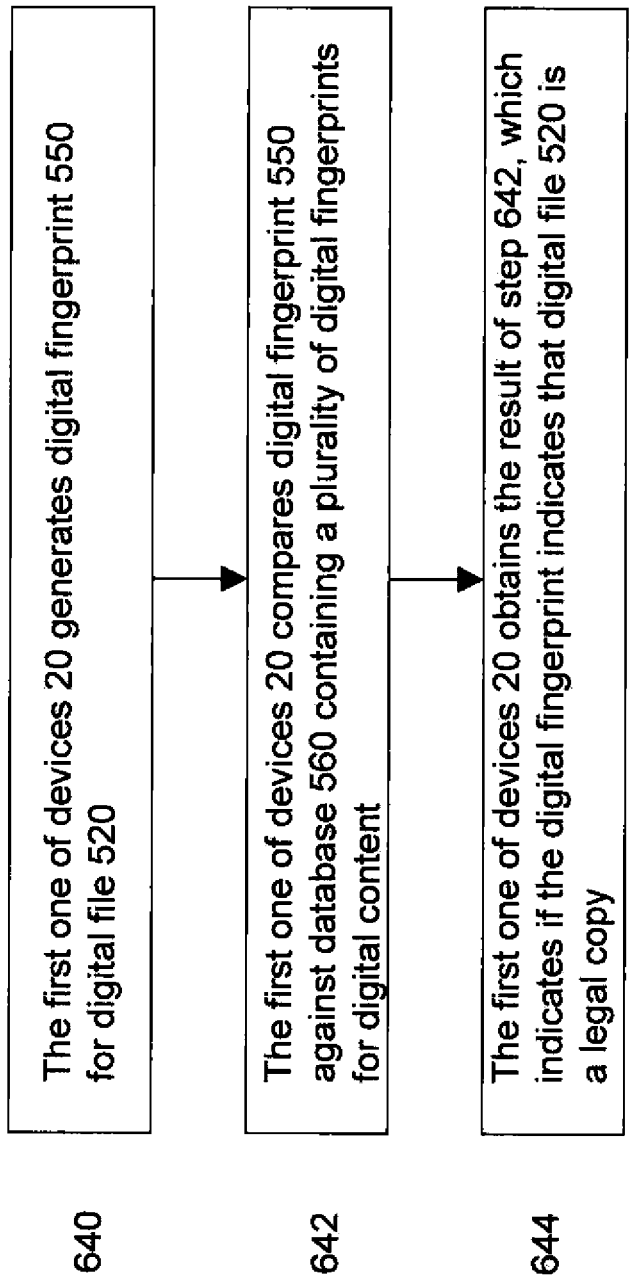
FIG. 42 illustrates another embodiment of a system and method that allows a device to confirm the ownership rights of a user to a particular piece of digital content.

Additional detail for step 610 will now be described with reference to FIG. 42, which is similar to FIG. 40. The first one of devices 20 generates digital fingerprint 550 for digital file 520 (step 640), using the method and system of Tang or some other known method and system. The first one of devices 20 compares digital fingerprint 550 against database 560 containing a plurality of digital fingerprints for digital content (step 642). Database 560 can be part of computer 10, or it can be accessed by computer 10 over a network. Regardless of the exact type of database 560 (Gracenote™, etc.) used, step 642 will indicate if digital file 520 is a file obtained legally or if it is an illegal "bootleg" copy or a file that cannot be identified or confirmed to be legitimate. Finally, the first one of devices 20 obtains the result of step 642, which indicates if the digital fingerprint indicates that digital file 520 is a legal copy or not (step 646). If digital file 520 is a legal copy, then computing cloud 28 sends digital file 521 to the second one of devices 20 (step 612, described previously). If digital file 520 is not confirmed to be a legal copy, then computing cloud 28 can optionally send a message to the second one of devices 20 indicating that it cannot send digital file 520 or digital file 521 to the second one of devices 20 unless the user pays a fee to obtain the appropriate license rights to that file.

In a variation of this method, the first one of devices 20 can instead send the digital fingerprint 550 to computing cloud 28, and computing cloud 28 can compare digital fingerprint 550 against database 560 to determine if digital file 520 is a legal copy.

The benefits of the embodiments described with reference to FIGS. 39-42 are numerous. For example, it typically takes existing systems around 3 seconds to create a digital fingerprint for a music file. If a user loads 1000 songs onto computer 10 or a first one of devices 20, then creating digital fingerprints for all of those songs would take around 3000 seconds. The embodiments of FIGS. 39-42 would enable the system to perform the digital fingerprinting process "on demand" so that when a user wishes to listen to a particular song on a second device shortly after loading a large collection of songs onto a first device, the system can perform the digital fingerprinting process only on that song (which will take around 3 seconds) and thereafter verify that the user has the rights to obtain a copy of the song on that second device. By contrast, without these embodiments, the system would need to finish creating the digital fingerprints for the entire collection of newly loaded songs (or at least up until the point where the digital fingerprint is created for the song in question) before it would be ready to receive such a request to determine if a user has rights to a particular song in that collection to enable it to be sent to the second device.

Improved Playback of Digital Content

Figure 43:
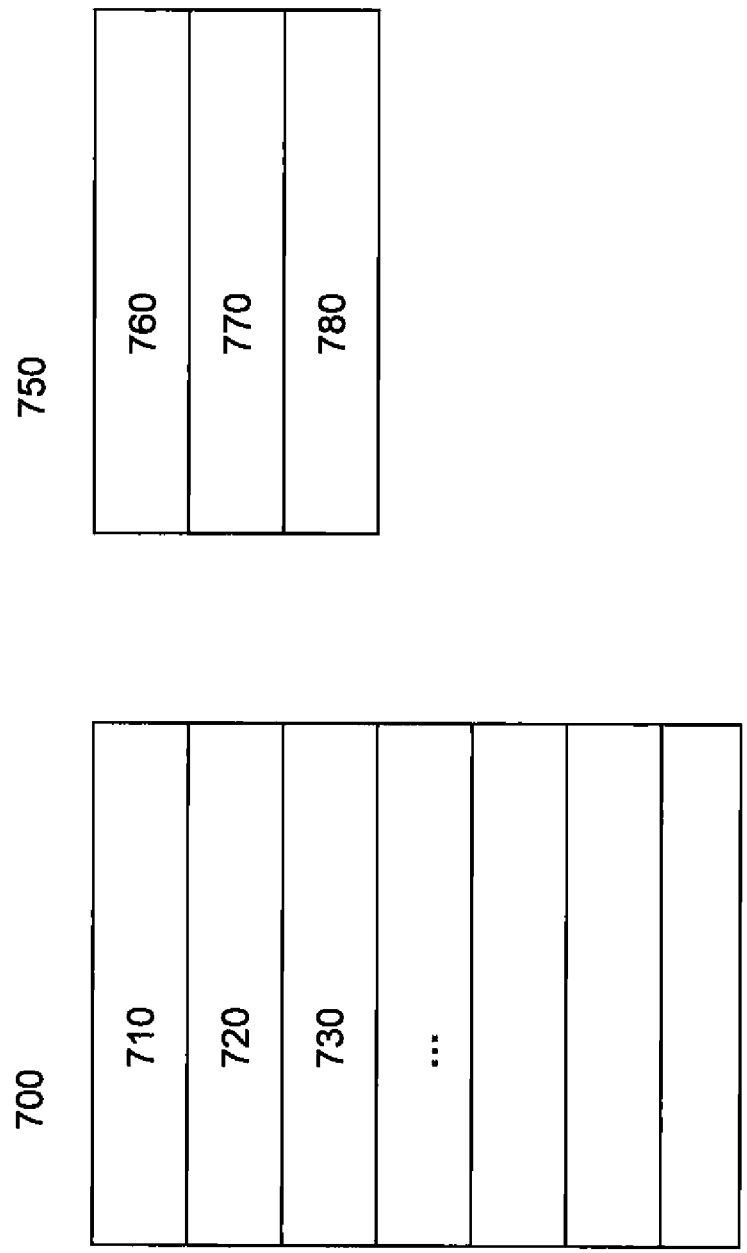
FIG. 43 illustrates a system for playback of digital content according to another exemplary embodiment.

Another embodiment provides an improved method and system for the play back of digital content. With reference to FIG. 43, device 20 maintains queue 700. Queue 700 is a data structure stored in memory or another storage device. Queue 700 contains exemplary entries 710, 720, 730, and others. Queue 700 can include pieces of digital content selected by a user, such as songs that the user wishes to listen to. When device 20 is configured to play entries within the queue, it will start with the first entry 710. Once it is finished playing first entry 710, it will then play the second entry 720, and so on. At any point while device 20 is playing an entry within queue 700, the user can navigate through other screens shown on device 20 and can view items associated with another data structure 750. Data structure 750 can be an album, playlist, collection of music of video, a "top 10" list, or any other assortment of digital content. In this example, data structure 750 is a playlist including items 760, 770, and 780, which in this example are digital songs. Here, the user selects item 760 for playing. At that point, device 20 stops playing from queue 700 and begins playing item 760. Device 20 can optionally enter an "autofill mode." If it does enter autofill mode, when device 20 has finished playing item 760, it will then start playing item 770 from data structure 750, and then will play item 780. If at any time, the user selects a "back" or "previous song" command, then device 20 will play the previous song actually played on device 20, whether the prior song was from queue 700 or from data structure 750. Using this autofill feature, there is no "downtime," and device 20 is able to continue playing even though the user navigated away from queue 700. This embodiment facilitates the ability of the user of device 20 to explore various pieces of digital content.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A computing cloud comprising:
a computing device including a content store that stores multiple sets of metadata for multiple users of a social network, wherein each set of metadata corresponds to a user of the social network and comprises information relating to activity of the user and at least one digital content playlist including digital content accessed by the user; and
a recommendation engine, associated with the content store, to:
provide at least one user of the social network with information relating to one or more user interaction patterns of the user with digital content over time;
based on the multiple sets of metadata, compare an at least one digital content playlist of a first user of the social network to an at least one digital content playlist of other users of the social network to identify a second user of the social network with a digital content playlist that most closely matches the at least one digital content playlist of the first user; and
provide a recommendation for digital content to the first user based in part on a first set of metadata corresponding to the first user, a second set of metadata corresponding to the second user, the social network, and information relating to one of more user interaction patterns of the first user to digital content over time,
wherein for at least one user of the social network, information relating to one or more user interaction patterns of the user with digital content over time includes metric information identifying the one or more user interaction patterns.

2. The apparatus of claim 1, wherein:
the social network provides a social connection between the first user and the second user.

3. The apparatus of claim 1, wherein:
for at least one user of the social network, information relating to one or more user interaction patterns of the user with digital content over time includes a listening pattern.

4. The apparatus of claim 1, wherein:
the recommendation engine provides the metric information in one of the following forms: a graph, and a pie chart.

5. The apparatus of claim 2, wherein:
for each user of the social network, the recommendation engine is further configured to provide one or more recommendations for digital content to the user based on a set of metadata for the user and at least one set of metadata for at least one other user that is socially connected with the user in the social network.

6. The apparatus of claim 1, wherein:
for at least one user of the social network, the recommendation engine is further configured to indicate one or more changes in one or more user interaction patterns of the user with digital content over time; and each recommendation comprises one or more of the following: an audio content recommendation, a playlist recommendation, a radio station recommendation, a video content recommendation, an advertisement recommendation, and a coupon recommendation.

7. A computing cloud comprising:
a content store that stores multiple sets of metadata for multiple users of a social network, wherein each set of metadata corresponds to a user of the social network and comprises information relating to activity of the user and at least one digital content playlist including digital content accessed by the user; and
a recommendation engine comprising:
a first engine to:
provide at least one user of the social network with information relating to one or more user interaction patterns of the user with digital content over time;
based on the multiple sets of metadata, compare an at least one digital content playlist of a first user of the social network to an at least one digital content playlist of other users of the social network to identify a second user of the social network with a digital content playlist that most closely matches the at least one digital content playlist of the first user, and
generate a set of recommendations for the first user of the social network based upon a first set of metadata corresponding to the first user, a second set of metadata corresponding to the second user, and information relating to one or more user interaction patterns of the first user with digital content over time; and
a second engine comprising a social graph filter to generate a subset of each set of recommendations,
wherein for at least one user of the social network, information relating to one or more user interaction patterns of the user with digital content over time includes metric information identifying the one or more user interaction patterns.

8. The apparatus of claim 7, wherein:
for each user of the social network, the social network provides at least one social connection between the user and at least one other user of the social network, such that each user of the social network is associated with at least one other user of the social network.

9. The apparatus of claim 7, wherein:
for at least one user of the social network, information relating to one or more user interaction patterns of the user with digital content over time includes a listening pattern.

10. The apparatus of claim 7, wherein:
the recommendation engine provides the metric information in one of the following forms: a graph or a pie chart.

11. The apparatus of claim 8, wherein:
for each user of the social network, the recommendation engine provides one or more recommendations for digital content to the user based on a set of metadata for the user and at least one additional set of metadata for at least one other user that is socially connected with the user in the social network.

12. The apparatus of claim 7, wherein:
for at least one user of the social network, the recommendation engine indicates one or more changes in one or more user interaction patterns of the user with digital content over time; and
each subset of each set of recommendations comprises one or more of the following: an audio content recommendation, a playlist recommendation, a radio station recommendation, a video content recommendation, an advertisement recommendation, and a coupon recommendation.

13. A method for generating recommendations comprising: generating, at a computing device, multiple sets of metadata for multiple users of a social network, wherein each set of metadata corresponds to a user of the social network and comprises information relating to activity of the user and at least one digital content playlist including digital content accessed by the user;
   providing, by a recommendation engine, at least one user of the social network with information relating to one or more user interaction patterns of the user with digital content over time;
   based on the multiple sets of metadata, comparing an at least one digital content playlist of a first user of the social network to an at least one digital content playlist of other users of the social network to identify a second user of the social network with a digital content playlist that most closely matches the at least one digital content playlist of the first user; and
   generating, by the recommendation engine, a recommendation for digital content to the first user based in part on a first set of metadata corresponding to the first user, a second set of metadata corresponding to the second user, the social network, and information relating to one or more user interaction patterns of the first user to digital content over time,
      wherein for at least one user of the social network, information relating to one or more user interaction patterns of the user with digital content over time includes metric information identifying the one or more user interaction patterns.

14. The method of claim 13, wherein:
the social network provides a social connection between the first user and the second user.

15. The method of claim 13, wherein:
for at least one user of the social network, information relating to one or more user interaction patterns of the user with digital content over time includes a listening pattern.

16. The method of claim 13, wherein:
the recommendation engine provides the metric information in one of the following forms: a graph or a pie chart.

17. The method of claim 14, wherein:
for each user of the social network, the recommendation engine is further configured to provide one or more recommendations for digital content to the user based on a set of metadata for the user and at least one additional set of metadata for at least one other user that is socially connected with the user in the social network.

18. The method of claim 13, wherein:
for at least one user of the social network, the recommendation engine is further configured to indicate one or more changes in one or more user interaction patterns of the user with digital content over time; and
each recommendation comprises one or more of the following: an audio content recommendation, a playlist recommendation, a radio station recommendation, a video content recommendation, an advertisement recommendation, and a coupon recommendation.

19. A method for generating recommendations comprising:
   generating, by a computing device, multiple sets of metadata for multiple users of a social network, wherein each set of metadata corresponds to a user of the social network and comprises information relating to activity of the user and at least one digital content playlist including digital content accessed by the user;
   storing each set of metadata corresponding to each user of the social network in a content store of the computing device;
   providing, by a recommendation engine, at least one user of the social network with information relating to one or more user interaction patterns of the user with digital content over time;
   based on the multiple sets of metadata, comparing an at least one digital content playlist of a first user of the social network to at least one digital content playlist of other users of the social network to identify a second user of the social network with a digital content playlist that most closely matches the at least one digital content playlist of the first user,
   generating a set of recommendations for the first user of the social network based upon a first set of metadata corresponding to the first user, a second set of metadata corresponding to the second user, and information relating to one or more user interaction patterns of the first user with digital content over time; and
   applying, by the recommendation engine, a social graph filter to generate a subset of each set of recommendations,
      wherein for at least one user of the social network, information relating to one or more user interaction patterns of the user with digital content over time includes metric information identifying the one or more user interaction patterns.

20. The method of claim 19, wherein:
for each user of the social network, the social network provides at least one social connection between the user and at least one other user of the social network, such that each user of the social network is associated with at least one other user of the social network.

21. The method of claim 19, wherein:
for at least one user of the social network, information relating to one or more user interaction patterns of the user with digital content over time includes a listening pattern.

22. The method of claim 19, wherein:
the recommendation engine provides the metric information in one of the following forms: a graph or a pie chart.

23. The method of claim 20, wherein:
for each user of the social network, the recommendation engine is further configured to provide one or more recommendations for digital content to the user based on a set of metadata for the user and at least one additional set of metadata for at least one other user that is socially connected with the user in the social network.

24. The method of claim 19, wherein:
for at least one user of the social network, the recommendation engine is further configured to indicate one or more changes in one or more user interaction patterns of the user with digital content over time; and
each subset of each set of recommendations comprises one or more of the following: an audio content recommendation, a playlist recommendation, a radio station recommendation, a video content recommendation, an advertisement recommendation, and a coupon recommendation.

* * * * *